(12) United States Patent
Pennington et al.

(10) Patent No.: US 12,509,529 B2
(45) Date of Patent: *Dec. 30, 2025

(54) ANTIBODIES AND ANTIBODY FRAGMENTS THAT BIND IgE

(71) Applicant: Excellergy, Inc., Palo Alto, CA (US)

(72) Inventors: Luke F. Pennington, Palo Alto, CA (US); Geoffrey Harris, Redwood City, CA (US)

(73) Assignee: Excellergy, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/211,910

(22) Filed: May 19, 2025

(65) Prior Publication Data

US 2025/0353929 A1 Nov. 20, 2025

Related U.S. Application Data

(63) Continuation of application No. PCT/US2025/029622, filed on May 15, 2025.

(60) Provisional application No. 63/649,247, filed on May 17, 2024.

(51) Int. Cl.
C07K 16/42 (2006.01)

(52) U.S. Cl.
CPC ...... *C07K 16/4291* (2013.01); *C07K 2317/51* (2013.01); *C07K 2317/515* (2013.01); *C07K 2317/52* (2013.01); *C07K 2317/565* (2013.01); *C07K 2317/567* (2013.01); *C07K 2317/92* (2013.01); *C07K 2317/94* (2013.01)

(58) Field of Classification Search
None
See application file for complete search history.

(56) References Cited

U.S. PATENT DOCUMENTS

| | | | |
|---|---|---|---|
| 5,994,511 A * | 11/1999 | Lowman | A61P 43/00 530/387.3 |
| 6,180,370 B1 * | 1/2001 | Queen | A61P 19/02 435/69.6 |
| 6,290,957 B1 | 9/2001 | Lowman et al. | |
| 6,329,509 B1 | 12/2001 | Jardieu et al. | |
| 6,682,735 B2 | 1/2004 | Lowman et al. | |
| 6,685,939 B2 | 2/2004 | Jardieu et al. | |
| 6,699,471 B2 | 3/2004 | Radice et al. | |
| 6,761,889 B2 | 7/2004 | Lowman et al. | |
| 6,914,129 B2 | 7/2005 | Jardieu et al. | |
| 7,351,816 B2 | 4/2008 | Jardieu et al. | |
| 8,435,517 B2 | 5/2013 | Desjarlais et al. | |
| 2022/0235146 A1 | 7/2022 | Adams et al. | |

FOREIGN PATENT DOCUMENTS

| | | |
|---|---|---|
| WO | WO-9304173 A1 | 3/1993 |
| WO | WO-9901556 A2 | 1/1999 |
| WO | WO-2017211928 A1 | 12/2017 |
| WO | WO-2019183437 A1 | 9/2019 |
| WO | WO-2020208177 A1 | 10/2020 |
| WO | WO-2024076785 A2 | 4/2024 |

OTHER PUBLICATIONS

Kipriyanov, Sergey M., and Fabrice Le Gall. "Generation and production of engineered antibodies." Molecular biotechnology 26.1 (2004): 39-60. (Year: 2004).*
Janeway, Charles A. "Immunobiology: The Immune System in Health and Disease." 2001 (Year: 2001).*
Gene ID: 3497. IGHE immunoglobulin heavy constant epsilon [ *Homo sapiens* (human) ]. record updated on May 3, 2025 ; [retrieved on May 29, 2025]. Available at URL: https://www.ncbi.nlm.nih.gov/gene/?term=3497. pp. 1-5.
Kabat, Elvin A. et al. Sequences of Proteins of Immunological Interest. Fifth Edition National Institute of Health (1991).
Troy, David B. Remington: The Science and Practice of Pharmacy, 21st Edition. Lippencott Williams & Wilkins (2005).
UniProtKB Accession No. P01854. Immunoglobulin heavy constant epsilon. Record created Nov. 1, 1988. Retrieved Nov. 15, 2024 at URL: https://www.uniprot.org/uniprotkb/P01854/entry pp. 1-10.
Wang, Shawn Shouye. et al. US FDA-approved therapeutic antibodies with high-concentration formulation: summaries and perspectives. Antibody therapeutics 4(4):262-272 (2021).
Zbaren et al. A novel functional mast cell assay for the detection of allergies. Biologics and immunotherapy 49(3):1018-1030 (2022).
Co-pending U.S. Appl. No. 19/212,291, inventors Pennington; Luke F. et al., filed May 19, 2025.
PCT/US20225/029622 Invitation to Pay Additional Fees dated Aug. 19, 2025.

* cited by examiner

*Primary Examiner* — Michael Szperka
*Assistant Examiner* — Lia E Taylor
(74) *Attorney, Agent, or Firm* — Wilson Sonsini Goodrich & Rosati

(57) ABSTRACT

Provided and exemplified herein are antibodies and antibody fragments that bind an IgE constant domain.

19 Claims, 2 Drawing Sheets
Specification includes a Sequence Listing.

SEQUENCE LISTING

```
Sequence total quantity: 384
SEQ ID NO: 1           moltype = AA  length = 11
FEATURE                Location/Qualifiers
source                 1..11
                       mol_type = protein
                       organism = synthetic construct
SEQUENCE: 1
GYDITQGYSW N                                                            11

SEQ ID NO: 2           moltype = AA  length = 16
FEATURE                Location/Qualifiers
source                 1..16
                       mol_type = protein
                       organism = synthetic construct
VARIANT                2
                       note = I or V
VARIANT                3
                       note = K or T
VARIANT                7
                       note = E or S
VARIANT                9
                       note = K or N
SEQUENCE: 2
SXXYSGXTXY NPSVKG                                                       16

SEQ ID NO: 3           moltype = AA  length = 12
FEATURE                Location/Qualifiers
source                 1..12
                       mol_type = protein
```

```
                                 organism = synthetic construct
SEQUENCE: 3
GNNYFGHWHF AV                                                                    12

SEQ ID NO: 4            moltype = AA   length = 17
FEATURE                 Location/Qualifiers
source                  1..17
                        mol_type = protein
                        organism = synthetic construct
VARIANT                 14
                        note = L or M
SEQUENCE: 4
RASKSVDAEG DSYXNWY                                                               17

SEQ ID NO: 5            moltype = AA   length = 7
FEATURE                 Location/Qualifiers
source                  1..7
                        mol_type = protein
                        organism = synthetic construct
SEQUENCE: 5
AASYLES                                                                           7

SEQ ID NO: 6            moltype = AA   length = 8
FEATURE                 Location/Qualifiers
source                  1..8
                        mol_type = protein
                        organism = synthetic construct
SEQUENCE: 6
QQSHEDPY                                                                          8

SEQ ID NO: 7            moltype = AA   length = 9
FEATURE                 Location/Qualifiers
source                  1..9
                        mol_type = protein
                        organism = synthetic construct
SEQUENCE: 7
GYDITQGYS                                                                         9

SEQ ID NO: 8            moltype = AA   length = 7
FEATURE                 Location/Qualifiers
source                  1..7
                        mol_type = protein
                        organism = synthetic construct
VARIANT                 1
                        note = I or V
VARIANT                 2
                        note = K or T
VARIANT                 6
                        note = E or S
SEQUENCE: 8
XXYSGXT                                                                           7

SEQ ID NO: 9            moltype = AA   length = 14
FEATURE                 Location/Qualifiers
source                  1..14
                        mol_type = protein
                        organism = synthetic construct
SEQUENCE: 9
AKGNNYFGHW HFAV                                                                  14

SEQ ID NO: 10           moltype = AA   length = 13
FEATURE                 Location/Qualifiers
source                  1..13
                        mol_type = protein
                        organism = synthetic construct
SEQUENCE: 10
RASKSVDAEG DSY                                                                   13

SEQ ID NO: 11           moltype = AA   length = 5
FEATURE                 Location/Qualifiers
source                  1..5
                        mol_type = protein
                        organism = synthetic construct
SEQUENCE: 11
AASYL                                                                             5

SEQ ID NO: 12           moltype = AA   length = 9
FEATURE                 Location/Qualifiers
source                  1..9
```

```
                                    mol_type = protein
                                    organism = synthetic construct
SEQUENCE: 12
QQSHEDPYT                                                                        9

SEQ ID NO: 13               moltype = AA  length = 6
FEATURE                     Location/Qualifiers
source                      1..6
                            mol_type = protein
                            organism = synthetic construct
SEQUENCE: 13
QGYSWN                                                                           6

SEQ ID NO: 14               moltype = AA  length = 16
FEATURE                     Location/Qualifiers
source                      1..16
                            mol_type = protein
                            organism = synthetic construct
VARIANT                     2
                            note = I or V
VARIANT                     3
                            note = K or T
VARIANT                     7
                            note = E or S
VARIANT                     9
                            note = K or N
SEQUENCE: 14
SXXYSGXTXY NPSVKG                                                               16

SEQ ID NO: 15               moltype = AA  length = 12
FEATURE                     Location/Qualifiers
source                      1..12
                            mol_type = protein
                            organism = synthetic construct
SEQUENCE: 15
GNNYFGHWHF AV                                                                   12

SEQ ID NO: 16               moltype = AA  length = 15
FEATURE                     Location/Qualifiers
source                      1..15
                            mol_type = protein
                            organism = synthetic construct
VARIANT                     14
                            note = L or M
SEQUENCE: 16
RASKSVDAEG DSYXN                                                                15

SEQ ID NO: 17               moltype = AA  length = 7
FEATURE                     Location/Qualifiers
source                      1..7
                            mol_type = protein
                            organism = synthetic construct
SEQUENCE: 17
AASYLES                                                                          7

SEQ ID NO: 18               moltype = AA  length = 9
FEATURE                     Location/Qualifiers
source                      1..9
                            mol_type = protein
                            organism = synthetic construct
SEQUENCE: 18
QQSHEDPYT                                                                        9

SEQ ID NO: 19               moltype = AA  length = 8
FEATURE                     Location/Qualifiers
source                      1..8
                            mol_type = protein
                            organism = synthetic construct
SEQUENCE: 19
GYDITQGY                                                                         8

SEQ ID NO: 20               moltype = AA  length = 5
FEATURE                     Location/Qualifiers
source                      1..5
                            mol_type = protein
                            organism = synthetic construct
VARIANT                     1
                            note = K or T
SEQUENCE: 20
```

```
XYSGE                                                                     5

SEQ ID NO: 21         moltype = AA  length = 12
FEATURE               Location/Qualifiers
source                1..12
                      mol_type = protein
                      organism = synthetic construct
SEQUENCE: 21
GNNYFGHWHF AV                                                            12

SEQ ID NO: 22         moltype = AA  length = 15
FEATURE               Location/Qualifiers
source                1..15
                      mol_type = protein
                      organism = synthetic construct
VARIANT               14
                      note = L or M
SEQUENCE: 22
RASKSVDAEG DSYXN                                                         15

SEQ ID NO: 23         moltype = AA  length = 7
FEATURE               Location/Qualifiers
source                1..7
                      mol_type = protein
                      organism = synthetic construct
SEQUENCE: 23
AASYLES                                                                   7

SEQ ID NO: 24         moltype = AA  length = 9
FEATURE               Location/Qualifiers
source                1..9
                      mol_type = protein
                      organism = synthetic construct
SEQUENCE: 24
QQSHEDPYT                                                                 9

SEQ ID NO: 25         moltype = AA  length = 11
FEATURE               Location/Qualifiers
source                1..11
                      mol_type = protein
                      organism = synthetic construct
SEQUENCE: 25
GYDITQGYSW N                                                             11

SEQ ID NO: 26         moltype = AA  length = 12
FEATURE               Location/Qualifiers
source                1..12
                      mol_type = protein
                      organism = synthetic construct
VARIANT               5
                      note = I or V
VARIANT               6
                      note = K or T
SEQUENCE: 26
WVASXXYSGE TK                                                            12

SEQ ID NO: 27         moltype = AA  length = 13
FEATURE               Location/Qualifiers
source                1..13
                      mol_type = protein
                      organism = synthetic construct
SEQUENCE: 27
AKGNNYFGHW HFA                                                           13

SEQ ID NO: 28         moltype = AA  length = 15
FEATURE               Location/Qualifiers
source                1..15
                      mol_type = protein
                      organism = synthetic construct
VARIANT               14
                      note = L or M
SEQUENCE: 28
RASKSVDAEG DSYXN                                                         15

SEQ ID NO: 29         moltype = AA  length = 10
FEATURE               Location/Qualifiers
source                1..10
                      mol_type = protein
                      organism = synthetic construct
```

| | | |
|---|---|---|
| SEQUENCE: 29 LLIYAASYLE | | 10 |
| SEQ ID NO: 30 FEATURE source | moltype = AA length = 8 Location/Qualifiers 1..8 mol_type = protein organism = synthetic construct | |
| SEQUENCE: 30 QQSHEDPY | | 8 |
| SEQ ID NO: 31 FEATURE source | moltype = AA length = 11 Location/Qualifiers 1..11 mol_type = protein organism = synthetic construct | |
| SEQUENCE: 31 GYDITQGYSW N | | 11 |
| SEQ ID NO: 32 FEATURE source VARIANT | moltype = AA length = 5 Location/Qualifiers 1..5 mol_type = protein organism = synthetic construct 1 note = K or T | |
| SEQUENCE: 32 XYSGE | | 5 |
| SEQ ID NO: 33 FEATURE source | moltype = AA length = 12 Location/Qualifiers 1..12 mol_type = protein organism = synthetic construct | |
| SEQUENCE: 33 GNNYFGHWHF AV | | 12 |
| SEQ ID NO: 34 FEATURE source | moltype = AA length = 13 Location/Qualifiers 1..13 mol_type = protein organism = synthetic construct | |
| SEQUENCE: 34 RASKSVDAEG DSY | | 13 |
| SEQ ID NO: 35 FEATURE source | moltype = AA length = 5 Location/Qualifiers 1..5 mol_type = protein organism = synthetic construct | |
| SEQUENCE: 35 AASYL | | 5 |
| SEQ ID NO: 36 FEATURE source | moltype = AA length = 8 Location/Qualifiers 1..8 mol_type = protein organism = synthetic construct | |
| SEQUENCE: 36 QQSHEDPY | | 8 |
| SEQ ID NO: 37 FEATURE source | moltype = AA length = 11 Location/Qualifiers 1..11 mol_type = protein organism = synthetic construct | |
| SEQUENCE: 37 GYDITQGYSW N | | 11 |
| SEQ ID NO: 38 FEATURE source | moltype = AA length = 16 Location/Qualifiers 1..16 mol_type = protein organism = synthetic construct | |
| SEQUENCE: 38 SIKYSGETKY NPSVKG | | 16 |
| SEQ ID NO: 39 FEATURE | moltype = AA length = 12 Location/Qualifiers | |

```
source                    1..12
                          mol_type = protein
                          organism = synthetic construct
SEQUENCE: 39
GNNYFGHWHF AV                                                              12

SEQ ID NO: 40             moltype = AA   length = 17
FEATURE                   Location/Qualifiers
source                    1..17
                          mol_type = protein
                          organism = synthetic construct
SEQUENCE: 40
RASKSVDAEG DSYLNWY                                                         17

SEQ ID NO: 41             moltype = AA   length = 7
FEATURE                   Location/Qualifiers
source                    1..7
                          mol_type = protein
                          organism = synthetic construct
SEQUENCE: 41
AASYLES                                                                     7

SEQ ID NO: 42             moltype = AA   length = 8
FEATURE                   Location/Qualifiers
source                    1..8
                          mol_type = protein
                          organism = synthetic construct
SEQUENCE: 42
QQSHEDPY                                                                    8

SEQ ID NO: 43             moltype = AA   length = 11
FEATURE                   Location/Qualifiers
source                    1..11
                          mol_type = protein
                          organism = synthetic construct
SEQUENCE: 43
GYDITQGYSW N                                                               11

SEQ ID NO: 44             moltype = AA   length = 16
FEATURE                   Location/Qualifiers
source                    1..16
                          mol_type = protein
                          organism = synthetic construct
SEQUENCE: 44
SVKYSGETKY NPSVKG                                                          16

SEQ ID NO: 45             moltype = AA   length = 12
FEATURE                   Location/Qualifiers
source                    1..12
                          mol_type = protein
                          organism = synthetic construct
SEQUENCE: 45
GNNYFGHWHF AV                                                              12

SEQ ID NO: 46             moltype = AA   length = 17
FEATURE                   Location/Qualifiers
source                    1..17
                          mol_type = protein
                          organism = synthetic construct
SEQUENCE: 46
RASKSVDAEG DSYLNWY                                                         17

SEQ ID NO: 47             moltype = AA   length = 7
FEATURE                   Location/Qualifiers
source                    1..7
                          mol_type = protein
                          organism = synthetic construct
SEQUENCE: 47
AASYLES                                                                     7

SEQ ID NO: 48             moltype = AA   length = 8
FEATURE                   Location/Qualifiers
source                    1..8
                          mol_type = protein
                          organism = synthetic construct
SEQUENCE: 48
QQSHEDPY                                                                    8

SEQ ID NO: 49             moltype = AA   length = 11
```

```
FEATURE              Location/Qualifiers
source               1..11
                     mol_type = protein
                     organism = synthetic construct
SEQUENCE: 49
GYDITQGYSW N                                                        11

SEQ ID NO: 50        moltype = AA   length = 16
FEATURE              Location/Qualifiers
source               1..16
                     mol_type = protein
                     organism = synthetic construct
SEQUENCE: 50
SIKYSGETKY NPSVKG                                                   16

SEQ ID NO: 51        moltype = AA   length = 12
FEATURE              Location/Qualifiers
source               1..12
                     mol_type = protein
                     organism = synthetic construct
SEQUENCE: 51
GNNYFGHWHF AV                                                       12

SEQ ID NO: 52        moltype = AA   length = 17
FEATURE              Location/Qualifiers
source               1..17
                     mol_type = protein
                     organism = synthetic construct
SEQUENCE: 52
RASKSVDAEG DSYMNWY                                                  17

SEQ ID NO: 53        moltype = AA   length = 7
FEATURE              Location/Qualifiers
source               1..7
                     mol_type = protein
                     organism = synthetic construct
SEQUENCE: 53
AASYLES                                                              7

SEQ ID NO: 54        moltype = AA   length = 8
FEATURE              Location/Qualifiers
source               1..8
                     mol_type = protein
                     organism = synthetic construct
SEQUENCE: 54
QQSHEDPY                                                             8

SEQ ID NO: 55        moltype = AA   length = 11
FEATURE              Location/Qualifiers
source               1..11
                     mol_type = protein
                     organism = synthetic construct
SEQUENCE: 55
GYDITQGYSW N                                                        11

SEQ ID NO: 56        moltype = AA   length = 16
FEATURE              Location/Qualifiers
source               1..16
                     mol_type = protein
                     organism = synthetic construct
SEQUENCE: 56
SIKYSGETKY NPSVKG                                                   16

SEQ ID NO: 57        moltype = AA   length = 12
FEATURE              Location/Qualifiers
source               1..12
                     mol_type = protein
                     organism = synthetic construct
SEQUENCE: 57
GNNYFGHWHF AV                                                       12

SEQ ID NO: 58        moltype = AA   length = 17
FEATURE              Location/Qualifiers
source               1..17
                     mol_type = protein
                     organism = synthetic construct
SEQUENCE: 58
RASKSVDTEG DSYLNWY                                                  17
```

```
SEQ ID NO: 59          moltype = AA   length = 7
FEATURE                Location/Qualifiers
source                 1..7
                       mol_type = protein
                       organism = synthetic construct
SEQUENCE: 59
AASYLES                                                                7

SEQ ID NO: 60          moltype = AA   length = 8
FEATURE                Location/Qualifiers
source                 1..8
                       mol_type = protein
                       organism = synthetic construct
SEQUENCE: 60
QQSHEDPY                                                               8

SEQ ID NO: 61          moltype = AA   length = 11
FEATURE                Location/Qualifiers
source                 1..11
                       mol_type = protein
                       organism = synthetic construct
SEQUENCE: 61
GYDITQGYSW N                                                          11

SEQ ID NO: 62          moltype = AA   length = 16
FEATURE                Location/Qualifiers
source                 1..16
                       mol_type = protein
                       organism = synthetic construct
SEQUENCE: 62
SIKYSGETKY NPSVKG                                                     16

SEQ ID NO: 63          moltype = AA   length = 12
FEATURE                Location/Qualifiers
source                 1..12
                       mol_type = protein
                       organism = synthetic construct
SEQUENCE: 63
GNNYFGHWHF AV                                                         12

SEQ ID NO: 64          moltype = AA   length = 17
FEATURE                Location/Qualifiers
source                 1..17
                       mol_type = protein
                       organism = synthetic construct
SEQUENCE: 64
RASKSVDRQG DSYLNWY                                                    17

SEQ ID NO: 65          moltype = AA   length = 7
FEATURE                Location/Qualifiers
source                 1..7
                       mol_type = protein
                       organism = synthetic construct
SEQUENCE: 65
AASYLES                                                                7

SEQ ID NO: 66          moltype = AA   length = 8
FEATURE                Location/Qualifiers
source                 1..8
                       mol_type = protein
                       organism = synthetic construct
SEQUENCE: 66
QQSHEDPY                                                               8

SEQ ID NO: 67          moltype = AA   length = 11
FEATURE                Location/Qualifiers
source                 1..11
                       mol_type = protein
                       organism = synthetic construct
SEQUENCE: 67
GYDITQGYSW N                                                          11

SEQ ID NO: 68          moltype = AA   length = 16
FEATURE                Location/Qualifiers
source                 1..16
                       mol_type = protein
                       organism = synthetic construct
SEQUENCE: 68
SITYSGSTNY NPSVKG                                                     16
```

| SEQ ID NO: 69 | moltype = AA length = 12 |
| --- | --- |
| FEATURE | Location/Qualifiers |
| source | 1..12 |
| | mol_type = protein |
| | organism = synthetic construct |

SEQUENCE: 69
GNNYFGHWHF AV                                                                 12

| SEQ ID NO: 70 | moltype = AA length = 17 |
| --- | --- |
| FEATURE | Location/Qualifiers |
| source | 1..17 |
| | mol_type = protein |
| | organism = synthetic construct |

SEQUENCE: 70
RASKSVDAEG DSYLNWY                                                            17

| SEQ ID NO: 71 | moltype = AA length = 7 |
| --- | --- |
| FEATURE | Location/Qualifiers |
| source | 1..7 |
| | mol_type = protein |
| | organism = synthetic construct |

SEQUENCE: 71
AASYLES                                                                        7

| SEQ ID NO: 72 | moltype = AA length = 8 |
| --- | --- |
| FEATURE | Location/Qualifiers |
| source | 1..8 |
| | mol_type = protein |
| | organism = synthetic construct |

SEQUENCE: 72
QQSHEDPY                                                                       8

| SEQ ID NO: 73 | moltype = AA length = 11 |
| --- | --- |
| FEATURE | Location/Qualifiers |
| source | 1..11 |
| | mol_type = protein |
| | organism = synthetic construct |

SEQUENCE: 73
GYDITQGYSW N                                                                  11

| SEQ ID NO: 74 | moltype = AA length = 16 |
| --- | --- |
| FEATURE | Location/Qualifiers |
| source | 1..16 |
| | mol_type = protein |
| | organism = synthetic construct |

SEQUENCE: 74
SIKYSGETKY NPSVKG                                                             16

| SEQ ID NO: 75 | moltype = AA length = 12 |
| --- | --- |
| FEATURE | Location/Qualifiers |
| source | 1..12 |
| | mol_type = protein |
| | organism = synthetic construct |

SEQUENCE: 75
GNNYFGHWHF AV                                                                 12

| SEQ ID NO: 76 | moltype = AA length = 17 |
| --- | --- |
| FEATURE | Location/Qualifiers |
| source | 1..17 |
| | mol_type = protein |
| | organism = synthetic construct |

SEQUENCE: 76
RASKSVDWEG DSYLNWY                                                            17

| SEQ ID NO: 77 | moltype = AA length = 7 |
| --- | --- |
| FEATURE | Location/Qualifiers |
| source | 1..7 |
| | mol_type = protein |
| | organism = synthetic construct |

SEQUENCE: 77
AASYLES                                                                        7

| SEQ ID NO: 78 | moltype = AA length = 8 |
| --- | --- |
| FEATURE | Location/Qualifiers |
| source | 1..8 |
| | mol_type = protein |
| | organism = synthetic construct |

SEQUENCE: 78

QQSHEDPY                                                                          8

SEQ ID NO: 79          moltype = AA   length = 11
FEATURE                Location/Qualifiers
source                 1..11
                       mol_type = protein
                       organism = synthetic construct SEQUENCE: 79
GYDITQGYSW N                                                                     11

SEQ ID NO: 80          moltype = AA   length = 16
FEATURE                Location/Qualifiers
source                 1..16
                       mol_type = protein
                       organism = synthetic construct SEQUENCE: 80
SITYSGSTNY NPSVKG                                                                16

SEQ ID NO: 81          moltype = AA   length = 12
FEATURE                Location/Qualifiers
source                 1..12
                       mol_type = protein
                       organism = synthetic construct SEQUENCE: 81
GNNYFGHWHF AV                                                                    12

SEQ ID NO: 82          moltype = AA   length = 17
FEATURE                Location/Qualifiers
source                 1..17
                       mol_type = protein
                       organism = synthetic construct SEQUENCE: 82
RASKSVDAEG DSYLNWY                                                               17

SEQ ID NO: 83          moltype = AA   length = 7
FEATURE                Location/Qualifiers
source                 1..7
                       mol_type = protein
                       organism = synthetic construct SEQUENCE: 83
AASYLES                                                                           7

SEQ ID NO: 84          moltype = AA   length = 8
FEATURE                Location/Qualifiers
source                 1..8
                       mol_type = protein
                       organism = synthetic construct SEQUENCE: 84
QQSHEDPY                                                                          8

SEQ ID NO: 85          moltype = AA   length = 11
FEATURE                Location/Qualifiers
source                 1..11
                       mol_type = protein
                       organism = synthetic construct SEQUENCE: 85
GYDITQGYSW N                                                                     11

SEQ ID NO: 86          moltype = AA   length = 16
FEATURE                Location/Qualifiers
source                 1..16
                       mol_type = protein
                       organism = synthetic construct SEQUENCE: 86
SITYSGSTNY NPSVKG                                                                16

SEQ ID NO: 87          moltype = AA   length = 12
FEATURE                Location/Qualifiers
source                 1..12
                       mol_type = protein
                       organism = synthetic construct SEQUENCE: 87
GNNYFGHWHF AV                                                                    12

SEQ ID NO: 88          moltype = AA   length = 17
FEATURE                Location/Qualifiers
source                 1..17
                       mol_type = protein
                       organism = synthetic construct

```
SEQUENCE: 88
RASKSVDAEG DSYLNWY                                                          17

SEQ ID NO: 89              moltype = AA  length = 7
FEATURE                    Location/Qualifiers
source                     1..7
                           mol_type = protein
                           organism = synthetic construct
SEQUENCE: 89
AASYLES                                                                      7

SEQ ID NO: 90              moltype = AA  length = 8
FEATURE                    Location/Qualifiers
source                     1..8
                           mol_type = protein
                           organism = synthetic construct
SEQUENCE: 90
QQSHEDPY                                                                     8

SEQ ID NO: 91              moltype = AA  length = 121
FEATURE                    Location/Qualifiers
source                     1..121
                           mol_type = protein
                           organism = synthetic construct
SEQUENCE: 91
EVQLVESGGG LVQPGGSLRL SCAVSGYDIT QGYSWNWIRQ APGKGLEWVA SIKYSGETKY            60
NPSVKGRITI SRDGSKNTFY LQMNSLRAED TAVYYCAKGN NYFGHWHFAV WGQGTLVTVS           120
S                                                                          121

SEQ ID NO: 92              moltype = AA  length = 114
FEATURE                    Location/Qualifiers
source                     1..114
                           mol_type = protein
                           organism = synthetic construct
SEQUENCE: 92
DIQLTQSPSS LSASVGDRVT ITCRASKSVD AEGDSYLNWY QQKPGKAPKL LIYAASYLES            60
GVPSRFSGSG SGTDFTLTIS SLQPEDFATY YCQQSHEDPY TFGQGTKVEI KRTV                 114

SEQ ID NO: 93              moltype = AA  length = 121
FEATURE                    Location/Qualifiers
source                     1..121
                           mol_type = protein
                           organism = synthetic construct
SEQUENCE: 93
EVQLVESGGG LVQPGGSLRL SCAVSGYDIT QGYSWNWIRQ APGKGLEWVA SIKYSGETKY            60
NPSVKGRITI SRDGSKNTFY LQMNSLRAED TAVYYCAKGN NYFGHWHFAV WGQGTLVTVS           120
S                                                                          121

SEQ ID NO: 94              moltype = AA  length = 114
FEATURE                    Location/Qualifiers
source                     1..114
                           mol_type = protein
                           organism = synthetic construct
SEQUENCE: 94
DIQLTQSPSS LSASVGDRVT ITCRASKSVD AEGDSYLNWY QQKPGKAPKL LIYAASYLES            60
GVPSRFSGSG SGTDFTLTIS SLQPEDFATY YCQQSHEDPY TFGQGTKVEI KRTV                 114

SEQ ID NO: 95              moltype = AA  length = 121
FEATURE                    Location/Qualifiers
source                     1..121
                           mol_type = protein
                           organism = synthetic construct
SEQUENCE: 95
EVQLVESGGG LVQPGGSLRL SCAVSGYDIT QGYSWNWIRQ APGKGLEWVA SIKYSGETKY            60
NPSVKGRITI SRDGSKNTFY LQMNSLRAED TAVYYCAKGN NYFGHWHFAV WGQGTLVTVS           120
S                                                                          121

SEQ ID NO: 96              moltype = AA  length = 114
FEATURE                    Location/Qualifiers
source                     1..114
                           mol_type = protein
                           organism = synthetic construct
SEQUENCE: 96
DIQLTQSPSS LSASVGDRVT ITCRASKSVD AEGDSYLNWY QQKPGKAPKL LIYAASYLES            60
GVPSRFSGSG SGTDFTLTIS SLQPEDFATY YCQQSHEDPY TFGQGTKVEI KRTV                 114

SEQ ID NO: 97              moltype = AA  length = 121
FEATURE                    Location/Qualifiers
source                     1..121
```

```
                        mol_type = protein
                        organism = synthetic construct
SEQUENCE: 97
EVQLVESGGG LVQPGGSLRL SCAVSGYDIT QGYSWNWIRQ APGKGLEWVA SVKYSGETKY    60
NPSVKGRITI SRDGSKNTFY LQMNSLRAED TAVYYCAKGN NYFGHWHFAV WGQGTLVTVS   120
S                                                                  121

SEQ ID NO: 98           moltype = AA   length = 114
FEATURE                 Location/Qualifiers
source                  1..114
                        mol_type = protein
                        organism = synthetic construct
SEQUENCE: 98
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTV         114

SEQ ID NO: 99           moltype = AA   length = 121
FEATURE                 Location/Qualifiers
source                  1..121
                        mol_type = protein
                        organism = synthetic construct
SEQUENCE: 99
EVQLVESGGG LVQPGGSLRL SCAVSGYDIT QGYSWNWIRQ APGKGLEWVA SVKYSGETKY    60
NPSVKGRITI SRDGSKNTFY LQMNSLRAED TAVYYCAKGN NYFGHWHFAV WGQGTLVTVS   120
S                                                                  121

SEQ ID NO: 100          moltype = AA   length = 114
FEATURE                 Location/Qualifiers
source                  1..114
                        mol_type = protein
                        organism = synthetic construct
SEQUENCE: 100
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTV         114

SEQ ID NO: 101          moltype = AA   length = 121
FEATURE                 Location/Qualifiers
source                  1..121
                        mol_type = protein
                        organism = synthetic construct
SEQUENCE: 101
EVQLVESGGG LVQPGGSLRL SCAVSGYDIT QGYSWNWIRQ APGKGLEWVA SVKYSGETKY    60
NPSVKGRITI SRDGSKNTFY LQMNSLRAED TAVYYCAKGN NYFGHWHFAV WGQGTLVTVS   120
S                                                                  121

SEQ ID NO: 102          moltype = AA   length = 114
FEATURE                 Location/Qualifiers
source                  1..114
                        mol_type = protein
                        organism = synthetic construct
SEQUENCE: 102
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTV         114

SEQ ID NO: 103          moltype = AA   length = 121
FEATURE                 Location/Qualifiers
source                  1..121
                        mol_type = protein
                        organism = synthetic construct
SEQUENCE: 103
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN NYFGHWHFAV WGQGTLVTVS   120
S                                                                  121

SEQ ID NO: 104          moltype = AA   length = 114
FEATURE                 Location/Qualifiers
source                  1..114
                        mol_type = protein
                        organism = synthetic construct
SEQUENCE: 104
DIQLTQSPSS LSASVGDRVT ITCRASKSVD AEGDSYMNWY QQKPGKAPKL LIYAASYLES    60
GVPSRFSGSG SGTDFTLTIS SLQPEDFATY YCQQSHEDPY TFGQGTKVEI KRTV         114

SEQ ID NO: 105          moltype = AA   length = 121
FEATURE                 Location/Qualifiers
source                  1..121
                        mol_type = protein
                        organism = synthetic construct
SEQUENCE: 105
```

```
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN NYFGHWHFAV WGQGTLVTVS   120
S                                                                  121

SEQ ID NO: 106          moltype = AA   length = 114
FEATURE                 Location/Qualifiers
source                  1..114
                        mol_type = protein
                        organism = synthetic construct
SEQUENCE: 106
DIQLTQSPSS LSASVGDRVT ITCRASKSVD AEGDSYMNWY QQKPGKAPKL LIYAASYLES    60
GVPSRFSGSG SGTDFTLTIS SLQPEDFATY YCQQSHEDPY TFGQGTKVEI KRTV         114

SEQ ID NO: 107          moltype = AA   length = 121
FEATURE                 Location/Qualifiers
source                  1..121
                        mol_type = protein
                        organism = synthetic construct
SEQUENCE: 107
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN NYFGHWHFAV WGQGTLVTVS   120
S                                                                  121

SEQ ID NO: 108          moltype = AA   length = 114
FEATURE                 Location/Qualifiers
source                  1..114
                        mol_type = protein
                        organism = synthetic construct
SEQUENCE: 108
DIQLTQSPSS LSASVGDRVT ITCRASKSVD AEGDSYMNWY QQKPGKAPKL LIYAASYLES    60
GVPSRFSGSG SGTDFTLTIS SLQPEDFATY YCQQSHEDPY TFGQGTKVEI KRTV         114

SEQ ID NO: 109          moltype = AA   length = 121
FEATURE                 Location/Qualifiers
source                  1..121
                        mol_type = protein
                        organism = synthetic construct
SEQUENCE: 109
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN NYFGHWHFAV WGQGTLVTVS   120
S                                                                  121

SEQ ID NO: 110          moltype = AA   length = 113
FEATURE                 Location/Qualifiers
source                  1..113
                        mol_type = protein
                        organism = synthetic construct
SEQUENCE: 110
DIQLTQSPSS LSASVGDRVT ITCRASKSVD TEGDSYLNWY QQKPGKAPKL LIYAASYLES    60
GVPSRFSGSG SGTDFTLTIS SLQPEDFATY YCQQSHEDPY TFGQGTKVEI KRT          113

SEQ ID NO: 111          moltype = AA   length = 121
FEATURE                 Location/Qualifiers
source                  1..121
                        mol_type = protein
                        organism = synthetic construct
SEQUENCE: 111
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN NYFGHWHFAV WGQGTLVTVS   120
S                                                                  121

SEQ ID NO: 112          moltype = AA   length = 114
FEATURE                 Location/Qualifiers
source                  1..114
                        mol_type = protein
                        organism = synthetic construct
SEQUENCE: 112
DIQLTQSPSS LSASVGDRVT ITCRASKSVD RQGDSYLNWY QQKPGKAPKL LIYAASYLES    60
GVPSRFSGSG SGTDFTLTIS SLQPEDFATY YCQQSHEDPY TFGQGTKVEI KRTV         114

SEQ ID NO: 113          moltype = AA   length = 121
FEATURE                 Location/Qualifiers
source                  1..121
                        mol_type = protein
                        organism = synthetic construct
SEQUENCE: 113
EVQLVESGGG LVQPGGSLRL SCAVSGYDIT QGYSWNWIRQ APGKGLEWVA SITYSGSTNY    60
NPSVKGRITI SRDGSKNTFY LQMNSLRAED TAVYYCAKGN NYFGHWHFAV WGQGTLVTVS   120
S                                                                  121
```

```
SEQ ID NO: 114          moltype = AA   length = 114
FEATURE                 Location/Qualifiers
source                  1..114
                        mol_type = protein
                        organism = synthetic construct
SEQUENCE: 114
DIQLTQSPSS LSASVGDRVT ITCRASKSVD AEGDSYLNWY QQKPGKAPKL LIYAASYLES       60
GVPSRFSGSG SGTDFTLTIS SLQPEDFATY YCQQSHEDPY TFGQGTKVEI KRTV             114

SEQ ID NO: 115          moltype = AA   length = 121
FEATURE                 Location/Qualifiers
source                  1..121
                        mol_type = protein
                        organism = synthetic construct
SEQUENCE: 115
EVQLVESGGG LVQPGGSLRL SCAVSGYDIT QGYSWNWIRQ APGKGLEWVA SIKYSGETKY       60
NPSVKGRITI SRDGSKNTFY LQMNSLRAED TAVYYCAKGN NYFGHWHFAV WGQGTLVTVS       120
S                                                                      121

SEQ ID NO: 116          moltype = AA   length = 114
FEATURE                 Location/Qualifiers
source                  1..114
                        mol_type = protein
                        organism = synthetic construct
SEQUENCE: 116
DIQLTQSPSS LSASVGDRVT ITCRASKSVD WEGDSYLNWY QQKPGKAPKL LIYAASYLES       60
GVPSRFSGSG SGTDFTLTIS SLQPEDFATY YCQQSHEDPY TFGQGTKVEI KRTV             114

SEQ ID NO: 117          moltype = AA   length = 121
FEATURE                 Location/Qualifiers
source                  1..121
                        mol_type = protein
                        organism = synthetic construct
SEQUENCE: 117
EVQLVESGGG LVQPGGSLRL SCAVSGYDIT QGYSWNWIRQ APGKGLEWVA SITYSGSTNY       60
NPSVKGRITI SRDGSKNTFY LQMNSLRAED TAVYYCAKGN NYFGHWHFAV WGQGTLVTVS       120
S                                                                      121

SEQ ID NO: 118          moltype = AA   length = 114
FEATURE                 Location/Qualifiers
source                  1..114
                        mol_type = protein
                        organism = synthetic construct
SEQUENCE: 118
DIQLTQSPSS LSASVGDRVT ITCRASKSVD AEGDSYLNWY QQKPGKAPKL LIYAASYLES       60
GVPSRFSGSG SGTDFTLTIS SLQPEDFATY YCQQSHEDPY TFGQGTKVEI KRTV             114

SEQ ID NO: 119          moltype = AA   length = 121
FEATURE                 Location/Qualifiers
source                  1..121
                        mol_type = protein
                        organism = synthetic construct
SEQUENCE: 119
EVQLVESGGG LVQPGGSLRL SCAVSGYDIT QGYSWNWIRQ APGKGLEWVA SITYSGSTNY       60
NPSVKGRITI SRDGSKNTFY LQMNSLRAED TAVYYCAKGN NYFGHWHFAV WGQGTLVTVS       120
S                                                                      121

SEQ ID NO: 120          moltype = AA   length = 114
FEATURE                 Location/Qualifiers
source                  1..114
                        mol_type = protein
                        organism = synthetic construct
SEQUENCE: 120
DIQLTQSPSS LSASVGDRVT ITCRASKSVD AEGDSYLNWY QQKPGKAPKL LIYAASYLES       60
GVPSRFSGSG SGTDFTLTIS SLQPEDFATY YCQQSHEDPY TFGQGTKVEI KRTV             114

SEQ ID NO: 121          moltype = AA   length = 451
FEATURE                 Location/Qualifiers
source                  1..451
                        mol_type = protein
                        organism = synthetic construct
SEQUENCE: 121
EVQLVESGGG LVQPGGSLRL SCAVSGYDIT QGYSWNWIRQ APGKGLEWVA SIKYSGETKY       60
NPSVKGRITI SRDGSKNTFY LQMNSLRAED TAVYYCAKGN NYFGHWHFAV WGQGTLVTVS       120
SASTKGPSVF PLAPSSKSTS GGTAALGCLV KDYFPEPVTV SWNSGALTSG VHTFPAVLQS       180
SGLYSLSSVV TVPSSSLGTQ TYICNVNHKP SNTKVDKKVE PKSCDKTHTC PPCPAPELLG       240
GPSVFLFPPK PKDTLMISRT PEVTCVVVDV SHEDPEVKFN WYVDGVEVHN AKTKPREEQY       300
NSTYRVVSVL TVLHQDWLNG KEYKCKVSNK ALPAPIEKTI SKAKGQPREP QVYTLPPSRE       360
```

```
EMTKNQVSLT CLVKGFYPSD IAVEWESNGQ PENNYKTTPP VLDSDGSFFL YSKLTVDKSR    420
WQQGNVFSCS VMHEALHNHY TQKSLSLSPG K                                  451

SEQ ID NO: 122           moltype = AA  length = 218
FEATURE                  Location/Qualifiers
source                   1..218
                         mol_type = protein
                         organism = synthetic construct
SEQUENCE: 122
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF    120
IFPPSDEQLK SGTASVVCLL NNFYPREAKV QWKVDNALQS GNSQESVTEQ DSKDSTYSLS    180
STLTLSKADY EKHKVYACEV THQGLSSPVT KSFNRGEC                            218

SEQ ID NO: 123           moltype = AA  length = 451
FEATURE                  Location/Qualifiers
source                   1..451
                         mol_type = protein
                         organism = synthetic construct
SEQUENCE: 123
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN NYFGHWHFAV WGQGTLVTVS    120
SASTKGPSVF PLAPSSKSTS GGTAALGCLV KDYFPEPVTV SWNSGALTSG VHTFPAVLQS    180
SGLYSLSSVV TVPSSSLGTQ TYICNVNHKP SNTKVDKKVE PKSCDKTHTC PPCPAPELLG    240
GPSVFLFPPK PKDTLYITRE PEVTCVVVDV SHEDPEVKFN WYVDGVEVHN AKTKPREEQY    300
NSTYRVVSVL TVLHQDWLNG KEYKCKVSNK ALPAPIEKTI SKAKGQPREP QVYTLPPSRE    360
EMTKNQVSLT CLVKGFYPSD IAVEWESNGQ PENNYKTTPP VLDSDGSFFL YSKLTVDKSR    420
WQQGNVFSCS VMHEALHNHY TQKSLSLSPG K                                  451

SEQ ID NO: 124           moltype = AA  length = 218
FEATURE                  Location/Qualifiers
source                   1..218
                         mol_type = protein
                         organism = synthetic construct
SEQUENCE: 124
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF    120
IFPPSDEQLK SGTASVVCLL NNFYPREAKV QWKVDNALQS GNSQESVTEQ DSKDSTYSLS    180
STLTLSKADY EKHKVYACEV THQGLSSPVT KSFNRGEC                            218

SEQ ID NO: 125           moltype = AA  length = 451
FEATURE                  Location/Qualifiers
source                   1..451
                         mol_type = protein
                         organism = synthetic construct
SEQUENCE: 125
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN NYFGHWHFAV WGQGTLVTVS    120
SASTKGPSVF PLAPSSKSTS GGTAALGCLV KDYFPEPVTV SWNSGALTSG VHTFPAVLQS    180
SGLYSLSSVV TVPSSSLGTQ TYICNVNHKP SNTKVDKKVE PKSCDKTHTC PPCPAPELLG    240
GPSVFLFPPK PKDTLMISRT PEVTCVVVDV SHEDPEVKFN WYVDGVEVHN AKTKPREEQY    300
NSTYRVVSVL TVLHQDWLNG KEYKCKVSNK ALPAPIEKTI SKAKGQPREP QVYTLPPSRE    360
EMTKNQVSLT CLVKGFYPSD IAVEWESNGQ PENNYKTTPP VLDSDGSFFL YSKLTVDKSR    420
WQQGNVFSCS VLHEALHSHY TQKSLSLSPG K                                  451

SEQ ID NO: 126           moltype = AA  length = 218
FEATURE                  Location/Qualifiers
source                   1..218
                         mol_type = protein
                         organism = synthetic construct
SEQUENCE: 126
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF    120
IFPPSDEQLK SGTASVVCLL NNFYPREAKV QWKVDNALQS GNSQESVTEQ DSKDSTYSLS    180
STLTLSKADY EKHKVYACEV THQGLSSPVT KSFNRGEC                            218

SEQ ID NO: 127           moltype = AA  length = 451
FEATURE                  Location/Qualifiers
source                   1..451
                         mol_type = protein
                         organism = synthetic construct
SEQUENCE: 127
EVQLVESGGG LVQPGGSLRL SCAVSGYDIT QGYSWNWIRQ APGKGLEWVA SVKYSGETKY    60
NPSVKGRITI SRDGSKNTFY LQMNSLRAED TAVYYCAKGN NYFGHWHFAV WGQGTLVTVS    120
SASTKGPSVF PLAPSSKSTS GGTAALGCLV KDYFPEPVTV SWNSGALTSG VHTFPAVLQS    180
SGLYSLSSVV TVPSSSLGTQ TYICNVNHKP SNTKVDKKVE PKSCDKTHTC PPCPAPELLG    240
GPSVFLFPPK PKDTLMISRT PEVTCVVVDV SHEDPEVKFN WYVDGVEVHN AKTKPREEQY    300
NSTYRVVSVL TVLHQDWLNG KEYKCKVSNK ALPAPIEKTI SKAKGQPREP QVYTLPPSRE    360
EMTKNQVSLT CLVKGFYPSD IAVEWESNGQ PENNYKTTPP VLDSDGSFFL YSKLTVDKSR    420
```

```
WQQGNVFSCS VMHEALHNHY TQKSLSLSPG K                                    451

SEQ ID NO: 128          moltype = AA  length = 218
FEATURE                 Location/Qualifiers
source                  1..218
                        mol_type = protein
                        organism = synthetic construct
SEQUENCE: 128
DIQLTQSPSS LSASVGDRVT ITCRASKSVD AEGDSYLNWY QQKPGKAPKL LIYAASYLES      60
GVPSRFSGSG SGTDFTLTIS SLQPEDFATY YCQQSHEDPY TFGQGTKVEI KRTVAAPSVF     120
IFPPSDEQLK SGTASVVCLL NNFYPREAKV QWKVDNALQS GNSQESVTEQ DSKDSTYSLS     180
STLTLSKADY EKHKVYACEV THQGLSSPVT KSFNRGEC                             218

SEQ ID NO: 129          moltype = AA  length = 451
FEATURE                 Location/Qualifiers
source                  1..451
                        mol_type = protein
                        organism = synthetic construct
SEQUENCE: 129
EVQLVESGGG LVQPGGSLRL SCAVSGYDIT QGYSWNWIRQ APGKGLEWVA SVKYSGETKY      60
NPSVKGRITI SRDGSKNTFY LQMNSLRAED TAVYYCAKGN NYFGHWHFAV WGQGTLVTVS     120
SASTKGPSVF PLAPSSKSTS GGTAALGCLV KDYFPEPVTV SWNSGALTSG VHTFPAVLQS     180
SGLYSLSSVV TVPSSSLGTQ TYICNVNHKP SNTKVDKKVE PKSCDKTHTC PPCPAPELLG     240
GPSVFLFPPK PKDTLYITRE PEVTCVVVDV SHEDPEVKFN WYVDGVEVHN AKTKPREEQY     300
NSTYRVVSVL TVLHQDWLNG KEYKCKVSNK ALPAPIEKTI SKAKGQPREP QVYTLPPSRE     360
EMTKNQVSLT CLVKGFYPSD IAVEWESNGQ PENNYKTTPP VLDSDGSFFL YSKLTVDKSR     420
WQQGNVFSCS VMHEALHNHY TQKSLSLSPG K                                    451

SEQ ID NO: 130          moltype = AA  length = 218
FEATURE                 Location/Qualifiers
source                  1..218
                        mol_type = protein
                        organism = synthetic construct
SEQUENCE: 130
DIQLTQSPSS LSASVGDRVT ITCRASKSVD AEGDSYLNWY QQKPGKAPKL LIYAASYLES      60
GVPSRFSGSG SGTDFTLTIS SLQPEDFATY YCQQSHEDPY TFGQGTKVEI KRTVAAPSVF     120
IFPPSDEQLK SGTASVVCLL NNFYPREAKV QWKVDNALQS GNSQESVTEQ DSKDSTYSLS     180
STLTLSKADY EKHKVYACEV THQGLSSPVT KSFNRGEC                             218

SEQ ID NO: 131          moltype = AA  length = 451
FEATURE                 Location/Qualifiers
source                  1..451
                        mol_type = protein
                        organism = synthetic construct
SEQUENCE: 131
EVQLVESGGG LVQPGGSLRL SCAVSGYDIT QGYSWNWIRQ APGKGLEWVA SVKYSGETKY      60
NPSVKGRITI SRDGSKNTFY LQMNSLRAED TAVYYCAKGN NYFGHWHFAV WGQGTLVTVS     120
SASTKGPSVF PLAPSSKSTS GGTAALGCLV KDYFPEPVTV SWNSGALTSG VHTFPAVLQS     180
SGLYSLSSVV TVPSSSLGTQ TYICNVNHKP SNTKVDKKVE PKSCDKTHTC PPCPAPELLG     240
GPSVFLFPPK PKDTLMISRT PEVTCVVVDV SHEDPEVKFN WYVDGVEVHN AKTKPREEQY     300
NSTYRVVSVL TVLHQDWLNG KEYKCKVSNK ALPAPIEKTI SKAKGQPREP QVYTLPPSRE     360
EMTKNQVSLT CLVKGFYPSD IAVEWESNGQ PENNYKTTPP VLDSDGSFFL YSKLTVDKSR     420
WQQGNVFSCS VLHEALHSHY TQKSLSLSPG K                                    451

SEQ ID NO: 132          moltype = AA  length = 218
FEATURE                 Location/Qualifiers
source                  1..218
                        mol_type = protein
                        organism = synthetic construct
SEQUENCE: 132
DIQLTQSPSS LSASVGDRVT ITCRASKSVD AEGDSYLNWY QQKPGKAPKL LIYAASYLES      60
GVPSRFSGSG SGTDFTLTIS SLQPEDFATY YCQQSHEDPY TFGQGTKVEI KRTVAAPSVF     120
IFPPSDEQLK SGTASVVCLL NNFYPREAKV QWKVDNALQS GNSQESVTEQ DSKDSTYSLS     180
STLTLSKADY EKHKVYACEV THQGLSSPVT KSFNRGEC                             218

SEQ ID NO: 133          moltype = AA  length = 451
FEATURE                 Location/Qualifiers
source                  1..451
                        mol_type = protein
                        organism = synthetic construct
SEQUENCE: 133
EVQLVESGGG LVQPGGSLRL SCAVSGYDIT QGYSWNWIRQ APGKGLEWVA SIKYSGETKY      60
NPSVKGRITI SRDGSKNTFY LQMNSLRAED TAVYYCAKGN NYFGHWHFAV WGQGTLVTVS     120
SASTKGPSVF PLAPSSKSTS GGTAALGCLV KDYFPEPVTV SWNSGALTSG VHTFPAVLQS     180
SGLYSLSSVV TVPSSSLGTQ TYICNVNHKP SNTKVDKKVE PKSCDKTHTC PPCPAPELLG     240
GPSVFLFPPK PKDTLMISRT PEVTCVVVDV SHEDPEVKFN WYVDGVEVHN AKTKPREEQY     300
NSTYRVVSVL TVLHQDWLNG KEYKCKVSNK ALPAPIEKTI SKAKGQPREP QVYTLPPSRE     360
EMTKNQVSLT CLVKGFYPSD IAVEWESNGQ PENNYKTTPP VLDSDGSFFL YSKLTVDKSR     420
WQQGNVFSCS VMHEALHNHY TQKSLSLSPG K                                    451
```

```
SEQ ID NO: 134           moltype = AA  length = 218
FEATURE                  Location/Qualifiers
source                   1..218
                         mol_type = protein
                         organism = synthetic construct
SEQUENCE: 134
DIQLTQSPSS LSASVGDRVT ITCRASKSVD AEGDSYMNWY QQKPGKAPKL LIYAASYLES    60
GVPSRFSGSG SGTDFTLTIS SLQPEDFATY YCQQSHEDFY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 135           moltype = AA  length = 451
FEATURE                  Location/Qualifiers
source                   1..451
                         mol_type = protein
                         organism = synthetic construct
SEQUENCE: 135
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLYITRE PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451

SEQ ID NO: 136           moltype = AA  length = 218
FEATURE                  Location/Qualifiers
source                   1..218
                         mol_type = protein
                         organism = synthetic construct
SEQUENCE: 136
DIQLTQSPSS LSASVGDRVT ITCRASKSVD AEGDSYMNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 137           moltype = AA  length = 451
FEATURE                  Location/Qualifiers
source                   1..451
                         mol_type = protein
                         organism = synthetic construct
SEQUENCE: 137
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VLHEALHSHY TQKSLSLSPG K                                  451

SEQ ID NO: 138           moltype = AA  length = 218
FEATURE                  Location/Qualifiers
source                   1..218
                         mol_type = protein
                         organism = synthetic construct
SEQUENCE: 138
DIQLTQSPSS LSASVGDRVT ITCRASKSVD AEGDSYMNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 139           moltype = AA  length = 451
FEATURE                  Location/Qualifiers
source                   1..451
                         mol_type = protein
                         organism = synthetic construct
SEQUENCE: 139
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451
```

```
SEQ ID NO: 140              moltype = AA  length = 218
FEATURE                     Location/Qualifiers
source                      1..218
                            mol_type = protein
                            organism = synthetic construct
SEQUENCE: 140
DIQLTQSPSS LSASVGDRVT ITCRASKSVD TEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 141              moltype = AA  length = 451
FEATURE                     Location/Qualifiers
source                      1..451
                            mol_type = protein
                            organism = synthetic construct
SEQUENCE: 141
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451

SEQ ID NO: 142              moltype = AA  length = 218
FEATURE                     Location/Qualifiers
source                      1..218
                            mol_type = protein
                            organism = synthetic construct
SEQUENCE: 142
DIQLTQSPSS LSASVGDRVT ITCRASKSVD RQGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 143              moltype = AA  length = 451
FEATURE                     Location/Qualifiers
source                      1..451
                            mol_type = protein
                            organism = synthetic construct
SEQUENCE: 143
EVQLVESGGG LVQPGGSLRL SCAVSGYDIT QGYSWNWIRQ APGKGLEWVA SITYSGSTNY    60
NPSVKGRITI SRDGSKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451

SEQ ID NO: 144              moltype = AA  length = 218
FEATURE                     Location/Qualifiers
source                      1..218
                            mol_type = protein
                            organism = synthetic construct
SEQUENCE: 144
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 145              moltype = AA  length = 451
FEATURE                     Location/Qualifiers
source                      1..451
                            mol_type = protein
                            organism = synthetic construct
SEQUENCE: 145
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451

SEQ ID NO: 146              moltype = AA  length = 218
```

```
FEATURE             Location/Qualifiers
source              1..218
                    mol_type = protein
                    organism = synthetic construct
SEQUENCE: 146
DIQLTQSPSS LSASVGDRVT ITCRASKSVD WEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 147      moltype = AA   length = 451
FEATURE             Location/Qualifiers
source              1..451
                    mol_type = protein
                    organism = synthetic construct
SEQUENCE: 147
EVQLVESGGG LVQPGGSLRL SCAVSGYDIT QGYSWNWIRQ APGKGLEWVA SITYSGSTNY    60
NPSVKGRITI SRDGSKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VLHEALHSHY TQKSLSLSPG K                                  451

SEQ ID NO: 148      moltype = AA   length = 218
FEATURE             Location/Qualifiers
source              1..218
                    mol_type = protein
                    organism = synthetic construct
SEQUENCE: 148
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 149      moltype = AA   length = 451
FEATURE             Location/Qualifiers
source              1..451
                    mol_type = protein
                    organism = synthetic construct
SEQUENCE: 149
EVQLVESGGG LVQPGGSLRL SCAVSGYDIT QGYSWNWIRQ APGKGLEWVA SITYSGSTNY    60
NPSVKGRITI SRDGSKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLYITRE PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451

SEQ ID NO: 150      moltype = AA   length = 218
FEATURE             Location/Qualifiers
source              1..218
                    mol_type = protein
                    organism = synthetic construct
SEQUENCE: 150
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 151      moltype = AA   length = 451
FEATURE             Location/Qualifiers
source              1..451
                    mol_type = protein
                    organism = synthetic construct
SEQUENCE: 151
EVQLVESGGG LVQPGGSLRL SCAVSGYSIT SGYSWNWIRQ APGKGLEWVA SITYDGSTNY    60
NPSVKGRITI SRDDSKNTFY LQMNSLRAED TAVYYCARGS HYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451

SEQ ID NO: 152      moltype = AA   length = 218
FEATURE             Location/Qualifiers
```

```
source                   1..218
                         mol_type = protein
                         organism = synthetic construct
SEQUENCE: 152
DIQLTQSPSS LSASVGDRVT ITCRASQSVD YDGDSYMNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 153           moltype = AA   length = 452
FEATURE                  Location/Qualifiers
source                   1..452
                         mol_type = protein
                         organism = synthetic construct
SEQUENCE: 153
QVQLVQSGAE VMKPGSSVKV SCKASGYTFS WYWLEWVRQA PGHGLEWMGE IDPGTFTTNY    60
NEKFKARVTF TADTSTSTAY MELSSLRSED TAVYYCARFS HFSGSNYDYF DYWGQGTLVT   120
VSSASTKGPS VFPLAPSSKS TSGGTAALGC LVKDYFPEPV TVSWNSGALT SGVHTFPAVL   180
QSSGLYSLSS VVTVPSSSLG TQTYICNVNH KPSNTKVDKK VEPKSCDKTH TCPPCPAPEL   240
LGGPSVFLFP PKPKDTLMIS RTPEVTCVVV DVSHEDPEVK FNWYVDGVEV HNAKTKPREE   300
QYNSTYRVVS VLTVLHQDWL NGKEYKCKVS NKALPAPIEK TISKAKGQPR EPQVYTLPPS   360
RDELTKNQVS LTCLVKGFYP SDIAVEWESN GQPENNYKTT PPVLDSDGSF FLYSKLTVDK   420
SRWQQGNVFS CSVMHEALHN HYTQKSLSLS PG                                 452

SEQ ID NO: 154           moltype = AA   length = 214
FEATURE                  Location/Qualifiers
source                   1..214
                         mol_type = protein
                         organism = synthetic construct
SEQUENCE: 154
EIVMTQSPAT LSVSPGERAT LSCRASQSIG TNIHWYQQKP GQAPRLLIYY ASESISGIPA    60
RFSGSGSGTE FTLTISSLQS EDFAVYYCQQ SWSWPTTFGG GTKVEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214

SEQ ID NO: 155           moltype = AA   length = 451
FEATURE                  Location/Qualifiers
source                   1..451
                         mol_type = protein
                         organism = synthetic construct
SEQUENCE: 155
EVQLVESGGG LVQPGGSLRL SCAVSGYSIT SGYSWNWIRQ APGKGLEWVA SIKYSGETKY    60
NPSVKGRITI SRDDSKNTFY LQMNSLRAED TAVYYCARGS HYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451

SEQ ID NO: 156           moltype = AA   length = 218
FEATURE                  Location/Qualifiers
source                   1..218
                         mol_type = protein
                         organism = synthetic construct
SEQUENCE: 156
DIQLTQSPSS LSASVGDRVT ITCRASKPVD GEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 157           moltype = AA   length = 453
FEATURE                  Location/Qualifiers
source                   1..453
                         mol_type = protein
                         organism = synthetic construct
SEQUENCE: 157
EVQLVESGGG LVQPDGSLRL SCAVSGYDIT DGYSWNWIRQ TPGKGLEWVA SVTYDGSTNY    60
NPSVKGRITI SRDGSKNTFY LQMNSLRAED TAVYYCAKGN NYFGHWHFAV WGQGTLVTVS   120
GGSASTKGPS VFPLAPSSKS TSGGTAALGC LVKDYFPEPV TVSWNSGALT SGVHTFPAVL   180
QSSGLYSLSS VVTVPSSSLG TQTYICNVNH KPSNTKVDKK VEPKSCDKTH TCPPCPAPEL   240
LGGPSVFLFP PKPKDTLMIS RTPEVTCVVV DVSHEDPEVK FNWYVDGVEV HNAKTKPREE   300
QYNSTYRVVS VLTVLHQDWL NGKEYKCKVS NKALPAPIEK TISKAKGQPR EPQVYTLPPS   360
REEMTKNQVS LTCLVKGFYP SDIAVEWESN GQPENNYKTT PPVLDSDGSF FLYSKLTVDK   420
SRWQQGNVFS CSVMHEALHN HYTQKSLSLS PGK                                453

SEQ ID NO: 158           moltype = AA   length = 220
FEATURE                  Location/Qualifiers
source                   1..220
```

```
                         mol_type = protein
                         organism = synthetic construct
SEQUENCE: 158
DIQLTQSPSS LSASVGDRVT ITCRASKSVD ADGDSYMNWY QAKPGRHPKL LIYAASYLES     60
GVPSRFSGSG SGTDFTLTIS SLQPEDFATY YCQQSHEDPY TFGQGTKVEI KGGRTVAAPS    120
VFIFPPSDEQ LKSGTASVVC LLNNFYPREA KVQWKVDNAL QSGNSQESVT EQDSKDSTYS    180
LSSTLTLSKA DYEKHKVYAC EVTHQGLSSP VTKSFNRGEC                          220

SEQ ID NO: 159           moltype = AA  length = 452
FEATURE                  Location/Qualifiers
source                   1..452
                         mol_type = protein
                         organism = synthetic construct
SEQUENCE: 159
EVQLVESGGG LVQPDGSLRL SCAVSGYDIT DGYSWNWIRQ TPGKGLEWVA SVTYDGSTNY     60
NPSVKGRITI SRDGSKNTFY LQMNSLRAED TAVYYCAKGN NYFGHWHFAV WGQGTLVTVS    120
GSASTKGPSV FPLAPSSKST SGGTAALGCL VKDYFPEPVT VSWNSGALTS GVHTFPAVLQ    180
SSGLYSLSSV VTVPSSSLGT QTYICNVNHK PSNTKVDKKV EPKSCDKTHT CPPCPAPELL    240
GGPSVFLFPP KPKDTLMISR TPEVTCVVVD VSHEDPEVKF NWYVDGVEVH NAKTKPREEQ    300
YNSTYRVVSV LTVLHQDWLN GKEYKCKVSN KALPAPIEKT ISKAKGQPRE PQVYTLPPSR    360
EEMTKNQVSL TCLVKGFYPS DIAVEWESNG QPENNYKTTP PVLDSDGSFF LYSKLTVDKS    420
RWQQGNVFSC SVMHEALHNH YTQKSLSLSP GK                                  452

SEQ ID NO: 160           moltype = AA  length = 219
FEATURE                  Location/Qualifiers
source                   1..219
                         mol_type = protein
                         organism = synthetic construct
SEQUENCE: 160
DIQLTQSPSS LSASVGDRVT ITCRASKSVD ADGDSYMNWY QAKPGRHPKL LIYAASYLES     60
GVPSRFSGSG SGTDFTLTIS SLQPEDFATY YCQQSHEDPY TFGQGTKVEI KGRTVAAPSV    120
FIFPPSDEQL KSGTASVVCL LNNFYPREAK VQWKVDNALQ SGNSQESVTE QDSKDSTYSL    180
SSTLTLSKAD YEKHKVYACE VTHQGLSSPV TKSFNRGEC                           219

SEQ ID NO: 161           moltype = AA  length = 451
FEATURE                  Location/Qualifiers
source                   1..451
                         mol_type = protein
                         organism = synthetic construct
SEQUENCE: 161
EVQLVESGGG LVQPDGSLRL SCAVSGYDIT DGYSWNWIRQ TPGKGLEWVA SVTYDGSTNY     60
NPSVKGRITI SRDGSKNTFY LQMNSLRAED TAVYYCAKGN NYFGHWHFAV WGQGTLVTVS    120
SASTKGPSVF PLAPSSKSTS GGTAALGCLV KDYFPEPVTV SWNSGALTSG VHTFPAVLQS    180
SGLYSLSSVV TVPSSSLGTQ TYICNVNHKP SNTKVDKKVE PKSCDKTHTC PPCPAPELLG    240
GPSVFLFPPK PKDTLMISRT PEVTCVVVDV SHEDPEVKFN WYVDGVEVHN AKTKPREEQY    300
NSTYRVVSVL TVLHQDWLNG KEYKCKVSNK ALPAPIEKTI SKAKGQPREP QVYTLPPSRE    360
EMTKNQVSLT CLVKGFYPSD IAVEWESNGQ PENNYKTTPP VLDSDGSFFL YSKLTVDKSR    420
WQQGNVFSCS VMHEALHNHY TQKSLSLSPG K                                   451

SEQ ID NO: 162           moltype = AA  length = 218
FEATURE                  Location/Qualifiers
source                   1..218
                         mol_type = protein
                         organism = synthetic construct
SEQUENCE: 162
DIQLTQSPSS LSASVGDRVT ITCRASKSVD ADGDSYMNWY QAKPGRHPKL LIYAASYLES     60
GVPSRFSGSG SGTDFTLTIS SLQPEDFATY YCQQSHEDPY TFGQGTKVEI KRTVAAPSVF    120
IFPPSDEQLK SGTASVVCLL NNFYPREAKV QWKVDNALQS GNSQESVTEQ DSKDSTYSLS    180
STLTLSKADY EKHKVYACEV THQGLSSPVT KSFNRGEC                            218

SEQ ID NO: 163           moltype = AA  length = 428
FEATURE                  Location/Qualifiers
source                   1..428
                         mol_type = protein
                         organism = Homo sapiens
SEQUENCE: 163
ASTQSPSVFP LTRCCKNIPS NATSVTLGCL ATGYFPEPVM VTWDTGSLNG TTMTLPATTL     60
TLSGHYATIS LLTVSGAWAK QMFTCRVAHT PSSTDWVDNK TFSVCSRDFT PPTVKILQSS    120
CDGGGHFPPT IQLLCLVSGY TPGTINITWL EDGQVMDVDL STASTTQEGE LASTQSELTL    180
SQKHWLSDRT YTCQVTYQGH TFEDSTKKCA DSNPRGVSAY LSRPSPFDLF IRKSPTITCL    240
VVDLAPSKGT VNLTWSRASG KPVNHSTRKE EKQRNGTLTV TSTLPVGTRD WIEGETYQCR    300
VTHPHLPRAL MRSTTKTSGP RAAPEVYAFA TPEWPGSRDK RTLACLIQNF MPEDISVQWL    360
HNEVQLPDAR HSTTQPRKTK GSGFFVFSRL EVTRAEWEQK DEFICRAVHE AASPSQTVQR    420
AVSVNPGK                                                             428

SEQ ID NO: 164           moltype =    length =
SEQUENCE: 164
000
```

| | | |
|---|---|---|
| SEQ ID NO: 165<br>SEQUENCE: 165<br>000 | moltype = | length = |
| SEQ ID NO: 166<br>SEQUENCE: 166<br>000 | moltype = | length = |
| SEQ ID NO: 167<br>SEQUENCE: 167<br>000 | moltype = | length = |
| SEQ ID NO: 168<br>SEQUENCE: 168<br>000 | moltype = | length = |
| SEQ ID NO: 169<br>SEQUENCE: 169<br>000 | moltype = | length = |
| SEQ ID NO: 170<br>SEQUENCE: 170<br>000 | moltype = | length = |
| SEQ ID NO: 171<br>SEQUENCE: 171<br>000 | moltype = | length = |
| SEQ ID NO: 172<br>SEQUENCE: 172<br>000 | moltype = | length = |
| SEQ ID NO: 173<br>SEQUENCE: 173<br>000 | moltype = | length = |
| SEQ ID NO: 174<br>SEQUENCE: 174<br>000 | moltype = | length = |
| SEQ ID NO: 175<br>SEQUENCE: 175<br>000 | moltype = | length = |
| SEQ ID NO: 176<br>SEQUENCE: 176<br>000 | moltype = | length = |
| SEQ ID NO: 177<br>SEQUENCE: 177<br>000 | moltype = | length = |
| SEQ ID NO: 178<br>SEQUENCE: 178<br>000 | moltype = | length = |
| SEQ ID NO: 179<br>SEQUENCE: 179<br>000 | moltype = | length = |
| SEQ ID NO: 180<br>SEQUENCE: 180<br>000 | moltype = | length = |
| SEQ ID NO: 181<br>SEQUENCE: 181<br>000 | moltype = | length = |
| SEQ ID NO: 182<br>SEQUENCE: 182<br>000 | moltype = | length = |
| SEQ ID NO: 183<br>SEQUENCE: 183<br>000 | moltype = | length = |
| SEQ ID NO: 184<br>SEQUENCE: 184<br>000 | moltype = | length = |

```
SEQ ID NO: 185          moltype =   length =
SEQUENCE: 185
000

SEQ ID NO: 186          moltype =   length =
SEQUENCE: 186
000

SEQ ID NO: 187          moltype =   length =
SEQUENCE: 187
000

SEQ ID NO: 188          moltype =   length =
SEQUENCE: 188
000

SEQ ID NO: 189          moltype =   length =
SEQUENCE: 189
000

SEQ ID NO: 190          moltype =   length =
SEQUENCE: 190
000

SEQ ID NO: 191          moltype =   length =
SEQUENCE: 191
000

SEQ ID NO: 192          moltype =   length =
SEQUENCE: 192
000

SEQ ID NO: 193          moltype =   length =
SEQUENCE: 193
000

SEQ ID NO: 194          moltype =   length =
SEQUENCE: 194
000

SEQ ID NO: 195          moltype =   length =
SEQUENCE: 195
000

SEQ ID NO: 196          moltype =   length =
SEQUENCE: 196
000

SEQ ID NO: 197          moltype =   length =
SEQUENCE: 197
000

SEQ ID NO: 198          moltype =   length =
SEQUENCE: 198
000

SEQ ID NO: 199          moltype =   length =
SEQUENCE: 199
000

SEQ ID NO: 200          moltype =   length =
SEQUENCE: 200
000

SEQ ID NO: 201          moltype = AA   length = 11
FEATURE                 Location/Qualifiers
source                  1..11
                        mol_type = protein
                        organism = synthetic construct
VARIANT                 3
                        note = D, S or N
VARIANT                 6
                        note = Q, S, E, or D
SEQUENCE: 201
GYXITXGYSW N                                                                  11

SEQ ID NO: 202          moltype = AA   length = 16
FEATURE                 Location/Qualifiers
```

| | | |
|---|---|---|
| source | 1..16 | |
| | mol_type = protein | |
| | organism = synthetic construct | |
| VARIANT | 2 | |
| | note = I or V | |
| VARIANT | 3 | |
| | note = K or T | |
| VARIANT | 7 | |
| | note = E or S | |
| VARIANT | 9 | |
| | note = N or K | |
| SEQUENCE: 202 | | |
| SXXYSGXTXY NPSVKG | | 16 |
| | | |
| SEQ ID NO: 203 | moltype = AA   length = 12 | |
| FEATURE | Location/Qualifiers | |
| source | 1..12 | |
| | mol_type = protein | |
| | organism = synthetic construct | |
| VARIANT | 2 | |
| | note = N, S, D, or K | |
| VARIANT | 3 | |
| | note = N or H | |
| SEQUENCE: 203 | | |
| GXXYFGHWHF AV | | 12 |
| | | |
| SEQ ID NO: 204 | moltype = AA   length = 17 | |
| FEATURE | Location/Qualifiers | |
| source | 1..17 | |
| | mol_type = protein | |
| | organism = synthetic construct | |
| VARIANT | 8 | |
| | note = A, S, G, E, or D | |
| VARIANT | 9 | |
| | note = E or Q | |
| VARIANT | 14 | |
| | note = L or M | |
| SEQUENCE: 204 | | |
| RASKSVDXXG DSYXNWY | | 17 |
| | | |
| SEQ ID NO: 205 | moltype = AA   length = 7 | |
| FEATURE | Location/Qualifiers | |
| source | 1..7 | |
| | mol_type = protein | |
| | organism = synthetic construct | |
| SEQUENCE: 205 | | |
| AASYLES | | 7 |
| | | |
| SEQ ID NO: 206 | moltype = AA   length = 8 | |
| FEATURE | Location/Qualifiers | |
| source | 1..8 | |
| | mol_type = protein | |
| | organism = synthetic construct | |
| SEQUENCE: 206 | | |
| QQSHEDPY | | 8 |
| | | |
| SEQ ID NO: 207 | moltype = AA   length = 11 | |
| FEATURE | Location/Qualifiers | |
| source | 1..11 | |
| | mol_type = protein | |
| | organism = synthetic construct | |
| VARIANT | 3 | |
| | note = S or N | |
| SEQUENCE: 207 | | |
| GYXITQGYSW N | | 11 |
| | | |
| SEQ ID NO: 208 | moltype = AA   length = 16 | |
| FEATURE | Location/Qualifiers | |
| source | 1..16 | |
| | mol_type = protein | |
| | organism = synthetic construct | |
| SEQUENCE: 208 | | |
| SIKYSGETKY NPSVKG | | 16 |
| | | |
| SEQ ID NO: 209 | moltype = AA   length = 12 | |
| FEATURE | Location/Qualifiers | |
| source | 1..12 | |
| | mol_type = protein | |
| | organism = synthetic construct | |

```
SEQUENCE: 209
GNNYFGHWHF AV                                                            12

SEQ ID NO: 210         moltype = AA  length = 17
FEATURE                Location/Qualifiers
source                 1..17
                       mol_type = protein
                       organism = synthetic construct
SEQUENCE: 210
RASKSVDAEG DSYLNWY                                                       17

SEQ ID NO: 211         moltype = AA  length = 7
FEATURE                Location/Qualifiers
source                 1..7
                       mol_type = protein
                       organism = synthetic construct
SEQUENCE: 211
AASYLES                                                                   7

SEQ ID NO: 212         moltype = AA  length = 8
FEATURE                Location/Qualifiers
source                 1..8
                       mol_type = protein
                       organism = synthetic construct
SEQUENCE: 212
QQSHEDPY                                                                  8

SEQ ID NO: 213         moltype = AA  length = 11
FEATURE                Location/Qualifiers
source                 1..11
                       mol_type = protein
                       organism = synthetic construct
VARIANT                6
                       note = S, E, or D
SEQUENCE: 213
GYDITXGYSW N                                                             11

SEQ ID NO: 214         moltype = AA  length = 16
FEATURE                Location/Qualifiers
source                 1..16
                       mol_type = protein
                       organism = synthetic construct
SEQUENCE: 214
SIKYSGETKY NPSVKG                                                        16

SEQ ID NO: 215         moltype = AA  length = 12
FEATURE                Location/Qualifiers
source                 1..12
                       mol_type = protein
                       organism = synthetic construct
SEQUENCE: 215
GNNYFGHWHF AV                                                            12

SEQ ID NO: 216         moltype = AA  length = 17
FEATURE                Location/Qualifiers
source                 1..17
                       mol_type = protein
                       organism = synthetic construct
SEQUENCE: 216
RASKSVDAEG DSYLNWY                                                       17

SEQ ID NO: 217         moltype = AA  length = 7
FEATURE                Location/Qualifiers
source                 1..7
                       mol_type = protein
                       organism = synthetic construct
SEQUENCE: 217
AASYLES                                                                   7

SEQ ID NO: 218         moltype = AA  length = 8
FEATURE                Location/Qualifiers
source                 1..8
                       mol_type = protein
                       organism = synthetic construct
SEQUENCE: 218
QQSHEDPY                                                                  8

SEQ ID NO: 219         moltype = AA  length = 11
FEATURE                Location/Qualifiers
```

```
source                  1..11
                        mol_type = protein
                        organism = synthetic construct
SEQUENCE: 219
GYDITQGYSW N                                                                    11

SEQ ID NO: 220          moltype = AA   length = 16
FEATURE                 Location/Qualifiers
source                  1..16
                        mol_type = protein
                        organism = synthetic construct
SEQUENCE: 220
SVKYSGETKY NPSVKG                                                               16

SEQ ID NO: 221          moltype = AA   length = 12
FEATURE                 Location/Qualifiers
source                  1..12
                        mol_type = protein
                        organism = synthetic construct
SEQUENCE: 221
GNNYFGHWHF AV                                                                   12

SEQ ID NO: 222          moltype = AA   length = 17
FEATURE                 Location/Qualifiers
source                  1..17
                        mol_type = protein
                        organism = synthetic construct
SEQUENCE: 222
RASKSVDAEG DSYLNWY                                                              17

SEQ ID NO: 223          moltype = AA   length = 7
FEATURE                 Location/Qualifiers
source                  1..7
                        mol_type = protein
                        organism = synthetic construct
SEQUENCE: 223
AASYLES                                                                         7

SEQ ID NO: 224          moltype = AA   length = 8
FEATURE                 Location/Qualifiers
source                  1..8
                        mol_type = protein
                        organism = synthetic construct
SEQUENCE: 224
QQSHEDPY                                                                        8

SEQ ID NO: 225          moltype = AA   length = 11
FEATURE                 Location/Qualifiers
source                  1..11
                        mol_type = protein
                        organism = synthetic construct
SEQUENCE: 225
GYDITQGYSW N                                                                    11

SEQ ID NO: 226          moltype = AA   length = 16
FEATURE                 Location/Qualifiers
source                  1..16
                        mol_type = protein
                        organism = synthetic construct
SEQUENCE: 226
SITYSGSTNY NPSVKG                                                               16

SEQ ID NO: 227          moltype = AA   length = 12
FEATURE                 Location/Qualifiers
source                  1..12
                        mol_type = protein
                        organism = synthetic construct
SEQUENCE: 227
GNNYFGHWHF AV                                                                   12

SEQ ID NO: 228          moltype = AA   length = 17
FEATURE                 Location/Qualifiers
source                  1..17
                        mol_type = protein
                        organism = synthetic construct
SEQUENCE: 228
RASKSVDAEG DSYLNWY                                                              17

SEQ ID NO: 229          moltype = AA   length = 7
```

```
FEATURE             Location/Qualifiers
source              1..7
                    mol_type = protein
                    organism = synthetic construct
SEQUENCE: 229
AASYLES                                                                 7

SEQ ID NO: 230      moltype = AA  length = 8
FEATURE             Location/Qualifiers
source              1..8
                    mol_type = protein
                    organism = synthetic construct
SEQUENCE: 230
QQSHEDPY                                                                8

SEQ ID NO: 231      moltype = AA  length = 11
FEATURE             Location/Qualifiers
source              1..11
                    mol_type = protein
                    organism = synthetic construct
SEQUENCE: 231
GYDITQGYSW N                                                            11

SEQ ID NO: 232      moltype = AA  length = 16
FEATURE             Location/Qualifiers
source              1..16
                    mol_type = protein
                    organism = synthetic construct
SEQUENCE: 232
SIKYSGETKY NPSVKG                                                       16

SEQ ID NO: 233      moltype = AA  length = 12
FEATURE             Location/Qualifiers
source              1..12
                    mol_type = protein
                    organism = synthetic construct
VARIANT             2
                    note = S, D, or K
SEQUENCE: 233
GXNYFGHWHF AV                                                           12

SEQ ID NO: 234      moltype = AA  length = 17
FEATURE             Location/Qualifiers
source              1..17
                    mol_type = protein
                    organism = synthetic construct
SEQUENCE: 234
RASKSVDAEG DSYLNWY                                                      17

SEQ ID NO: 235      moltype = AA  length = 7
FEATURE             Location/Qualifiers
source              1..7
                    mol_type = protein
                    organism = synthetic construct
SEQUENCE: 235
AASYLES                                                                 7

SEQ ID NO: 236      moltype = AA  length = 8
FEATURE             Location/Qualifiers
source              1..8
                    mol_type = protein
                    organism = synthetic construct
SEQUENCE: 236
QQSHEDPY                                                                8

SEQ ID NO: 237      moltype = AA  length = 11
FEATURE             Location/Qualifiers
source              1..11
                    mol_type = protein
                    organism = synthetic construct
SEQUENCE: 237
GYDITQGYSW N                                                            11

SEQ ID NO: 238      moltype = AA  length = 16
FEATURE             Location/Qualifiers
source              1..16
                    mol_type = protein
                    organism = synthetic construct
SEQUENCE: 238
```

```
SIKYSGETKY NPSVKG                                                          16

SEQ ID NO: 239           moltype = AA   length = 12
FEATURE                  Location/Qualifiers
source                   1..12
                         mol_type = protein
                         organism = synthetic construct
SEQUENCE: 239
GNNYFGHWHF AV                                                              12

SEQ ID NO: 240           moltype = AA   length = 17
FEATURE                  Location/Qualifiers
source                   1..17
                         mol_type = protein
                         organism = synthetic construct
VARIANT                  8
                         note = S, G, E, or D
SEQUENCE: 240
RASKSVDXEG DSYLNWY                                                         17

SEQ ID NO: 241           moltype = AA   length = 7
FEATURE                  Location/Qualifiers
source                   1..7
                         mol_type = protein
                         organism = synthetic construct
SEQUENCE: 241
AASYLES                                                                    7

SEQ ID NO: 242           moltype = AA   length = 8
FEATURE                  Location/Qualifiers
source                   1..8
                         mol_type = protein
                         organism = synthetic construct
SEQUENCE: 242
QQSHEDPY                                                                   8

SEQ ID NO: 243           moltype = AA   length = 11
FEATURE                  Location/Qualifiers
source                   1..11
                         mol_type = protein
                         organism = synthetic construct
SEQUENCE: 243
GYDITQGYSW N                                                               11

SEQ ID NO: 244           moltype = AA   length = 16
FEATURE                  Location/Qualifiers
source                   1..16
                         mol_type = protein
                         organism = synthetic construct
SEQUENCE: 244
SIKYSGETKY NPSVKG                                                          16

SEQ ID NO: 245           moltype = AA   length = 12
FEATURE                  Location/Qualifiers
source                   1..12
                         mol_type = protein
                         organism = synthetic construct
SEQUENCE: 245
GNNYFGHWHF AV                                                              12

SEQ ID NO: 246           moltype = AA   length = 17
FEATURE                  Location/Qualifiers
source                   1..17
                         mol_type = protein
                         organism = synthetic construct
SEQUENCE: 246
RASKSVDAEG DSYMNWY                                                         17

SEQ ID NO: 247           moltype = AA   length = 7
FEATURE                  Location/Qualifiers
source                   1..7
                         mol_type = protein
                         organism = synthetic construct
SEQUENCE: 247
AASYLES                                                                    7

SEQ ID NO: 248           moltype = AA   length = 8
FEATURE                  Location/Qualifiers
source                   1..8
```

```
SEQUENCE: 248
QQSHEDPY                                                            8

SEQ ID NO: 249          moltype = AA  length = 11
FEATURE                 Location/Qualifiers
source                  1..11
                        mol_type = protein
                        organism = synthetic construct
SEQUENCE: 249
GYSITQGYSW N                                                       11

SEQ ID NO: 250          moltype = AA  length = 16
FEATURE                 Location/Qualifiers
source                  1..16
                        mol_type = protein
                        organism = synthetic construct
SEQUENCE: 250
SIKYSGETKY NPSVKG                                                  16

SEQ ID NO: 251          moltype = AA  length = 12
FEATURE                 Location/Qualifiers
source                  1..12
                        mol_type = protein
                        organism = synthetic construct
SEQUENCE: 251
GNNYFGHWHF AV                                                      12

SEQ ID NO: 252          moltype = AA  length = 17
FEATURE                 Location/Qualifiers
source                  1..17
                        mol_type = protein
                        organism = synthetic construct
SEQUENCE: 252
RASKSVDAEG DSYLNWY                                                 17

SEQ ID NO: 253          moltype = AA  length = 7
FEATURE                 Location/Qualifiers
source                  1..7
                        mol_type = protein
                        organism = synthetic construct
SEQUENCE: 253
AASYLES                                                             7

SEQ ID NO: 254          moltype = AA  length = 8
FEATURE                 Location/Qualifiers
source                  1..8
                        mol_type = protein
                        organism = synthetic construct
SEQUENCE: 254
QQSHEDPY                                                            8

SEQ ID NO: 255          moltype = AA  length = 11
FEATURE                 Location/Qualifiers
source                  1..11
                        mol_type = protein
                        organism = synthetic construct
SEQUENCE: 255
GYNITQGYSW N                                                       11

SEQ ID NO: 256          moltype = AA  length = 16
FEATURE                 Location/Qualifiers
source                  1..16
                        mol_type = protein
                        organism = synthetic construct
SEQUENCE: 256
SIKYSGETKY NPSVKG                                                  16

SEQ ID NO: 257          moltype = AA  length = 12
FEATURE                 Location/Qualifiers
source                  1..12
                        mol_type = protein
                        organism = synthetic construct
SEQUENCE: 257
GNNYFGHWHF AV                                                      12

SEQ ID NO: 258          moltype = AA  length = 17
FEATURE                 Location/Qualifiers
```

```
source                   1..17
                         mol_type = protein
                         organism = synthetic construct
SEQUENCE: 258
RASKSVDAEG DSYLNWY                                                          17

SEQ ID NO: 259           moltype = AA  length = 7
FEATURE                  Location/Qualifiers
source                   1..7
                         mol_type = protein
                         organism = synthetic construct
SEQUENCE: 259
AASYLES                                                                      7

SEQ ID NO: 260           moltype = AA  length = 8
FEATURE                  Location/Qualifiers
source                   1..8
                         mol_type = protein
                         organism = synthetic construct
SEQUENCE: 260
QQSHEDPY                                                                     8

SEQ ID NO: 261           moltype = AA  length = 11
FEATURE                  Location/Qualifiers
source                   1..11
                         mol_type = protein
                         organism = synthetic construct
SEQUENCE: 261
GYDITSGYSW N                                                                11

SEQ ID NO: 262           moltype = AA  length = 16
FEATURE                  Location/Qualifiers
source                   1..16
                         mol_type = protein
                         organism = synthetic construct
SEQUENCE: 262
SIKYSGETKY NPSVKG                                                           16

SEQ ID NO: 263           moltype = AA  length = 12
FEATURE                  Location/Qualifiers
source                   1..12
                         mol_type = protein
                         organism = synthetic construct
SEQUENCE: 263
GNNYFGHWHF AV                                                               12

SEQ ID NO: 264           moltype = AA  length = 17
FEATURE                  Location/Qualifiers
source                   1..17
                         mol_type = protein
                         organism = synthetic construct
SEQUENCE: 264
RASKSVDAEG DSYLNWY                                                          17

SEQ ID NO: 265           moltype = AA  length = 7
FEATURE                  Location/Qualifiers
source                   1..7
                         mol_type = protein
                         organism = synthetic construct
SEQUENCE: 265
AASYLES                                                                      7

SEQ ID NO: 266           moltype = AA  length = 8
FEATURE                  Location/Qualifiers
source                   1..8
                         mol_type = protein
                         organism = synthetic construct
SEQUENCE: 266
QQSHEDPY                                                                     8

SEQ ID NO: 267           moltype = AA  length = 11
FEATURE                  Location/Qualifiers
source                   1..11
                         mol_type = protein
                         organism = synthetic construct
SEQUENCE: 267
GYDITEGYSW N                                                                11

SEQ ID NO: 268           moltype = AA  length = 16
```

```
FEATURE            Location/Qualifiers
source             1..16
                   mol_type = protein
                   organism = synthetic construct
SEQUENCE: 268
SIKYSGETKY NPSVKG                                                    16

SEQ ID NO: 269     moltype = AA  length = 12
FEATURE            Location/Qualifiers
source             1..12
                   mol_type = protein
                   organism = synthetic construct
SEQUENCE: 269
GNNYFGHWHF AV                                                        12

SEQ ID NO: 270     moltype = AA  length = 17
FEATURE            Location/Qualifiers
source             1..17
                   mol_type = protein
                   organism = synthetic construct
SEQUENCE: 270
RASKSVDAEG DSYLNWY                                                   17

SEQ ID NO: 271     moltype = AA  length = 7
FEATURE            Location/Qualifiers
source             1..7
                   mol_type = protein
                   organism = synthetic construct
SEQUENCE: 271
AASYLES                                                              7

SEQ ID NO: 272     moltype = AA  length = 8
FEATURE            Location/Qualifiers
source             1..8
                   mol_type = protein
                   organism = synthetic construct
SEQUENCE: 272
QQSHEDPY                                                             8

SEQ ID NO: 273     moltype = AA  length = 11
FEATURE            Location/Qualifiers
source             1..11
                   mol_type = protein
                   organism = synthetic construct
SEQUENCE: 273
GYDITQGYSW N                                                         11

SEQ ID NO: 274     moltype = AA  length = 16
FEATURE            Location/Qualifiers
source             1..16
                   mol_type = protein
                   organism = synthetic construct
SEQUENCE: 274
SIKYSGETKY NPSVKG                                                    16

SEQ ID NO: 275     moltype = AA  length = 12
FEATURE            Location/Qualifiers
source             1..12
                   mol_type = protein
                   organism = synthetic construct
SEQUENCE: 275
GSNYFGHWHF AV                                                        12

SEQ ID NO: 276     moltype = AA  length = 17
FEATURE            Location/Qualifiers
source             1..17
                   mol_type = protein
                   organism = synthetic construct
SEQUENCE: 276
RASKSVDAEG DSYLNWY                                                   17

SEQ ID NO: 277     moltype = AA  length = 7
FEATURE            Location/Qualifiers
source             1..7
                   mol_type = protein
                   organism = synthetic construct
SEQUENCE: 277
AASYLES                                                              7
```

```
SEQ ID NO: 278          moltype = AA  length = 8
FEATURE                 Location/Qualifiers
source                  1..8
                        mol_type = protein
                        organism = synthetic construct
SEQUENCE: 278
QQSHEDPY                                                                    8

SEQ ID NO: 279          moltype = AA  length = 11
FEATURE                 Location/Qualifiers
source                  1..11
                        mol_type = protein
                        organism = synthetic construct
SEQUENCE: 279
GYDITQGYSW N                                                               11

SEQ ID NO: 280          moltype = AA  length = 16
FEATURE                 Location/Qualifiers
source                  1..16
                        mol_type = protein
                        organism = synthetic construct
SEQUENCE: 280
SIKYSGETKY NPSVKG                                                          16

SEQ ID NO: 281          moltype = AA  length = 12
FEATURE                 Location/Qualifiers
source                  1..12
                        mol_type = protein
                        organism = synthetic construct
SEQUENCE: 281
GDNYFGHWHF AV                                                              12

SEQ ID NO: 282          moltype = AA  length = 17
FEATURE                 Location/Qualifiers
source                  1..17
                        mol_type = protein
                        organism = synthetic construct
SEQUENCE: 282
RASKSVDAEG DSYLNWY                                                         17

SEQ ID NO: 283          moltype = AA  length = 7
FEATURE                 Location/Qualifiers
source                  1..7
                        mol_type = protein
                        organism = synthetic construct
SEQUENCE: 283
AASYLES                                                                     7

SEQ ID NO: 284          moltype = AA  length = 8
FEATURE                 Location/Qualifiers
source                  1..8
                        mol_type = protein
                        organism = synthetic construct
SEQUENCE: 284
QQSHEDPY                                                                    8

SEQ ID NO: 285          moltype = AA  length = 11
FEATURE                 Location/Qualifiers
source                  1..11
                        mol_type = protein
                        organism = synthetic construct
SEQUENCE: 285
GYDITQGYSW N                                                               11

SEQ ID NO: 286          moltype = AA  length = 16
FEATURE                 Location/Qualifiers
source                  1..16
                        mol_type = protein
                        organism = synthetic construct
SEQUENCE: 286
SIKYSGETKY NPSVKG                                                          16

SEQ ID NO: 287          moltype = AA  length = 12
FEATURE                 Location/Qualifiers
source                  1..12
                        mol_type = protein
                        organism = synthetic construct
SEQUENCE: 287
GKNYFGHWHF AV                                                              12
```

```
SEQ ID NO: 288            moltype = AA  length = 17
FEATURE                   Location/Qualifiers
source                    1..17
                          mol_type = protein
                          organism = synthetic construct
SEQUENCE: 288
RASKSVDAEG DSYLNWY                                                17

SEQ ID NO: 289            moltype = AA  length = 7
FEATURE                   Location/Qualifiers
source                    1..7
                          mol_type = protein
                          organism = synthetic construct
SEQUENCE: 289
AASYLES                                                            7

SEQ ID NO: 290            moltype = AA  length = 8
FEATURE                   Location/Qualifiers
source                    1..8
                          mol_type = protein
                          organism = synthetic construct
SEQUENCE: 290
QQSHEDPY                                                           8

SEQ ID NO: 291            moltype = AA  length = 11
FEATURE                   Location/Qualifiers
source                    1..11
                          mol_type = protein
                          organism = synthetic construct
SEQUENCE: 291
GYDITQGYSW N                                                      11

SEQ ID NO: 292            moltype = AA  length = 16
FEATURE                   Location/Qualifiers
source                    1..16
                          mol_type = protein
                          organism = synthetic construct
SEQUENCE: 292
SIKYSGETKY NPSVKG                                                 16

SEQ ID NO: 293            moltype = AA  length = 12
FEATURE                   Location/Qualifiers
source                    1..12
                          mol_type = protein
                          organism = synthetic construct
SEQUENCE: 293
GNNYFGHWHF AV                                                     12

SEQ ID NO: 294            moltype = AA  length = 17
FEATURE                   Location/Qualifiers
source                    1..17
                          mol_type = protein
                          organism = synthetic construct
SEQUENCE: 294
RASKSVDSEG DSYLNWY                                                17

SEQ ID NO: 295            moltype = AA  length = 7
FEATURE                   Location/Qualifiers
source                    1..7
                          mol_type = protein
                          organism = synthetic construct
SEQUENCE: 295
AASYLES                                                            7

SEQ ID NO: 296            moltype = AA  length = 8
FEATURE                   Location/Qualifiers
source                    1..8
                          mol_type = protein
                          organism = synthetic construct
SEQUENCE: 296
QQSHEDPY                                                           8

SEQ ID NO: 297            moltype = AA  length = 11
FEATURE                   Location/Qualifiers
source                    1..11
                          mol_type = protein
                          organism = synthetic construct
SEQUENCE: 297
```

| | | |
|---|---|---|
| GYDITQGYSW N | | 11 |
| SEQ ID NO: 298<br>FEATURE<br>source | moltype = AA  length = 16<br>Location/Qualifiers<br>1..16<br>mol_type = protein<br>organism = synthetic construct | |
| SEQUENCE: 298<br>SIKYSGETKY NPSVKG | | 16 |
| SEQ ID NO: 299<br>FEATURE<br>source | moltype = AA  length = 12<br>Location/Qualifiers<br>1..12<br>mol_type = protein<br>organism = synthetic construct | |
| SEQUENCE: 299<br>GNNYFGHWHF AV | | 12 |
| SEQ ID NO: 300<br>FEATURE<br>source | moltype = AA  length = 17<br>Location/Qualifiers<br>1..17<br>mol_type = protein<br>organism = synthetic construct | |
| SEQUENCE: 300<br>RASKSVDGEG DSYLNWY | | 17 |
| SEQ ID NO: 301<br>FEATURE<br>source | moltype = AA  length = 7<br>Location/Qualifiers<br>1..7<br>mol_type = protein<br>organism = synthetic construct | |
| SEQUENCE: 301<br>AASYLES | | 7 |
| SEQ ID NO: 302<br>FEATURE<br>source | moltype = AA  length = 8<br>Location/Qualifiers<br>1..8<br>mol_type = protein<br>organism = synthetic construct | |
| SEQUENCE: 302<br>QQSHEDPY | | 8 |
| SEQ ID NO: 303<br>FEATURE<br>source | moltype = AA  length = 11<br>Location/Qualifiers<br>1..11<br>mol_type = protein<br>organism = synthetic construct | |
| SEQUENCE: 303<br>GYDITQGYSW N | | 11 |
| SEQ ID NO: 304<br>FEATURE<br>source | moltype = AA  length = 16<br>Location/Qualifiers<br>1..16<br>mol_type = protein<br>organism = synthetic construct | |
| SEQUENCE: 304<br>SIKYSGETKY NPSVKG | | 16 |
| SEQ ID NO: 305<br>FEATURE<br>source | moltype = AA  length = 12<br>Location/Qualifiers<br>1..12<br>mol_type = protein<br>organism = synthetic construct | |
| SEQUENCE: 305<br>GNNYFGHWHF AV | | 12 |
| SEQ ID NO: 306<br>FEATURE<br>source | moltype = AA  length = 17<br>Location/Qualifiers<br>1..17<br>mol_type = protein<br>organism = synthetic construct | |
| SEQUENCE: 306<br>RASKSVDEEG DSYLNWY | | 17 |
| SEQ ID NO: 307<br>FEATURE<br>source | moltype = AA  length = 7<br>Location/Qualifiers<br>1..7<br>mol_type = protein<br>organism = synthetic construct | |

| | | |
|---|---|---|
| SEQUENCE: 307 | | |
| AASYLES | | 7 |
| | | |
| SEQ ID NO: 308 | moltype = AA  length = 8 | |
| FEATURE | Location/Qualifiers | |
| source | 1..8 | |
| | mol_type = protein | |
| | organism = synthetic construct | |
| SEQUENCE: 308 | | |
| QQSHEDPY | | 8 |
| | | |
| SEQ ID NO: 309 | moltype = AA  length = 11 | |
| FEATURE | Location/Qualifiers | |
| source | 1..11 | |
| | mol_type = protein | |
| | organism = synthetic construct | |
| SEQUENCE: 309 | | |
| GYDITQGYSW N | | 11 |
| | | |
| SEQ ID NO: 310 | moltype = AA  length = 16 | |
| FEATURE | Location/Qualifiers | |
| source | 1..16 | |
| | mol_type = protein | |
| | organism = synthetic construct | |
| SEQUENCE: 310 | | |
| SIKYSGETKY NPSVKG | | 16 |
| | | |
| SEQ ID NO: 311 | moltype = AA  length = 12 | |
| FEATURE | Location/Qualifiers | |
| source | 1..12 | |
| | mol_type = protein | |
| | organism = synthetic construct | |
| SEQUENCE: 311 | | |
| GNNYFGHWHF AV | | 12 |
| | | |
| SEQ ID NO: 312 | moltype = AA  length = 17 | |
| FEATURE | Location/Qualifiers | |
| source | 1..17 | |
| | mol_type = protein | |
| | organism = synthetic construct | |
| SEQUENCE: 312 | | |
| RASKSVDDEG DSYLNWY | | 17 |
| | | |
| SEQ ID NO: 313 | moltype = AA  length = 7 | |
| FEATURE | Location/Qualifiers | |
| source | 1..7 | |
| | mol_type = protein | |
| | organism = synthetic construct | |
| SEQUENCE: 313 | | |
| AASYLES | | 7 |
| | | |
| SEQ ID NO: 314 | moltype = AA  length = 8 | |
| FEATURE | Location/Qualifiers | |
| source | 1..8 | |
| | mol_type = protein | |
| | organism = synthetic construct | |
| SEQUENCE: 314 | | |
| QQSHEDPY | | 8 |
| | | |
| SEQ ID NO: 315 | moltype = AA  length = 451 | |
| FEATURE | Location/Qualifiers | |
| source | 1..451 | |
| | mol_type = protein | |
| | organism = synthetic construct | |
| SEQUENCE: 315 | | |
| EVQLVESGGG LVQPGGSLRL SCAVSGYSIT QGYSWNWIRQ APGKGLEWVA SIKYSGETKY | | 60 |
| NPSVKGRITI SRDGSKNTFY LQMNSLRAED TAVYYCAKGN NYFGHWHFAV WGQGTLVTVS | | 120 |
| SASTKGPSVF PLAPSSKSTS GGTAALGCLV KDYFPEPVTV SWNSGALTSG VHTFPAVLQS | | 180 |
| SGLYSLSSVV TVPSSSLGTQ TYICNVNHKP SNTKVDKKVE PKSCDKTHTC PPCPAPELLG | | 240 |
| GPSVFLFPPK PKDTLMISRT PEVTCVVVDV SHEDPEVKFN WYVDGVEVHN AKTKPREEQY | | 300 |
| NSTYRVVSVL TVLHQDWLNG KEYKCKVSNK ALPAPIEKTI SKAKGQPREP QVYTLPPSRE | | 360 |
| EMTKNQVSLT CLVKGFYPSD IAVEWESNGQ PENNYKTTPP VLDSDGSFFL YSKLTVDKSR | | 420 |
| WQQGNVFSCS VMHEALHNHY TQKSLSLSPG K | | 451 |
| | | |
| SEQ ID NO: 316 | moltype = AA  length = 218 | |
| FEATURE | Location/Qualifiers | |
| source | 1..218 | |
| | mol_type = protein | |
| | organism = synthetic construct | |

```
SEQUENCE: 316
DIQLTQSPSS LSASVGDRVT ITCRASKSVD AEGDSYLNWY QQKPGKAPKL LIYAASYLES   60
GVPSRFSGSG SGTDFTLTIS SLQPEDFATY YCQQSHEDPY TFGQGTKVEI KRTVAAPSVF  120
IFPPSDEQLK SGTASVVCLL NNFYPREAKV QWKVDNALQS GNSQESVTEQ DSKDSTYSLS  180
STLTLSKADY EKHKVYACEV THQGLSSPVT KSFNRGEC                          218

SEQ ID NO: 317          moltype = AA  length = 451
FEATURE                 Location/Qualifiers
source                  1..451
                        mol_type = protein
                        organism = synthetic construct
SEQUENCE: 317
EVQLVESGGG LVQPGGSLRL SCAVSGYNIT QGYSWNWIRQ APGKGLEWVA SIKYSGETKY   60
NPSVKGRITI SRDGSKNTFY LQMNSLRAED TAVYYCAKGN NYFGHWHFAV WGQGTLVTVS  120
SASTKGPSVF PLAPSSKSTS GGTAALGCLV KDYFPEPVTV SWNSGALTSG VHTFPAVLQS  180
SGLYSLSSVV TVPSSSLGTQ TYICNVNHKP SNTKVDKKVE PKSCDKTHTC PPCPAPELLG  240
GPSVFLFPPK PKDTLMISRT PEVTCVVVDV SHEDPEVKFN WYVDGVEVHN AKTKPREEQY  300
NSTYRVVSVL TVLHQDWLNG KEYKCKVSNK ALPAPIEKTI SKAKGQPREP QVYTLPPSRE  360
EMTKNQVSLT CLVKGFYPSD IAVEWESNGQ PENNYKTTPP VLDSDGSFFL YSKLTVDKSR  420
WQQGNVFSCS VMHEALHNHY TQKSLSLSPG K                                 451

SEQ ID NO: 318          moltype = AA  length = 218
FEATURE                 Location/Qualifiers
source                  1..218
                        mol_type = protein
                        organism = synthetic construct
SEQUENCE: 318
DIQLTQSPSS LSASVGDRVT ITCRASKSVD AEGDSYLNWY QQKPGKAPKL LIYAASYLES   60
GVPSRFSGSG SGTDFTLTIS SLQPEDFATY YCQQSHEDPY TFGQGTKVEI KRTVAAPSVF  120
IFPPSDEQLK SGTASVVCLL NNFYPREAKV QWKVDNALQS GNSQESVTEQ DSKDSTYSLS  180
STLTLSKADY EKHKVYACEV THQGLSSPVT KSFNRGEC                          218

SEQ ID NO: 319          moltype = AA  length = 451
FEATURE                 Location/Qualifiers
source                  1..451
                        mol_type = protein
                        organism = synthetic construct
SEQUENCE: 319
EVQLVESGGG LVQPGGSLRL SCAVSGYDIT SGYSWNWIRQ APGKGLEWVA SIKYSGETKY   60
NPSVKGRITI SRDGSKNTFY LQMNSLRAED TAVYYCAKGN NYFGHWHFAV WGQGTLVTVS  120
SASTKGPSVF PLAPSSKSTS GGTAALGCLV KDYFPEPVTV SWNSGALTSG VHTFPAVLQS  180
SGLYSLSSVV TVPSSSLGTQ TYICNVNHKP SNTKVDKKVE PKSCDKTHTC PPCPAPELLG  240
GPSVFLFPPK PKDTLMISRT PEVTCVVVDV SHEDPEVKFN WYVDGVEVHN AKTKPREEQY  300
NSTYRVVSVL TVLHQDWLNG KEYKCKVSNK ALPAPIEKTI SKAKGQPREP QVYTLPPSRE  360
EMTKNQVSLT CLVKGFYPSD IAVEWESNGQ PENNYKTTPP VLDSDGSFFL YSKLTVDKSR  420
WQQGNVFSCS VMHEALHNHY TQKSLSLSPG K                                 451

SEQ ID NO: 320          moltype = AA  length = 218
FEATURE                 Location/Qualifiers
source                  1..218
                        mol_type = protein
                        organism = synthetic construct
SEQUENCE: 320
DIQLTQSPSS LSASVGDRVT ITCRASKSVD AEGDSYLNWY QQKPGKAPKL LIYAASYLES   60
GVPSRFSGSG SGTDFTLTIS SLQPEDFATY YCQQSHEDPY TFGQGTKVEI KRTVAAPSVF  120
IFPPSDEQLK SGTASVVCLL NNFYPREAKV QWKVDNALQS GNSQESVTEQ DSKDSTYSLS  180
STLTLSKADY EKHKVYACEV THQGLSSPVT KSFNRGEC                          218

SEQ ID NO: 321          moltype = AA  length = 451
FEATURE                 Location/Qualifiers
source                  1..451
                        mol_type = protein
                        organism = synthetic construct
SEQUENCE: 321
EVQLVESGGG LVQPGGSLRL SCAVSGYDIT DGYSWNWIRQ APGKGLEWVA SIKYSGETKY   60
NPSVKGRITI SRDGSKNTFY LQMNSLRAED TAVYYCAKGN NYFGHWHFAV WGQGTLVTVS  120
SASTKGPSVF PLAPSSKSTS GGTAALGCLV KDYFPEPVTV SWNSGALTSG VHTFPAVLQS  180
SGLYSLSSVV TVPSSSLGTQ TYICNVNHKP SNTKVDKKVE PKSCDKTHTC PPCPAPELLG  240
GPSVFLFPPK PKDTLMISRT PEVTCVVVDV SHEDPEVKFN WYVDGVEVHN AKTKPREEQY  300
NSTYRVVSVL TVLHQDWLNG KEYKCKVSNK ALPAPIEKTI SKAKGQPREP QVYTLPPSRE  360
EMTKNQVSLT CLVKGFYPSD IAVEWESNGQ PENNYKTTPP VLDSDGSFFL YSKLTVDKSR  420
WQQGNVFSCS VMHEALHNHY TQKSLSLSPG K                                 451

SEQ ID NO: 322          moltype = AA  length = 218
FEATURE                 Location/Qualifiers
source                  1..218
                        mol_type = protein
                        organism = synthetic construct
SEQUENCE: 322
```

```
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 323          moltype = AA   length = 451
FEATURE                 Location/Qualifiers
source                  1..451
                        mol_type = protein
                        organism = synthetic construct
SEQUENCE: 323
EVQLVESGGG LVQPGGSLRL SCAVSGYDIT EGYSWNWIRQ APGKGLEWVA SIKYSGETKY    60
NPSVKGRITI SRDGSKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451

SEQ ID NO: 324          moltype = AA   length = 218
FEATURE                 Location/Qualifiers
source                  1..218
                        mol_type = protein
                        organism = synthetic construct
SEQUENCE: 324
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 325          moltype =    length =
SEQUENCE: 325
000

SEQ ID NO: 326          moltype =    length =
SEQUENCE: 326
000

SEQ ID NO: 327          moltype = AA   length = 451
FEATURE                 Location/Qualifiers
source                  1..451
                        mol_type = protein
                        organism = synthetic construct
SEQUENCE: 327
EVQLVESGGG LVQPGGSLRL SCAVSGYDIT QGYSWNWIRQ APGKGLEWVA SIKYSGETKY    60
NPSVKGRITI SRDESKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451

SEQ ID NO: 328          moltype = AA   length = 218
FEATURE                 Location/Qualifiers
source                  1..218
                        mol_type = protein
                        organism = synthetic construct
SEQUENCE: 328
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 329          moltype = AA   length = 451
FEATURE                 Location/Qualifiers
source                  1..451
                        mol_type = protein
                        organism = synthetic construct
SEQUENCE: 329
EVQLVESGGG LVQPGGSLRL SCAVSGYDIT QGYSWNWIRQ APGKGLEWVA SIKYSGETKY    60
NPSVKGRITI SRDQSKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451
```

```
SEQ ID NO: 330            moltype = AA  length = 218
FEATURE                   Location/Qualifiers
source                    1..218
                          mol_type = protein
                          organism = synthetic construct
SEQUENCE: 330
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDFY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 331            moltype = AA  length = 451
FEATURE                   Location/Qualifiers
source                    1..451
                          mol_type = protein
                          organism = synthetic construct
SEQUENCE: 331
EVQLVESGGG LVQPGGSLRL SCAVSGYDIT QGYSWNWIRQ APGKGLEWVA SIKYSGETKY    60
NPSVKGRITI SRDSSKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451

SEQ ID NO: 332            moltype = AA  length = 218
FEATURE                   Location/Qualifiers
source                    1..218
                          mol_type = protein
                          organism = synthetic construct
SEQUENCE: 332
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 333            moltype = AA  length = 451
FEATURE                   Location/Qualifiers
source                    1..451
                          mol_type = protein
                          organism = synthetic construct
SEQUENCE: 333
EVQLVESGGG LVQPGGSLRL SCAVSGYDIT QGYSWNWIRQ APGKGLEWVA SIKYSGETKY    60
NPSVKGRITI SRDSKNTFY LQMNSLRAED TAVYYCAKGN NYFGHWHFAV WGQGTLVTVS    120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451

SEQ ID NO: 334            moltype = AA  length = 218
FEATURE                   Location/Qualifiers
source                    1..218
                          mol_type = protein
                          organism = synthetic construct
SEQUENCE: 334
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 335            moltype = AA  length = 451
FEATURE                   Location/Qualifiers
source                    1..451
                          mol_type = protein
                          organism = synthetic construct
SEQUENCE: 335
EVQLVESGGG LVQPGGSLRL SCAVSGYDIT QGYSWNWIRQ APGKGLEWVA SIKYSGETKY    60
NPSVKGRITI SRDASKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451
```

```
SEQ ID NO: 336            moltype = AA  length = 218
FEATURE                   Location/Qualifiers
source                    1..218
                          mol_type = protein
                          organism = synthetic construct
SEQUENCE: 336
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 337            moltype = AA  length = 451
FEATURE                   Location/Qualifiers
source                    1..451
                          mol_type = protein
                          organism = synthetic construct
SEQUENCE: 337
EVQLVESGGG LVQPGGSLRL SCAVSGYDIT QGYSWNWIRQ APGKGLEWVA SIKYSGETKY    60
NPSVKGRITI SRDYSKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451

SEQ ID NO: 338            moltype = AA  length = 218
FEATURE                   Location/Qualifiers
source                    1..218
                          mol_type = protein
                          organism = synthetic construct
SEQUENCE: 338
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 339            moltype = AA  length = 451
FEATURE                   Location/Qualifiers
source                    1..451
                          mol_type = protein
                          organism = synthetic construct
SEQUENCE: 339
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCARGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451

SEQ ID NO: 340            moltype = AA  length = 218
FEATURE                   Location/Qualifiers
source                    1..218
                          mol_type = protein
                          organism = synthetic construct
SEQUENCE: 340
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 341            moltype =     length =
SEQUENCE: 341
000

SEQ ID NO: 342            moltype =     length =
SEQUENCE: 342
000

SEQ ID NO: 343            moltype =     length =
SEQUENCE: 343
000

SEQ ID NO: 344            moltype =     length =
SEQUENCE: 344
000
```

```
SEQ ID NO: 345          moltype = AA   length = 451
FEATURE                 Location/Qualifiers
source                  1..451
                        mol_type = protein
                        organism = synthetic construct
SEQUENCE: 345
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGS NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                 451

SEQ ID NO: 346          moltype = AA   length = 218
FEATURE                 Location/Qualifiers
source                  1..218
                        mol_type = protein
                        organism = synthetic construct
SEQUENCE: 346
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 347          moltype = AA   length = 451
FEATURE                 Location/Qualifiers
source                  1..451
                        mol_type = protein
                        organism = synthetic construct
SEQUENCE: 347
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGD NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                 451

SEQ ID NO: 348          moltype = AA   length = 218
FEATURE                 Location/Qualifiers
source                  1..218
                        mol_type = protein
                        organism = synthetic construct
SEQUENCE: 348
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 349          moltype = AA   length = 451
FEATURE                 Location/Qualifiers
source                  1..451
                        mol_type = protein
                        organism = synthetic construct
SEQUENCE: 349
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGK NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                 451

SEQ ID NO: 350          moltype = AA   length = 218
FEATURE                 Location/Qualifiers
source                  1..218
                        mol_type = protein
                        organism = synthetic construct
SEQUENCE: 350
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 351          moltype = AA   length = 451
```

```
FEATURE                 Location/Qualifiers
source                  1..451
                        mol_type = protein
                        organism = synthetic construct
SEQUENCE: 351
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN HYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                 451

SEQ ID NO: 352          moltype = AA  length = 218
FEATURE                 Location/Qualifiers
source                  1..218
                        mol_type = protein
                        organism = synthetic construct
SEQUENCE: 352
DIQLTQSPSS LSASVGDRVT ITCRASKSVD AEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                          218

SEQ ID NO: 353          moltype =     length =
SEQUENCE: 353
000

SEQ ID NO: 354          moltype =     length =
SEQUENCE: 354
000

SEQ ID NO: 355          moltype =     length =
SEQUENCE: 355
000

SEQ ID NO: 356          moltype =     length =
SEQUENCE: 356
000

SEQ ID NO: 357          moltype = AA  length = 451
FEATURE                 Location/Qualifiers
source                  1..451
                        mol_type = protein
                        organism = synthetic construct
SEQUENCE: 357
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                 451

SEQ ID NO: 358          moltype = AA  length = 218
FEATURE                 Location/Qualifiers
source                  1..218
                        mol_type = protein
                        organism = synthetic construct
SEQUENCE: 358
DIQLTQSPSS LSASVGDRVT ITCRASKSVD SEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                          218

SEQ ID NO: 359          moltype = AA  length = 451
FEATURE                 Location/Qualifiers
source                  1..451
                        mol_type = protein
                        organism = synthetic construct
SEQUENCE: 359
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
```

```
EMTKNQVSLT CLVKGFYPSD IAVEWESNGQ PENNYKTTPP VLDSDGSFFL YSKLTVDKSR    420
WQQGNVFSCS VMHEALHNHY TQKSLSLSPG K                                  451

SEQ ID NO: 360          moltype = AA  length = 218
FEATURE                 Location/Qualifiers
source                  1..218
                        mol_type = protein
                        organism = synthetic construct
SEQUENCE: 360
DIQLTQSPSS LSASVGDRVT ITCRASKSVD GEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 361          moltype = AA  length = 451
FEATURE                 Location/Qualifiers
source                  1..451
                        mol_type = protein
                        organism = synthetic construct
SEQUENCE: 361
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451

SEQ ID NO: 362          moltype = AA  length = 218
FEATURE                 Location/Qualifiers
source                  1..218
                        mol_type = protein
                        organism = synthetic construct
SEQUENCE: 362
DIQLTQSPSS LSASVGDRVT ITCRASKSVD EEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 363          moltype = AA  length = 451
FEATURE                 Location/Qualifiers
source                  1..451
                        mol_type = protein
                        organism = synthetic construct
SEQUENCE: 363
EVQLVESGGG LVQPGGSLRL SCAVSGYDIT QGYSWNWIRQ APGKGLEWVA SIKYSGETKY    60
NPSVKGRITI SRDGSKNTFY LQMNSLRAED TAVYYCAKGN NYFGHWHFAV WGQGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                  451

SEQ ID NO: 364          moltype = AA  length = 218
FEATURE                 Location/Qualifiers
source                  1..218
                        mol_type = protein
                        organism = synthetic construct
SEQUENCE: 364
DIQLTQSPSS LSASVGDRVT ITCRASKSVD DEGDSYLNWY QQKPGKAPKL LIYAASYLES    60
GVPSRFSGSG SGTDFTLTIS SLQPEDFATY YCQQSHEDPY TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 365          moltype = AA  length = 11
FEATURE                 Location/Qualifiers
source                  1..11
                        mol_type = protein
                        organism = synthetic construct
SEQUENCE: 365
GYDITDGYSW N                                                         11

SEQ ID NO: 366          moltype = AA  length = 16
FEATURE                 Location/Qualifiers
source                  1..16
                        mol_type = protein
                        organism = synthetic construct
```

```
SEQUENCE: 366
SIKYSGETKY NPSVKG                                                     16

SEQ ID NO: 367          moltype = AA  length = 12
FEATURE                 Location/Qualifiers
source                  1..12
                        mol_type = protein
                        organism = synthetic construct
SEQUENCE: 367
GNNYFGHWHF AV                                                         12

SEQ ID NO: 368          moltype = AA  length = 17
FEATURE                 Location/Qualifiers
source                  1..17
                        mol_type = protein
                        organism = synthetic construct
SEQUENCE: 368
RASKSVDAEG DSYLNWY                                                    17

SEQ ID NO: 369          moltype = AA  length = 7
FEATURE                 Location/Qualifiers
source                  1..7
                        mol_type = protein
                        organism = synthetic construct
SEQUENCE: 369
AASYLES                                                                7

SEQ ID NO: 370          moltype = AA  length = 8
FEATURE                 Location/Qualifiers
source                  1..8
                        mol_type = protein
                        organism = synthetic construct
SEQUENCE: 370
QQSHEDPY                                                               8

SEQ ID NO: 371          moltype = AA  length = 11
FEATURE                 Location/Qualifiers
source                  1..11
                        mol_type = protein
                        organism = synthetic construct
SEQUENCE: 371
GYDITQGYSW N                                                          11

SEQ ID NO: 372          moltype = AA  length = 16
FEATURE                 Location/Qualifiers
source                  1..16
                        mol_type = protein
                        organism = synthetic construct
SEQUENCE: 372
SIKYSGETKY NPSVKG                                                     16

SEQ ID NO: 373          moltype = AA  length = 12
FEATURE                 Location/Qualifiers
source                  1..12
                        mol_type = protein
                        organism = synthetic construct
SEQUENCE: 373
GNHYFGHWHF AV                                                         12

SEQ ID NO: 374          moltype = AA  length = 17
FEATURE                 Location/Qualifiers
source                  1..17
                        mol_type = protein
                        organism = synthetic construct
SEQUENCE: 374
RASKSVDAEG DSYLNWY                                                    17

SEQ ID NO: 375          moltype = AA  length = 7
FEATURE                 Location/Qualifiers
source                  1..7
                        mol_type = protein
                        organism = synthetic construct
SEQUENCE: 375
AASYLES                                                                7

SEQ ID NO: 376          moltype = AA  length = 8
FEATURE                 Location/Qualifiers
source                  1..8
                        mol_type = protein
```

-continued

```
                          organism = synthetic construct
SEQUENCE: 376
QQSHEDPY                                                                8

SEQ ID NO: 377            moltype = AA  length = 11
FEATURE                   Location/Qualifiers
source                    1..11
                          mol_type = protein
                          organism = synthetic construct
SEQUENCE: 377
GYDITQGYSW N                                                           11

SEQ ID NO: 378            moltype = AA  length = 16
FEATURE                   Location/Qualifiers
source                    1..16
                          mol_type = protein
                          organism = synthetic construct
SEQUENCE: 378
SIKYSGETKY NPSVKG                                                      16

SEQ ID NO: 379            moltype = AA  length = 12
FEATURE                   Location/Qualifiers
source                    1..12
                          mol_type = protein
                          organism = synthetic construct
SEQUENCE: 379
GNNYFGHWHF AV                                                          12

SEQ ID NO: 380            moltype = AA  length = 17
FEATURE                   Location/Qualifiers
source                    1..17
                          mol_type = protein
                          organism = synthetic construct
SEQUENCE: 380
RASKSVDAQG DSYLNWY                                                     17

SEQ ID NO: 381            moltype = AA  length = 7
FEATURE                   Location/Qualifiers
source                    1..7
                          mol_type = protein
                          organism = synthetic construct
SEQUENCE: 381
AASYLES                                                                 7

SEQ ID NO: 382            moltype = AA  length = 8
FEATURE                   Location/Qualifiers
source                    1..8
                          mol_type = protein
                          organism = synthetic construct
SEQUENCE: 382
QQSHEDPY                                                                8

SEQ ID NO: 383            moltype = AA  length = 451
FEATURE                   Location/Qualifiers
source                    1..451
                          mol_type = protein
                          organism = synthetic construct
SEQUENCE: 383
EVQLVESGGG LVQPGGSLRL SCAVSGYDIT QGYSWNWIRQ APGKGLEWVA SIKYSGETKY       60
NPSVKGRITI SRDGSKNTFY LQMNSLRAED TAVYYCAKGN NYFGHWHFAV WGQGTLVTVS      120
SASTKGPSVF PLAPSSKSTS GGTAALGCLV KDYFPEPVTV SWNSGALTSG VHTFPAVLQS      180
SGLYSLSSVV TVPSSSLGTQ TYICNVNHKP SNTKVDKKVE PKSCDKTHTC PPCPAPELLG      240
GPSVFLFPPK PKDTLMISRT PEVTCVVVDV SHEDPEVKFN WYVDGVEVHN AKTKPREEQY      300
NSTYRVVSVL TVLHQDWLNG KEYKCKVSNK ALPAPIEKTI SKAKGQPREP QVYTLPPSRE      360
EMTKNQVSLT CLVKGFYPSD IAVEWESNGQ PENNYKTTPP VLDSDGSFFL YSKLTVDKSR      420
WQQGNVFSCS VMHEALHNHY TQKSLSLSPG K                                    451

SEQ ID NO: 384            moltype = AA  length = 218
FEATURE                   Location/Qualifiers
source                    1..218
                          mol_type = protein
                          organism = synthetic construct
SEQUENCE: 384
DIQLTQSPSS LSASVGDRVT ITCRASKSVD AQGDSYLNWY QQKPGKAPKL LIYAASYLES       60
GVPSRFSGSG SGTDFTLTIS SLQPEDFATY YCQQSHEDPY TFGQGTKVEI KRTVAAPSVF      120
IFPPSDEQLK SGTASVVCLL NNFYPREAKV QWKVDNALQS GNSQESVTEQ DSKDSTYSLS      180
STLTLSKADY EKHKVYACEV THQGLSSPVT KSFNRGEC                             218
```

ANTIBODIES AND ANTIBODY FRAGMENTS THAT BIND IgE

CROSS REFERENCE TO RELATED APPLICATIONS

This application is a continuation of International Application No. PCT/US2025/029622, filed May 15, 2025, which claims the benefit of U.S. Provisional Application No. 63/649,247 filed on May 17, 2024, the entirety of each is incorporated herein by reference.

INCORPORATION BY REFERENCE OF SEQUENCE LISTING

The present application is being filed along with a Sequence Listing in electronic format. The Sequence Listing is provided as a file entitled 59889-707_601_SL.xml, created May 5, 2025, which is 346,208 bytes in size. The information in the electronic format of the Sequence Listing is incorporated by reference in its entirety.

BACKGROUND

Conditions mediated by IgE (Immunoglobulin E) often involve the immune system's response to specific allergens, leading to allergic reactions. Common IgE-mediated conditions include allergic asthma, chronic spontaneous urticaria, chronic rhinosinusitis with nasal polyps, and food allergies. In these conditions, the immune system produces allergen-specific IgE antibodies in response to exposure to allergens, triggering the release of inflammatory substances and causing a range of deleterious symptoms.

SUMMARY

Early therapeutic anti-IgE development campaigns were initially guided by the assumption that anti-IgE therapeutics must not interact with cell surface IgE in the context of FcεRI to ensure that they do not crosslink receptor IgE complexes and activate cells. However, while total blockade of IgE by anti-IgE may eventually prevent all IgE receptor interactions, this process is limited by the slow rate of IgE dissociation and the high exposure of anti-IgE needed to block locally produced IgE in tissue from binding back to FcεRI on mast cells. While recent antibody therapies have targeted the dissociation of IgE from cells, these therapeutic antibodies have exhibited one or more suboptimal properties such as: (1) the spontaneous activation of immune cells (e.g., basophils), (2) suboptimal stability (e.g., chemical/thermal stability), (3) atypical sequence requirements for action, and/or (4) increased propensity for post-translational modification. Collectively, these properties lead to undesirable biological activity and/or limit the therapeutic potential of antibodies targeting the dissociation of IgE from cells.

Provided and exemplified herein are antibodies and antibody fragments that bind cell-bound IgE and effectively dissociate IgE from cells. These antibodies are further advantageous in that (1) the antibodies potently dissociate IgE from FcεRI on mast cells and basophils, (2) binding of the antibody or antibody fragment to a basophil and/or mast cell does not result in the activation of basophils and/or mast cells, (3) the antibodies are thermally and chemical stable, (4) the antibodies lack any DG motif(s) within their CDRs, and/or (5) the antibodies lack any methionine (M) residue(s) within their CDRs. The antibodies or antibody fragments may further dissociate IgE from mast cells with favorable kinetics. Accordingly, provided herein are antibodies and antibody fragments that bind an IgE constant domain, the antibody or antibody fragments comprising:

(i) a heavy chain variable domain comprising: a heavy chain complementarity determining region 1 (CDRH1) comprising the amino acid sequence of SEQ ID NO: 1; a heavy chain complementarity determining region 2 (CDRH2) comprising the amino acid sequence of SEQ ID NO: 2; and a heavy chain complementarity determining region 3 (CDRH3) comprising the amino acid sequence of SEQ ID NO: 3; and a light chain variable domain comprising: a light chain complementarity determining region 1 (CDRL1) comprising the amino acid sequence of SEQ ID NO: 4; a light chain complementarity determining region 2 (CDRL2) comprising the amino acid sequence of SEQ ID NO: 5; and a light chain complementarity determining region 3 (CDRL3) comprising the amino acid sequence of SEQ ID NO: 6;

(ii) a heavy chain variable domain comprising: a heavy chain complementarity determining region 1 (CDRH1) comprising the amino acid sequence of SEQ ID NO: 7; a heavy chain complementarity determining region 2 (CDRH2) comprising the amino acid sequence of SEQ ID NO: 8; a heavy chain complementarity determining region 3 (CDRH3) comprising the amino acid sequence of SEQ ID NO: 9; and a light chain variable domain comprising: a light chain complementarity determining region 1 (CDRL1) comprising the amino acid sequence of SEQ ID NO: 10; a light chain complementarity determining region 2 (CDRL2) comprising the amino acid sequence of SEQ ID NO: 11; and a light chain complementarity determining region 3 (CDRL3) comprising the amino acid sequence of SEQ ID NO: 12;

(iii) a heavy chain variable domain comprising: a heavy chain complementarity determining region 1 (CDRH1) comprising the amino acid sequence of SEQ ID NO: 13; a heavy chain complementarity determining region 2 (CDRH2) comprising the amino acid sequence of SEQ ID NO: 14; a heavy chain complementarity determining region 3 (CDRH3) comprising the amino acid sequence of SEQ ID NO: 15; and a light chain variable domain comprising: a light chain complementarity determining region 1 (CDRL1) comprising the amino acid sequence of SEQ ID NO: 16; a light chain complementarity determining region 2 (CDRL2) comprising the amino acid sequence of SEQ ID NO: 17; and a light chain complementarity determining region 3 (CDRL3) comprising the amino acid sequence of SEQ ID NO: 18;

(iv) a heavy chain variable domain comprising: a heavy chain complementarity determining region 1 (CDRH1) comprising the amino acid sequence of SEQ ID NO: 19; a heavy chain complementarity determining region 2 (CDRH2) comprising the amino acid sequence of SEQ ID NO: 20; a heavy chain complementarity determining region 3 (CDRH3) comprising the amino acid sequence of SEQ ID NO: 21; and a light chain variable domain comprising: a light chain complementarity determining region 1 (CDRL1) comprising the amino acid sequence of SEQ ID NO: 22; a light chain complementarity determining region 2 (CDRL2) comprising the amino acid sequence of SEQ ID NO: 23; and a light chain complementarity determining region 3 (CDRL3) comprising the amino acid sequence of SEQ ID NO: 24;

(v) a heavy chain variable domain comprising: a heavy chain complementarity determining region 1 (CDRH1)

comprising the amino acid sequence of SEQ ID NO: 25; a heavy chain complementarity determining region 2 (CDRH2) comprising the amino acid sequence of SEQ ID NO: 26; a heavy chain complementarity determining region 3 (CDRH3) comprising the amino acid sequence of SEQ ID NO: 27; and a light chain variable domain comprising: a light chain complementarity determining region 1 (CDRL1) comprising the amino acid sequence of SEQ ID NO: 28; a light chain complementarity determining region 2 (CDRL2) comprising the amino acid sequence of SEQ ID NO: 29; and a light chain complementarity determining region 3 (CDRL3) comprising the amino acid sequence of SEQ ID NO: 30; or (vi) a heavy chain variable domain comprising: a heavy chain complementarity determining region 1 (CDRH1) comprising the amino acid sequence of SEQ ID NO: 31; a heavy chain complementarity determining region 2 (CDRH2) comprising the amino acid sequence of SEQ ID NO: 32; a heavy chain complementarity determining region 3 (CDRH3) comprising the amino acid sequence of SEQ ID NO: 33; and a light chain variable domain comprising: a light chain complementarity determining region 1 (CDRL1) comprising the amino acid sequence of SEQ ID NO: 34; a light chain complementarity determining region 2 (CDRL2) comprising the amino acid sequence of SEQ ID NO: 35; and a light chain complementarity determining region 3 (CDRL3) comprising the amino acid sequence of SEQ ID NO: 36.

In one aspect disclosed herein is an antibody or antibody fragment that binds an IgE constant domain, wherein the antibody or antibody fragment comprises: (i) a heavy chain variable domain comprising: a heavy chain complementarity determining region 1 (CDRH1) comprising the amino acid sequence of SEQ ID NO: 1; a heavy chain complementarity determining region 2 (CDRH2) comprising the amino acid sequence of SEQ ID NO: 2; and a heavy chain complementarity determining region 3 (CDRH3) comprising the amino acid sequence of SEQ ID NO: 3; and a light chain variable domain comprising: a light chain complementarity determining region 1 (CDRL1) comprising the amino acid sequence of SEQ ID NO: 4; a light chain complementarity determining region 2 (CDRL2) comprising the amino acid sequence of SEQ ID NO: 5; and a light chain complementarity determining region 3 (CDRL3) comprising the amino acid sequence of SEQ ID NO: 6; (ii) a heavy chain variable domain comprising: a heavy chain complementarity determining region 1 (CDRH1) comprising the amino acid sequence of SEQ ID NO: 7; a heavy chain complementarity determining region 2 (CDRH2) comprising the amino acid sequence of SEQ ID NO: 8; a heavy chain complementarity determining region 3 (CDRH3) comprising the amino acid sequence of SEQ ID NO: 9; and a light chain variable domain comprising: a light chain complementarity determining region 1 (CDRL1) comprising the amino acid sequence of SEQ ID NO: 10; a light chain complementarity determining region 2 (CDRL2) comprising the amino acid sequence of SEQ ID NO: 11; and a light chain complementarity determining region 3 (CDRL3) comprising the amino acid sequence of SEQ ID NO: 12; (iii) a heavy chain variable domain comprising: a heavy chain complementarity determining region 1 (CDRH1) comprising the amino acid sequence of SEQ ID NO: 13; a heavy chain complementarity determining region 2 (CDRH2) comprising the amino acid sequence of SEQ ID NO: 14; a heavy chain complementarity determining region 3 (CDRH3) comprising the amino acid sequence of SEQ ID NO: 15; and a light chain variable domain comprising: a light chain complementarity determining region 1 (CDRL1) comprising the amino acid sequence of SEQ ID NO: 16; a light chain complementarity determining region 2 (CDRL2) comprising the amino acid sequence of SEQ ID NO: 17; and a light chain complementarity determining region 3 (CDRL3) comprising the amino acid sequence of SEQ ID NO: 18; (iv) a heavy chain variable domain comprising: a heavy chain complementarity determining region 1 (CDRH1) comprising the amino acid sequence of SEQ ID NO: 19; a heavy chain complementarity determining region 2 (CDRH2) comprising the amino acid sequence of SEQ ID NO: 20; a heavy chain complementarity determining region 3 (CDRH3) comprising the amino acid sequence of SEQ ID NO: 21; and a light chain variable domain comprising: a light chain complementarity determining region 1 (CDRL1) comprising the amino acid sequence of SEQ ID NO: 22; a light chain complementarity determining region 2 (CDRL2) comprising the amino acid sequence of SEQ ID NO: 23; and a light chain complementarity determining region 3 (CDRL3) comprising the amino acid sequence of SEQ ID NO: 24; (v) a heavy chain variable domain comprising: a heavy chain complementarity determining region 1 (CDRH1) comprising the amino acid sequence of SEQ ID NO: 25; a heavy chain complementarity determining region 2 (CDRH2) comprising the amino acid sequence of SEQ ID NO: 26; a heavy chain complementarity determining region 3 (CDRH3) comprising the amino acid sequence of SEQ ID NO: 27; and a light chain variable domain comprising: a light chain complementarity determining region 1 (CDRL1) comprising the amino acid sequence of SEQ ID NO: 28; a light chain complementarity determining region 2 (CDRL2) comprising the amino acid sequence of SEQ ID NO: 29; and a light chain complementarity determining region 3 (CDRL3) comprising the amino acid sequence of SEQ ID NO: 30; (vi) a heavy chain variable domain comprising: a heavy chain complementarity determining region 1 (CDRH1) comprising the amino acid sequence of SEQ ID NO: 31; a heavy chain complementarity determining region 2 (CDRH2) comprising the amino acid sequence of SEQ ID NO: 32; a heavy chain complementarity determining region 3 (CDRH3) comprising the amino acid sequence of SEQ ID NO: 33; and a light chain variable domain comprising: a light chain complementarity determining region 1 (CDRL1) comprising the amino acid sequence of SEQ ID NO: 34; a light chain complementarity determining region 2 (CDRL2) comprising the amino acid sequence of SEQ ID NO: 35; and a light chain complementarity determining region 3 (CDRL3) comprising the amino acid sequence of SEQ ID NO: 36; or (vii) a heavy chain variable domain comprising: a heavy chain complementarity determining region 1 (CDRH1) comprising the amino acid sequence of SEQ ID NO: 201; a heavy chain complementarity determining region 2 (CDRH2) comprising the amino acid sequence of SEQ ID NO: 202; and a heavy chain complementarity determining region 3 (CDRH3) comprising the amino acid sequence of SEQ ID NO: 203; and a light chain variable domain comprising: a light chain complementarity determining region 1 (CDRL1) comprising the amino acid sequence of SEQ ID NO: 204; a light chain complementarity determining region 2 (CDRL2) comprising the amino acid sequence of SEQ ID NO: 205; and a light chain complementarity determining region 3 (CDRL3) comprising the amino acid sequence of SEQ ID NO: 206.

In some embodiments, the antibody or antibody fragment comprises: (i) a heavy chain variable domain comprising: a heavy chain complementarity determining region 1

(CDRH1) comprising the amino acid sequence of SEQ ID NO: 1; a heavy chain complementarity determining region 2 (CDRH2) comprising the amino acid sequence of SEQ ID NO: 2; and a heavy chain complementarity determining region 3 (CDRH3) comprising the amino acid sequence of SEQ ID NO: 3; and a light chain variable domain comprising: a light chain complementarity determining region 1 (CDRL1) comprising the amino acid sequence of SEQ ID NO: 4; a light chain complementarity determining region 2 (CDRL2) comprising the amino acid sequence of SEQ ID NO: 5; and a light chain complementarity determining region 3 (CDRL3) comprising the amino acid sequence of SEQ ID NO: 6; (ii) a heavy chain variable domain comprising: a heavy chain complementarity determining region 1 (CDRH1) comprising the amino acid sequence of SEQ ID NO: 7; a heavy chain complementarity determining region 2 (CDRH2) comprising the amino acid sequence of SEQ ID NO: 8; a heavy chain complementarity determining region 3 (CDRH3) comprising the amino acid sequence of SEQ ID NO: 9; and a light chain variable domain comprising: a light chain complementarity determining region 1 (CDRL1) comprising the amino acid sequence of SEQ ID NO: 10; a light chain complementarity determining region 2 (CDRL2) comprising the amino acid sequence of SEQ ID NO: 11; and a light chain complementarity determining region 3 (CDRL3) comprising the amino acid sequence of SEQ ID NO: 12; (iii) a heavy chain variable domain comprising: a heavy chain complementarity determining region 1 (CDRH1) comprising the amino acid sequence of SEQ ID NO: 13; a heavy chain complementarity determining region 2 (CDRH2) comprising the amino acid sequence of SEQ ID NO: 14; a heavy chain complementarity determining region 3 (CDRH3) comprising the amino acid sequence of SEQ ID NO: 15; and a light chain variable domain comprising: a light chain complementarity determining region 1 (CDRL1) comprising the amino acid sequence of SEQ ID NO: 16; a light chain complementarity determining region 2 (CDRL2) comprising the amino acid sequence of SEQ ID NO: 17; and a light chain complementarity determining region 3 (CDRL3) comprising the amino acid sequence of SEQ ID NO: 18; (iv) a heavy chain variable domain comprising: a heavy chain complementarity determining region 1 (CDRH1) comprising the amino acid sequence of SEQ ID NO: 19; a heavy chain complementarity determining region 2 (CDRH2) comprising the amino acid sequence of SEQ ID NO: 20; a heavy chain complementarity determining region 3 (CDRH3) comprising the amino acid sequence of SEQ ID NO: 21; and a light chain variable domain comprising: a light chain complementarity determining region 1 (CDRL1) comprising the amino acid sequence of SEQ ID NO: 22; a light chain complementarity determining region 2 (CDRL2) comprising the amino acid sequence of SEQ ID NO: 23; and a light chain complementarity determining region 3 (CDRL3) comprising the amino acid sequence of SEQ ID NO: 24; (v) a heavy chain variable domain comprising: a heavy chain complementarity determining region 1 (CDRH1) comprising the amino acid sequence of SEQ ID NO: 25; a heavy chain complementarity determining region 2 (CDRH2) comprising the amino acid sequence of SEQ ID NO: 26; a heavy chain complementarity determining region 3 (CDRH3) comprising the amino acid sequence of SEQ ID NO: 27; and a light chain variable domain comprising: a light chain complementarity determining region 1 (CDRL1) comprising the amino acid sequence of SEQ ID NO: 28; a light chain complementarity determining region 2 (CDRL2) comprising the amino acid sequence of SEQ ID NO: 29; and a light chain complementarity determining region 3 (CDRL3) comprising the amino acid sequence of SEQ ID NO: 30; or (vi) a heavy chain variable domain comprising: a heavy chain complementarity determining region 1 (CDRH1) comprising the amino acid sequence of SEQ ID NO: 31; a heavy chain complementarity determining region 2 (CDRH2) comprising the amino acid sequence of SEQ ID NO: 32; a heavy chain complementarity determining region 3 (CDRH3) comprising the amino acid sequence of SEQ ID NO: 33; and a light chain variable domain comprising: a light chain complementarity determining region 1 (CDRL1) comprising the amino acid sequence of SEQ ID NO: 34; a light chain complementarity determining region 2 (CDRL2) comprising the amino acid sequence of SEQ ID NO: 35; and a light chain complementarity determining region 3 (CDRL3) comprising the amino acid sequence of SEQ ID NO: 36.

In some embodiments, the antibody or antibody fragment comprises: (i) a heavy chain variable domain comprising: a heavy chain complementarity determining region 1 (CDRH1) comprising the amino acid sequence of SEQ ID NO: 207; a heavy chain complementarity determining region 2 (CDRH2) comprising the amino acid sequence of SEQ ID NO: 208; a heavy chain complementarity determining region 3 (CDRH3) comprising the amino acid sequence of SEQ ID NO: 209; and a light chain variable domain comprising: a light chain complementarity determining region 1 (CDRL1) comprising the amino acid sequence of SEQ ID NO: 210; a light chain complementarity determining region 2 (CDRL2) comprising the amino acid sequence of SEQ ID NO: 211; and a light chain complementarity determining region 3 (CDRL3) comprising the amino acid sequence of SEQ ID NO: 212; (ii) a heavy chain variable domain comprising: a heavy chain complementarity determining region 1 (CDRH1) comprising the amino acid sequence of SEQ ID NO: 213; a heavy chain complementarity determining region 2 (CDRH2) comprising the amino acid sequence of SEQ ID NO: 214; a heavy chain complementarity determining region 3 (CDRH3) comprising the amino acid sequence of SEQ ID NO: 215; and a light chain variable domain comprising: a light chain complementarity determining region 1 (CDRL1) comprising the amino acid sequence of SEQ ID NO: 216; a light chain complementarity determining region 2 (CDRL2) comprising the amino acid sequence of SEQ ID NO: 217; and a light chain complementarity determining region 3 (CDRL3) comprising the amino acid sequence of SEQ ID NO: 218; (iii) a heavy chain variable domain comprising: a heavy chain complementarity determining region 1 (CDRH1) comprising the amino acid sequence of SEQ ID NO: 231; a heavy chain complementarity determining region 2 (CDRH2) comprising the amino acid sequence of SEQ ID NO: 232; a heavy chain complementarity determining region 3 (CDRH3) comprising the amino acid sequence of SEQ ID NO: 233; and a light chain variable domain comprising: a light chain complementarity determining region 1 (CDRL1) comprising the amino acid sequence of SEQ ID NO: 234; a light chain complementarity determining region 2 (CDRL2) comprising the amino acid sequence of SEQ ID NO: 235; and a light chain complementarity determining region 3 (CDRL3) comprising the amino acid sequence of SEQ ID NO: 236; or (iv) a heavy chain variable domain comprising: a heavy chain complementarity determining region 1 (CDRH1) comprising the amino acid sequence of SEQ ID NO: 237; a heavy chain complementarity determining region 2 (CDRH2) comprising the amino acid sequence of SEQ ID NO: 238; a heavy chain complementarity determining region 3 (CDRH3) comprising the amino acid sequence of SEQ ID NO: 239;

and a light chain variable domain comprising: a light chain complementarity determining region 1 (CDRL1) comprising the amino acid sequence of SEQ ID NO: 240; a light chain complementarity determining region 2 (CDRL2) comprising the amino acid sequence of SEQ ID NO: 241; and a light chain complementarity determining region 3 (CDRL3) comprising the amino acid sequence of SEQ ID NO: 242.

In some embodiments, binding of the antibody or antibody fragment to a basophil and/or mast cell does not result in the activation of the basophil and/or mast cell. In some embodiments, the antibody or antibody fragment dissociates IgE from FcεRI on mast cells in 20 hours at an IC50 of IgE dissociation of less than 1,500 nM, less than 1,250, less than 1,000 less than nM, less than 900 nM, less than 800 nM or less than 700 nM. In some embodiments, the antibody or antibody fragment dissociates IgE from FcεRI on mast cells in 20 hours at an IC50 of IgE dissociation of less than 700 nM.

In some embodiments, the antibody or antibody fragment dissociates IgE from FcεRI on human basophils in 20 hours at an IC50 of IgE dissociation of less than 150 nM, less than 125 nM, less than 100 nM, less than 90 nM, less than 80 nM, less than 70 nM, less than 60 nM, less than 50 nM, or less than 40 nM. In some embodiments, the antibody or antibody fragment dissociates IgE from FcεRI on human basophils in 20 hours at an IC50 of IgE dissociation of less than 40 nM.

In some embodiments, the antibody or antibody fragment exhibits less than 10%, less than 9%, or less than 8% change in main capillary isoelectric focusing (cIEF) peak percentage after heat stress. In some embodiments, the antibody or antibody fragment exhibits less than 8% change in main capillary isoelectric focusing (cIEF) peak percentage after heat stress.

In some embodiments, the antibody or antibody fragment does not have any DG motif(s) within the CDRH1, CDRH2, CDRH3, CDRL1, CDRL2, and CDRL3. In some embodiments, the antibody or antibody fragment does not have any methionine (M) residue(s) within the CDRH1, CDRH2, CDRH3, CDRL1, CDRL2, and CDRL3.

In some embodiments, the antibody or antibody fragment comprises a glycine at the framework position corresponding to amino acid position 74 of SEQ ID NO: 95 (Kabat VH framework position 73).

In some embodiments, the antibody or antibody fragment comprises an amino acid other than aspartic acid (D) or glutamic acid (E) at the framework position corresponding to amino acid position 74 of SEQ ID NO: 95 (Kabat VH framework position 73). In some embodiments, the antibody or antibody fragment comprises an amino acid other than aspartic acid (D) at the framework position corresponding to amino acid position 74 of SEQ ID NO: 95 (Kabat VH framework position 73).

In some embodiments, antibody or antibody fragment further comprises a modified Fc domain comprising an amino acid modification that increases binding to the neonatal Fc receptor (FcRn) relative to wild-type IgG1 or IgG4.

In some embodiments, the modified Fc domain comprises the amino acids Y252/T254/E256 (YTE) or L428/S434 (LS) per EU numbering.

In some embodiments, the IgE comprises SEQ ID NO: 163.

In some embodiments, the antibody or antibody fragment binds IgE with an affinity (KD) equal to or less than 5 nanomolar (nM), less than 1 nM, less than 0.5 nM, or less than 0.3 nM. In some embodiments, the antibody or antibody fragment binds IgE with an affinity (KD) equal to or less than 0.5 nanomolar (nM).

In some embodiments, the antibody or antibody fragment comprises: a heavy chain variable domain comprising: a heavy chain complementarity determining region 1 (CDRH1) comprising the amino acid sequence of SEQ ID NO: 37; a heavy chain complementarity determining region 2 (CDRH2) comprising the amino acid sequence of SEQ ID NO: 38; a heavy chain complementarity determining region 3 (CDRH3) comprising the amino acid sequence of SEQ ID NO: 39; and a light chain variable domain comprising: a light chain complementarity determining region 1 (CDRL1) comprising the amino acid sequence of SEQ ID NO: 40; a light chain complementarity determining region 2 (CDRL2) comprising the amino acid sequence of SEQ ID NO: 41; and a light chain complementarity determining region 3 (CDRL3) comprising the amino acid sequence of SEQ ID NO: 42.

In some embodiments, the antibody or antibody fragment comprises: a heavy chain variable domain comprising: a heavy chain complementarity determining region 1 (CDRH1) comprising the amino acid sequence of SEQ ID NO: 43; a heavy chain complementarity determining region 2 (CDRH2) comprising the amino acid sequence of SEQ ID NO: 44; a heavy chain complementarity determining region 3 (CDRH3) comprising the amino acid sequence of SEQ ID NO: 45; and a light chain variable domain comprising: a light chain complementarity determining region 1 (CDRL1) comprising the amino acid sequence of SEQ ID NO: 46; a light chain complementarity determining region 2 (CDRL2) comprising the amino acid sequence of SEQ ID NO: 47; and a light chain complementarity determining region 3 (CDRL3) comprising the amino acid sequence of SEQ ID NO: 48.

In some embodiments, the antibody or antibody fragment comprises: a heavy chain variable domain comprising: a heavy chain complementarity determining region 1 (CDRH1) comprising the amino acid sequence of SEQ ID NO: 49; a heavy chain complementarity determining region 2 (CDRH2) comprising the amino acid sequence of SEQ ID NO: 50; a heavy chain complementarity determining region 3 (CDRH3) comprising the amino acid sequence of SEQ ID NO: 51; and a light chain variable domain comprising: a light chain complementarity determining region 1 (CDRL1) comprising the amino acid sequence of SEQ ID NO: 52; a light chain complementarity determining region 2 (CDRL2) comprising the amino acid sequence of SEQ ID NO: 53; and a light chain complementarity determining region 3 (CDRL3) comprising the amino acid sequence of SEQ ID NO: 54.

In some embodiments, the antibody or antibody fragment comprises: (i) a heavy chain variable domain comprising: a heavy chain complementarity determining region 1 (CDRH1) comprising the amino acid sequence of SEQ ID NO: 67; a heavy chain complementarity determining region 2 (CDRH2) comprising the amino acid sequence of SEQ ID NO: 68; a heavy chain complementarity determining region 3 (CDRH3) comprising the amino acid sequence of SEQ ID NO: 69; and a light chain variable domain comprising: a light chain complementarity determining region 1 (CDRL1) comprising the amino acid sequence of SEQ ID NO: 70; a light chain complementarity determining region 2 (CDRL2) comprising the amino acid sequence of SEQ ID NO: 71; and a light chain complementarity determining region 3 (CDRL3) comprising the amino acid sequence of SEQ ID NO: 72; (ii) a heavy chain variable domain comprising: a heavy chain complementarity determining region 1 (CDRH1) comprising the amino acid sequence of SEQ ID NO: 79; a heavy chain complementarity determining region 2 (CDRH2) comprising the amino acid sequence of SEQ ID NO: 80; a heavy chain complementarity determining region 3 (CDRH3) comprising the amino acid sequence of SEQ ID NO: 81; and a light chain variable domain comprising: a light chain complementarity determining region 1 (CDRL1) comprising the amino acid sequence of SEQ ID NO: 82; a light chain complementarity determining region 2 (CDRL2) comprising the amino acid sequence of SEQ ID NO: 83; and a light chain complementarity determining region 3 (CDRL3) comprising the amino acid sequence of SEQ ID NO: 84; or (iii) a heavy chain variable domain comprising: a heavy chain complementarity determining region 1 (CDRH1) comprising the amino acid sequence of SEQ ID NO: 85; a heavy chain complementarity determining region 2 (CDRH2) comprising the amino acid sequence of SEQ ID NO: 86; a heavy chain complementarity determining region 3 (CDRH3) comprising the amino acid sequence of SEQ ID NO: 87; and a light chain variable domain comprising: a light chain complementarity determining region 1 (CDRL1) comprising the amino acid sequence of SEQ ID NO: 88; a light chain complementarity determining region 2 (CDRL2) comprising the amino acid sequence of SEQ ID NO: 89; and a light chain complementarity determining region 3 (CDRL3) comprising the amino acid sequence of SEQ ID NO: 90.

In some embodiments, the antibody or antibody fragment comprises: (i) a heavy chain variable domain comprising: a heavy chain complementarity determining region 1 (CDRH1) comprising the amino acid sequence of SEQ ID NO: 249; a heavy chain complementarity determining region 2 (CDRH2) comprising the amino acid sequence of SEQ ID NO: 250; a heavy chain complementarity determining region 3 (CDRH3) comprising the amino acid sequence of SEQ ID NO: 251; and a light chain variable domain comprising: a light chain complementarity determining region 1 (CDRL1) comprising the amino acid sequence of SEQ ID NO: 252; a light chain complementarity determining region 2 (CDRL2) comprising the amino acid sequence of SEQ ID NO: 253; and a light chain complementarity determining region 3 (CDRL3) comprising the amino acid sequence of SEQ ID NO: 254; or (ii) a heavy chain variable domain comprising: a heavy chain complementarity determining region 1 (CDRH1) comprising the amino acid sequence of SEQ ID NO: 255; a heavy chain complementarity determining region 2 (CDRH2) comprising the amino acid sequence of SEQ ID NO: 256; a heavy chain complementarity determining region 3 (CDRH3) comprising the amino acid sequence of SEQ ID NO: 257; and a light chain variable domain comprising: a light chain complementarity determining region 1 (CDRL1) comprising the amino acid sequence of SEQ ID NO: 258; a light chain complementarity determining region 2 (CDRL2) comprising the amino acid sequence of SEQ ID NO: 259; and a light chain complementarity determining region 3 (CDRL3) comprising the amino acid sequence of SEQ ID NO: 260.

In some embodiments, the antibody or antibody fragment comprises: (i) a heavy chain variable domain comprising: a heavy chain complementarity determining region 1 (CDRH1) comprising the amino acid sequence of SEQ ID NO: 261; a heavy chain complementarity determining region 2 (CDRH2) comprising the amino acid sequence of SEQ ID NO: 262; a heavy chain complementarity determining region 3 (CDRH3) comprising the amino acid sequence of SEQ ID NO: 263; and a light chain variable domain comprising: a light chain complementarity determining region 1 (CDRL1) comprising the amino acid sequence of SEQ ID NO: 264; a light chain complementarity determining region 2 (CDRL2) comprising the amino acid sequence of SEQ ID NO: 265; and a light chain complementarity determining region 3 (CDRL3) comprising the amino acid sequence of SEQ ID NO: 266; (ii) a heavy chain variable domain comprising: a heavy chain complementarity determining region 1 (CDRH1) comprising the amino acid sequence of SEQ ID NO: 267; a heavy chain complementarity determining region 2 (CDRH2) comprising the amino acid sequence of SEQ ID NO: 268; a heavy chain complementarity determining region 3 (CDRH3) comprising the amino acid sequence of SEQ ID NO: 269; and a light chain variable domain comprising: a light chain complementarity determining region 1 (CDRL1) comprising the amino acid sequence of SEQ ID NO: 270; a light chain complementarity determining region 2 (CDRL2) comprising the amino acid sequence of SEQ ID NO: 271; and a light chain complementarity determining region 3 (CDRL3) comprising the amino acid sequence of SEQ ID NO: 272; or (iii) a heavy chain variable domain comprising: a heavy chain complementarity determining region 1 (CDRH1) comprising the amino acid sequence of SEQ ID NO: 365; a heavy chain complementarity determining region 2 (CDRH2) comprising the amino acid sequence of SEQ ID NO: 366; a heavy chain complementarity determining region 3 (CDRH3) comprising the amino acid sequence of SEQ ID NO: 367; and a light chain variable domain comprising: a light chain complementarity determining region 1 (CDRL1) comprising the amino acid sequence of SEQ ID NO: 368; a light chain complementarity determining region 2 (CDRL2) comprising the amino acid sequence of SEQ ID NO: 369; and a light chain complementarity determining region 3 (CDRL3) comprising the amino acid sequence of SEQ ID NO: 370.

In some embodiments, the antibody or antibody fragment comprises: (i) a heavy chain variable domain comprising: a heavy chain complementarity determining region 1 (CDRH1) comprising the amino acid sequence of SEQ ID NO: 273; a heavy chain complementarity determining region 2 (CDRH2) comprising the amino acid sequence of SEQ ID NO: 274; a heavy chain complementarity determining region 3 (CDRH3) comprising the amino acid sequence of SEQ ID NO: 275; and a light chain variable domain comprising: a light chain complementarity determining region 1 (CDRL1) comprising the amino acid sequence of SEQ ID NO: 276; a light chain complementarity determining region 2 (CDRL2) comprising the amino acid sequence of SEQ ID NO: 277; and a light chain complementarity determining region 3 (CDRL3) comprising the amino acid sequence of SEQ ID NO: 278; (ii) a heavy chain variable domain comprising: a heavy chain complementarity determining region 1 (CDRH1) comprising the amino acid sequence of SEQ ID NO: 279; a heavy chain complementarity determining region 2 (CDRH2) comprising the amino acid sequence of SEQ ID NO: 280; a heavy chain complementarity determining region 3 (CDRH3) comprising the amino acid sequence of SEQ ID NO: 281; and a light chain variable domain comprising: a light chain complementarity determining region 1 (CDRL1) comprising the amino acid sequence of SEQ ID NO: 282; a light chain complementarity determining region 2 (CDRL2) comprising the amino acid sequence of SEQ ID NO: 283; and a light chain complementarity determining region 3 (CDRL3) comprising the amino acid sequence of SEQ ID NO: 284; or (iii) a heavy chain variable domain comprising: a heavy chain complementarity determining region 1 (CDRH1) comprising the amino acid sequence of SEQ ID NO: 285; a heavy chain complementarity determining region 2 (CDRH2) comprising the amino acid sequence of SEQ ID NO: 286; a heavy chain complementarity determining region 3 (CDRH3) comprising the amino acid sequence of SEQ ID NO: 287; and a light chain variable domain comprising: a light chain complementarity determining region 1 (CDRL1) comprising the amino acid sequence of SEQ ID NO: 288; a light chain complementarity determining region 2 (CDRL2) comprising the amino acid sequence of SEQ ID NO: 289; and a light chain complementarity determining region 3 (CDRL3) comprising the amino acid sequence of SEQ ID NO: 290.

In some embodiments, the antibody or antibody fragment comprises: (i) a heavy chain variable domain comprising: a heavy chain complementarity determining region 1 (CDRH1) comprising the amino acid sequence of SEQ ID NO: 291; a heavy chain complementarity determining region 2 (CDRH2) comprising the amino acid sequence of SEQ ID NO: 292; a heavy chain complementarity determining region 3 (CDRH3) comprising the amino acid sequence of SEQ ID NO: 293; and a light chain variable domain comprising: a light chain complementarity determining region 1 (CDRL1) comprising the amino acid sequence of SEQ ID NO: 294; a light chain complementarity determining region 2 (CDRL2) comprising the amino acid sequence of SEQ ID NO: 295; and a light chain complementarity determining region 3 (CDRL3) comprising the amino acid sequence of SEQ ID NO: 296; (ii) a heavy chain variable domain comprising: a heavy chain complementarity determining region 1 (CDRH1) comprising the amino acid sequence of SEQ ID NO: 297; a heavy chain complementarity determining region 2 (CDRH2) comprising the amino acid sequence of SEQ ID NO: 298; a heavy chain complementarity determining region 3 (CDRH3) comprising the amino acid sequence of SEQ ID NO: 299; and a light chain variable domain comprising: a light chain complementarity determining region 1 (CDRL1) comprising the amino acid sequence of SEQ ID NO: 300; a light chain complementarity determining region 2 (CDRL2) comprising the amino acid sequence of SEQ ID NO: 301; and a light chain complementarity determining region 3 (CDRL3) comprising the amino acid sequence of SEQ ID NO: 302; (iii) a heavy chain variable domain comprising: a heavy chain complementarity determining region 1 (CDRH1) comprising the amino acid sequence of SEQ ID NO: 303; a heavy chain complementarity determining region 2 (CDRH2) comprising the amino acid sequence of SEQ ID NO: 304; a heavy chain complementarity determining region 3 (CDRH3) comprising the amino acid sequence of SEQ ID NO: 305; and a light chain variable domain comprising: a light chain complementarity determining region 1 (CDRL1) comprising the amino acid sequence of SEQ ID NO: 306; a light chain complementarity determining region 2 (CDRL2) comprising the amino acid sequence of SEQ ID NO: 307; and a light chain complementarity determining region 3 (CDRL3) comprising the amino acid sequence of SEQ ID NO: 308; or (iv) a heavy chain variable domain comprising: a heavy chain complementarity determining region 1 (CDRH1) comprising the amino acid sequence of SEQ ID NO: 309; a heavy chain complementarity determining region 2 (CDRH2) comprising the amino acid sequence of SEQ ID NO: 310; a heavy chain complementarity determining region 3 (CDRH3) comprising the amino acid sequence of SEQ ID NO: 311; and a light chain variable domain comprising: a light chain complementarity determining region 1 (CDRL1) comprising the amino acid sequence of SEQ ID NO: 312; a light chain complementarity determining region 2 (CDRL2) comprising the amino acid sequence of SEQ ID NO: 312; and a light chain complementarity determining region 3 (CDRL3) comprising the amino acid sequence of SEQ ID NO: 314.

In some embodiments, the antibody or antibody fragment comprises: a heavy chain variable domain comprising: a heavy chain complementarity determining region 1 (CDRH1) comprising the amino acid sequence of SEQ ID NO: 219; a heavy chain complementarity determining region 2 (CDRH2) comprising the amino acid sequence of SEQ ID NO: 220; a heavy chain complementarity determining region 3 (CDRH3) comprising the amino acid sequence of SEQ ID NO: 221; and a light chain variable domain comprising: a light chain complementarity determining region 1 (CDRL1) comprising the amino acid sequence of SEQ ID NO: 222; a light chain complementarity determining region 2 (CDRL2) comprising the amino acid sequence of SEQ ID NO: 223; and a light chain complementarity determining region 3 (CDRL3) comprising the amino acid sequence of SEQ ID NO: 224.

In some embodiments, the antibody or antibody fragment comprises: a heavy chain variable domain comprising: a heavy chain complementarity determining region 1 (CDRH1) comprising the amino acid sequence of SEQ ID NO: 225; a heavy chain complementarity determining region 2 (CDRH2) comprising the amino acid sequence of SEQ ID NO: 226; a heavy chain complementarity determining region 3 (CDRH3) comprising the amino acid sequence of SEQ ID NO: 227; and a light chain variable domain comprising: a light chain complementarity determining region 1 (CDRL1) comprising the amino acid sequence of SEQ ID NO: 228; a light chain complementarity determining region 2 (CDRL2) comprising the amino acid sequence of SEQ ID NO: 229; and a light chain complementarity determining region 3 (CDRL3) comprising the amino acid sequence of SEQ ID NO: 230.

In some embodiments, the antibody or antibody fragment comprises: a heavy chain variable domain comprising: a heavy chain complementarity determining region 1 (CDRH1) comprising the amino acid sequence of SEQ ID NO: 243; a heavy chain complementarity determining region 2 (CDRH2) comprising the amino acid sequence of SEQ ID NO: 244; a heavy chain complementarity determining region 3 (CDRH3) comprising the amino acid sequence of SEQ ID NO: 245; and a light chain variable domain comprising: a light chain complementarity determining region 1 (CDRL1) comprising the amino acid sequence of SEQ ID NO: 246; a light chain complementarity determining region 2 (CDRL2) comprising the amino acid sequence of SEQ ID NO: 247; and a light chain complementarity determining region 3 (CDRL3) comprising the amino acid sequence of SEQ ID NO: 248.

In some embodiments, the antibody or antibody fragment comprises: a heavy chain variable domain comprising: a heavy chain complementarity determining region 1 (CDRH1) comprising the amino acid sequence of SEQ ID NO: 371; a heavy chain complementarity determining region 2 (CDRH2) comprising the amino acid sequence of SEQ ID NO: 372; a heavy chain complementarity determining region 3 (CDRH3) comprising the amino acid sequence of SEQ ID NO: 373; and a light chain variable domain comprising: a light chain complementarity determining region 1 (CDRL1) comprising the amino acid sequence of SEQ ID NO: 374; a light chain complementarity determining region 2 (CDRL2) comprising the amino acid sequence of SEQ ID NO: 375; and a light chain complementarity determining region 3 (CDRL3) comprising the amino acid sequence of SEQ ID NO: 376.

In some embodiments, the antibody or antibody fragment comprises: a heavy chain variable domain comprising: a heavy chain complementarity determining region 1

(CDRH1) comprising the amino acid sequence of SEQ ID NO: 377; a heavy chain complementarity determining region 2 (CDRH2) comprising the amino acid sequence of SEQ ID NO: 378; a heavy chain complementarity determining region 3 (CDRH3) comprising the amino acid sequence of SEQ ID NO: 379; and a light chain variable domain comprising: a light chain complementarity determining region 1 (CDRL1) comprising the amino acid sequence of SEQ ID NO: 380; a light chain complementarity determining region 2 (CDRL2) comprising the amino acid sequence of SEQ ID NO: 381; and a light chain complementarity determining region 3 (CDRL3) comprising the amino acid sequence of SEQ ID NO: 382.

In some embodiments, the antibody or antibody fragment comprises: (i) a heavy chain variable region comprising an amino sequence having at least 85%, 90%, 95%, 98%, 99%, or 100% sequence identity to SEQ ID NO: 91; and a light chain variable region comprising an amino sequence having at least 85%, 90%, 95%, 98%, 99%, or 100% sequence identity to SEQ ID NO: 92; (ii) a heavy chain variable region comprising an amino sequence having at least 85%, 90%, 95%, 98%, 99%, or 100% sequence identity to SEQ ID NO: 93; and a light chain variable region comprising an amino sequence having at least 85%, 90%, 95%, 98%, 99%, or 100% sequence identity to SEQ ID NO: 94; (iii) a heavy chain variable region comprising an amino sequence having at least 85%, 90%, 95%, 98%, 99%, or 100% sequence identity to SEQ ID NO: 95; and a light chain variable region comprising an amino sequence having at least 85%, 90%, 95%, 98%, 99%, or 100% sequence identity to SEQ ID NO: 96; (iv) a heavy chain variable region comprising an amino sequence having at least 85%, 90%, 95%, 98%, 99%, or 100% sequence identity to SEQ ID NO: 97; and a light chain variable region comprising an amino sequence having at least 85%, 90%, 95%, 98%, 99%, or 100% sequence identity to SEQ ID NO: 98; (v) a heavy chain variable region comprising an amino sequence having at least 85%, 90%, 95%, 98%, 99%, or 100% sequence identity to SEQ ID NO: 99; and a light chain variable region comprising an amino sequence having at least 85%, 90%, 95%, 98%, 99%, or 100% sequence identity to SEQ ID NO: 100; (vi) a heavy chain variable region comprising an amino sequence having at least 85%, 90%, 95%, 98%, 99%, or 100% sequence identity to SEQ ID NO: 101; and a light chain variable region comprising an amino sequence having at least 85%, 90%, 95%, 98%, 99%, or 100% sequence identity to SEQ ID NO: 102; (vii) a heavy chain variable region comprising an amino sequence having at least 85%, 90%, 95%, 98%, 99%, or 100% sequence identity to SEQ ID NO: 103; and a light chain variable region comprising an amino sequence having at least 85%, 90%, 95%, 98%, 99%, or 100% sequence identity to SEQ ID NO: 104; (viii) a heavy chain variable region comprising an amino sequence having at least 85%, 90%, 95%, 98%, 99%, or 100% sequence identity to SEQ ID NO: 105; and a light chain variable region comprising an amino sequence having at least 85%, 90%, 95%, 98%, 99%, or 100% sequence identity to SEQ ID NO: 106; (ix) a heavy chain variable region comprising an amino sequence having at least 85%, 90%, 95%, 98%, 99%, or 100% sequence identity to SEQ ID NO: 107; and a light chain variable region comprising an amino sequence having at least 85%, 90%, 95%, 98%, 99%, or 100% sequence identity to SEQ ID NO: 108; (x) a heavy chain variable region comprising an amino sequence having at least 85%, 90%, 95%, 98%, 99%, or 100% sequence identity to SEQ ID NO: 113; and a light chain variable region comprising an amino sequence having at least 85%, 90%, 95%, 98%, 99%, or 100% sequence identity to SEQ ID NO: 114; (xi) a heavy chain variable region comprising an amino sequence having at least 85%, 90%, 95%, 98%, 99%, or 100% sequence identity to SEQ ID NO: 117; and a light chain variable region comprising an amino sequence having at least 85%, 90%, 95%, 98%, 99%, or 100% sequence identity to SEQ ID NO: 118; or (xii) a heavy chain variable region comprising an amino sequence having at least 85%, 90%, 95%, 98%, 99%, or 100% sequence identity to SEQ ID NO: 119; and a light chain variable region comprising an amino sequence having at least 85%, 90%, 95%, 98%, 99%, or 100% sequence identity to SEQ ID NO: 120.

In some embodiments, the antibody or antibody fragment comprises: (i) a heavy chain comprising an amino sequence having at least 85%, 90%, 95%, 98%, 99%, or 100% sequence identity to SEQ ID NO: 121; and a light chain comprising an amino sequence having at least 85%, 90%, 95%, 98%, 99%, or 100% sequence identity to SEQ ID NO: 122; (ii) a heavy chain comprising an amino sequence having at least 85%, 90%, 95%, 98%, 99%, or 100% sequence identity to SEQ ID NO: 123; and a light chain comprising an amino sequence having at least 85%, 90%, 95%, 98%, 99%, or 100% sequence identity to SEQ ID NO: 124; (iii) a heavy chain comprising an amino sequence having at least 85%, 90%, 95%, 98%, 99%, or 100% sequence identity to SEQ ID NO: 125; and a light chain comprising an amino sequence having at least 85%, 90%, 95%, 98%, 99%, or 100% sequence identity to SEQ ID NO: 126; (iv) a heavy chain comprising an amino sequence having at least 85%, 90%, 95%, 98%, 99%, or 100% sequence identity to SEQ ID NO: 127; and a light chain comprising an amino sequence having at least 85%, 90%, 95%, 98%, 99%, or 100% sequence identity to SEQ ID NO: 128; (v) a heavy chain comprising an amino sequence having at least 85%, 90%, 95%, 98%, 99%, or 100% sequence identity to SEQ ID NO: 129; and a light chain comprising an amino sequence having at least 85%, 90%, 95%, 98%, 99%, or 100% sequence identity to SEQ ID NO: 130; (vi) a heavy chain comprising an amino sequence having at least 85%, 90%, 95%, 98%, 99%, or 100% sequence identity to SEQ ID NO: 131; and a light chain comprising an amino sequence having at least 85%, 90%, 95%, 98%, 99%, or 100% sequence identity to SEQ ID NO: 132; (vii) a heavy chain comprising an amino sequence having at least 85%, 90%, 95%, 98%, 99%, or 100% sequence identity to SEQ ID NO: 133; and a light chain comprising an amino sequence having at least 85%, 90%, 95%, 98%, 99%, or 100% sequence identity to SEQ ID NO: 134; (viii) a heavy chain comprising an amino sequence having at least 85%, 90%, 95%, 98%, 99%, or 100% sequence identity to SEQ ID NO: 135; and a light chain comprising an amino sequence having at least 85%, 90%, 95%, 98%, 99%, or 100% sequence identity to SEQ ID NO: 136; (ix) a heavy chain comprising an amino sequence having at least 85%, 90%, 95%, 98%, 99%, or 100% sequence identity to SEQ ID NO: 137; and a light chain comprising an amino sequence having at least 85%, 90%, 95%, 98%, 99%, or 100% sequence identity to SEQ ID NO: 138; (x) a heavy chain comprising an amino sequence having at least 85%, 90%, 95%, 98%, 99%, or 100% sequence identity to SEQ ID NO: 143; and a light chain comprising an amino sequence having at least 85%, 90%, 95%, 98%, 99%, or 100% sequence identity to SEQ ID NO: 144; (xi) a heavy chain comprising an amino sequence having at least 85%, 90%, 95%, 98%, 99%, or 100% sequence identity to SEQ ID NO: 147; and a light chain comprising an amino sequence having at least 85%, 90%, 95%, 98%, 99%, or 100% sequence identity to SEQ ID NO: 148; or (xii) a heavy chain comprising an amino sequence having at least 85%, 90%, 95%, 98%, 99%, or 100% sequence identity to SEQ ID NO: 149; and a light chain comprising an amino sequence having at least 85%, 90%, 95%, 98%, 99%, or 100% sequence identity to SEQ ID NO: 150.

In some embodiments, the antibody or antibody fragment comprises: (i) a heavy chain comprising an amino sequence having at least 85%, 90%, 95%, 98%, 99%, or 100% sequence identity to SEQ ID NO: 315; and a light chain comprising an amino sequence having at least 85%, 90%, 95%, 98%, 99%, or 100% sequence identity to SEQ ID NO: 316; (ii) a heavy chain comprising an amino sequence having at least 85%, 90%, 95%, 98%, 99%, or 100% sequence identity to SEQ ID NO: 317; and a light chain comprising an amino sequence having at least 85%, 90%, 95%, 98%, 99%, or 100% sequence identity to SEQ ID NO: 318; (iii) a heavy chain comprising an amino sequence having at least 85%, 90%, 95%, 98%, 99%, or 100% sequence identity to SEQ ID NO: 319; and a light chain comprising an amino sequence having at least 85%, 90%, 95%, 98%, 99%, or 100% sequence identity to SEQ ID NO: 320; (iv) a heavy chain comprising an amino sequence having at least 85%, 90%, 95%, 98%, 99%, or 100% sequence identity to SEQ ID NO: 321; and a light chain comprising an amino sequence having at least 85%, 90%, 95%, 98%, 99%, or 100% sequence identity to SEQ ID NO: 322; (v) a heavy chain comprising an amino sequence having at least 85%, 90%, 95%, 98%, 99%, or 100% sequence identity to SEQ ID NO: 323; and a light chain comprising an amino sequence having at least 85%, 90%, 95%, 98%, 99%, or 100% sequence identity to SEQ ID NO: 324; (vi) a heavy chain comprising an amino sequence having at least 85%, 90%, 95%, 98%, 99%, or 100% sequence identity to SEQ ID NO: 327; and a light chain comprising an amino sequence having at least 85%, 90%, 95%, 98%, 99%, or 100% sequence identity to SEQ ID NO: 328; (vii) a heavy chain comprising an amino sequence having at least 85%, 90%, 95%, 98%, 99%, or 100% sequence identity to SEQ ID NO: 329; and a light chain comprising an amino sequence having at least 85%, 90%, 95%, 98%, 99%, or 100% sequence identity to SEQ ID NO: 330; (viii) a heavy chain comprising an amino sequence having at least 85%, 90%, 95%, 98%, 99%, or 100% sequence identity to SEQ ID NO: 331; and a light chain comprising an amino sequence having at least 85%, 90%, 95%, 98%, 99%, or 100% sequence identity to SEQ ID NO: 332; (ix) a heavy chain comprising an amino sequence having at least 85%, 90%, 95%, 98%, 99%, or 100% sequence identity to SEQ ID NO: 333; and a light chain comprising an amino sequence having at least 85%, 90%, 95%, 98%, 99%, or 100% sequence identity to SEQ ID NO: 334; (x) a heavy chain comprising an amino sequence having at least 85%, 90%, 95%, 98%, 99%, or 100% sequence identity to SEQ ID NO: 335; and a light chain comprising an amino sequence having at least 85%, 90%, 95%, 98%, 99%, or 100% sequence identity to SEQ ID NO: 336; (xi) a heavy chain comprising an amino sequence having at least 85%, 90%, 95%, 98%, 99%, or 100% sequence identity to SEQ ID NO: 337; and a light chain comprising an amino sequence having at least 85%, 90%, 95%, 98%, 99%, or 100% sequence identity to SEQ ID NO: 338; (xii) a heavy chain comprising an amino sequence having at least 85%, 90%, 95%, 98%, 99%, or 100% sequence identity to SEQ ID NO: 339; and a light chain comprising an amino sequence having at least 85%, 90%, 95%, 98%, 99%, or 100% sequence identity to SEQ ID NO: 340; (xiii) a heavy chain comprising an amino sequence having at least 85%, 90%, 95%, 98%, 99%, or 100% sequence identity to SEQ ID NO: 345; and a light chain comprising an amino sequence having at least 85%, 90%, 95%, 98%, 99%, or 100% sequence identity to SEQ ID NO: 346; (xiv) a heavy chain comprising an amino sequence having at least 85%, 90%, 95%, 98%, 99%, or 100% sequence identity to SEQ ID NO: 347; and a light chain comprising an amino sequence having at least 85%, 90%, 95%, 98%, 99%, or 100% sequence identity to SEQ ID NO: 348; (xv) a heavy chain comprising an amino sequence having at least 85%, 90%, 95%, 98%, 99%, or 100% sequence identity to SEQ ID NO: 349; and a light chain comprising an amino sequence having at least 85%, 90%, 95%, 98%, 99%, or 100% sequence identity to SEQ ID NO: 350; (xvi) a heavy chain comprising an amino sequence having at least 85%, 90%, 95%, 98%, 99%, or 100% sequence identity to SEQ ID NO: 351; and a light chain comprising an amino sequence having at least 85%, 90%, 95%, 98%, 99%, or 100% sequence identity to SEQ ID NO: 352; (xvii) a heavy chain comprising an amino sequence having at least 85%, 90%, 95%, 98%, 99%, or 100% sequence identity to SEQ ID NO: 357; and a light chain comprising an amino sequence having at least 85%, 90%, 95%, 98%, 99%, or 100% sequence identity to SEQ ID NO: 358; (xviii) a heavy chain comprising an amino sequence having at least 85%, 90%, 95%, 98%, 99%, or 100% sequence identity to SEQ ID NO: 359; and a light chain comprising an amino sequence having at least 85%, 90%, 95%, 98%, 99%, or 100% sequence identity to SEQ ID NO: 360; (xix) a heavy chain comprising an amino sequence having at least 85%, 90%, 95%, 98%, 99%, or 100% sequence identity to SEQ ID NO: 361; and a light chain comprising an amino sequence having at least 85%, 90%, 95%, 98%, 99%, or 100% sequence identity to SEQ ID NO: 362; (xx) a heavy chain comprising an amino sequence having at least 85%, 90%, 95%, 98%, 99%, or 100% sequence identity to SEQ ID NO: 363; and a light chain comprising an amino sequence having at least 85%, 90%, 95%, 98%, 99%, or 100% sequence identity to SEQ ID NO: 364; or (xxi) a heavy chain comprising an amino sequence having at least 85%, 90%, 95%, 98%, 99%, or 100% sequence identity to SEQ ID NO: 383; and a light chain comprising an amino sequence having at least 85%, 90%, 95%, 98%, 99%, or 100% sequence identity to SEQ ID NO: 384.

In some embodiments, the antibody or antibody fragment is an antibody fragment, and wherein the antibody fragment comprises or consists of a single chain variable fragment (scFv), a Fab, Fab2, Fab3, F(ab')2 diabody, triabody, tetrabody, BiTE, tandABs, or DART.

In some embodiments, the antibody or antibody fragment does not activate basophils in a dose-dependent manner and/or does not induce a percent of CD63+ basophils greater than 10% when assayed as in Example 3.

In some embodiments, the antibody or antibody fragment exhibits less than 10%, less than 9%, or less than 8% change in main capillary isoelectric focusing (cIEF) peak percentage after heat stress at 40° C. for 14 days.

In some embodiments, the antibody or antibody fragment (1) does not activate basophils and/or mast cells, (2) dissociates IgE from FcεRI on mast cells in 20 hours at an IC50 of IgE dissociation of less than less than 1,500 nM, less, than 1,250 nM, 1,000 less than nM, less than 900 nM, less than 800 nM or less than 700 nM; and (3) exhibits less than 10%, less than 9%, or less than 8% change in main capillary isoelectric focusing (cIEF) peak percentage after heat stress.

In some embodiments, the antibody or antibody fragment dissociates IgE from FcεRI on mast cells in 20 hours at an IC50 of IgE dissociation of less than less than 700 nM.

In some embodiments, the antibody or antibody fragment dissociates IgE from FcεRI on human basophils in 20 hours at an IC50 of IgE dissociation of less than 150 nM, less than 125 nM, less than 100 nM, less than 90 nM, less than 80 nM, less than 70 nM, less than 60 nM, less than 50 nM, or less than 40 nM. In some embodiments, the antibody or antibody fragment dissociates IgE from FcεRI on human basophils in 20 hours at an IC50 of IgE dissociation of less than 40 nM.

In some embodiments, the antibody or antibody fragment exhibits less than 10%, less than 9%, or less than 8% change in main capillary isoelectric focusing (cIEF) peak percentage after heat stress. In some embodiments, the antibody or antibody fragment exhibits less than 8% change in main capillary isoelectric focusing (cIEF) peak percentage after heat stress.

In some embodiments, the antibody or antibody fragment does not have any DG motif(s) within any of the CDRs of the antibody or antibody fragment. In some embodiments, the antibody or antibody fragment does not have any methionine (M) residue(s) within any of the CDRs of the antibody or antibody fragment.

In some embodiments, the antibody or antibody fragment is an antibody or antibody fragment as described above.

In some embodiments, a variable domain of the antibody or antibody fragment and a constant domain of the antibody or antibody fragment are directly conjugated to one another without an intervening flexible elbow.

In another aspect disclosed herein is a composition comprising: a liquid medium; and means for, upon administration to a subject, concomitantly dissociating IgE from FcεRI on mast cells in 20 hours at an IC50 of IgE dissociation of less than 1,500 nM, less than 1,250 nM, less than 1,000 less than nM, less than 900 nM, less than 800 nM, or less than 700 nM while not activating basophils and/or mast cells, wherein the means exhibits less than 10%, less than 9%, or less than 8% change in main capillary isoelectric focusing (cIEF) peak percentage after heat stress.

In some embodiments, the means dissociates IgE from FcεRI on mast cells in 20 hours at an $IC_{50}$ of IgE dissociation of less than 700 nM while not activating basophils and/or mast cells.

In some embodiments, the means dissociates IgE from FcεRI on human basophils in 20 hours at an IC50 of IgE dissociation of less than 150 nM, less than 125 nM, less than 100 nM, less than 90 nM, less than 80 nM, less than 70 nM, less than 60 nM, less than 50 nM, or less than 40 nM. In some embodiments, the means dissociates IgE from FcεRI on human basophils in 20 hours at an $IC_{50}$ of IgE dissociation of less than 40 nM.

In some embodiments, the means further exhibits less than 10%, less than 9%, or less than 8% change in main capillary isoelectric focusing (cIEF) peak percentage after heat stress. In some embodiments, wherein the means further exhibits less than 8% change in main capillary isoelectric focusing (cIEF) peak percentage after heat stress.

In some embodiments, the means binds IgE with an affinity (KD) equal to or less than 5 nanomolar (nM), less than 1 nM, less than 0.5 nM, or less than 0.3 nM. In some embodiments, the means binds IgE with an affinity (KD) equal to or less than 0.5 nanomolar (nM).

In some embodiments, the means do not have any DG motif(s) within any CDR. In some embodiments, the means do not have any methionine (M) residue(s) within any CDR.

In some embodiments, the liquid medium comprises water.

In another aspect disclosed herein is a method of treating an inflammatory disease or disorder in an individual, the method comprising: administering an antibody or antibody fragment as described above or a composition as described above to the individual in need thereof.

In some embodiments, the inflammatory disease or disorder is chronic spontaneous urticaria, asthma, or an allergy. In some embodiments, the allergy is a food allergy.

In another aspect disclosed herein is a method of dissociating an IgE constant domain from FcεRI, the method comprising: contacting the IgE constant domain with an antibody or antibody as described above or a composition as described above.

In some embodiments, the FcεRI is expressed on the surface of a cell. In some embodiments, the cell is a mast cell. In some embodiments, the cell is a basophil. In some embodiments, the cell is in an individual.

In some embodiments, provided herein are methods treating an inflammatory disease or disorder in an individual, the method comprising: administering the antibody or antibody fragment that binds IgE described herein to the individual in need thereof. In certain embodiments, the inflammatory disease or disorder is and IgE-mediated inflammatory disease or disorder. In certain embodiments, the inflammatory disease or disease is chronic spontaneous urticaria, asthma, or a food allergy.

BRIEF DESCRIPTION OF THE DRAWINGS

Various features of the disclosure are set forth with particularity in the appended claims. A better understanding of the features and advantages of the present disclosure will be obtained by reference to the following detailed description that sets forth illustrative embodiments, in which the principles of the invention are utilized, and the accompanying drawings of which:

DETAILED DESCRIPTION

IgE-Binding Antibodies

Figure 1A:
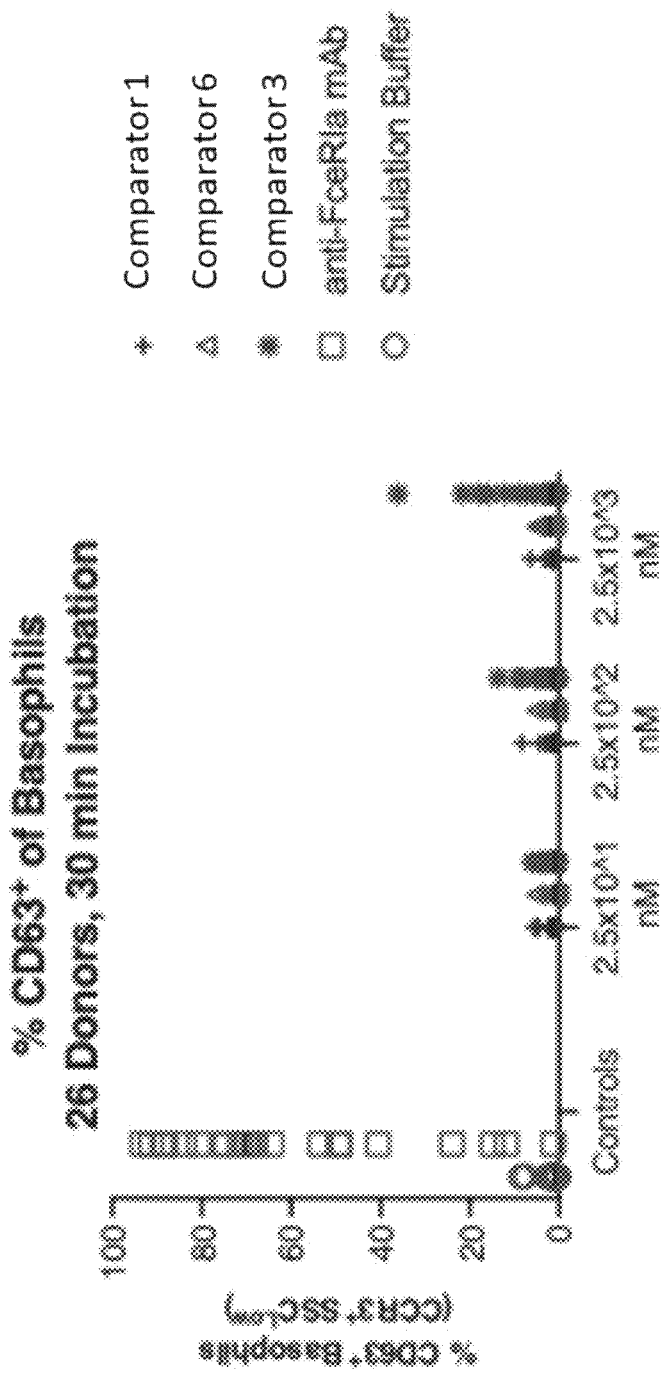
FIGS. 1A and 1B show activation profiles of anti-IgE antibodies in whole blood basophils.

Provided and exemplified herein are antibodies and antibody fragments that bind an IgE constant domain and dissociate IgE from FcεRI expressed on the surface of a cell (e.g., mast cell or basophil). In certain instances, the antibodies and antibody fragments are useful in that they (1) potently dissociate IgE from FcεRI on mast cells and basophils, (2) do not result in the activation of basophil and/or mast cell, (3) are thermally and chemical stable, (4) lack any DG motif(s) within their CDRs, and/or (5) lack any methionine (M) residue(s) within their CDRs. In certain instances, these advantageous properties make the antibodies described herein useful for treating IgE-mediated diseases, disorders, and conditions (e.g., diseases, disorders, and conditions characterized by IgE-mediated immune activation).

The term "antibody" is used in the broadest sense and generally refers to and/or includes monoclonal antibodies, multi-valent antibodies, multi-specific, and antigen-binding fragments of antibodies that bind an IgE constant domain protein. Antigen-binding fragments of antibodies (antibody fragments that bind an IgE constant domain) generally refer to and/or include antibody-derived moieties or proteins that comprise a functional set of CDRs (e.g., a CDR-H1-3 and CDR-L1-3) that bind an IgE constant domain protein and have a molecular weight less than a full-length IgG antibody (e.g., a molecular weight less than ~150,000 Daltons). In certain embodiments, an antigen-binding antibody fragment includes: fragment antigen binding (Fab) fragments, F(ab')2 fragments, Fab' fragments, Fv fragments, IgG (rIgG) fragments, and single chain antibody fragments, including single chain variable fragments (sFv or scFv). Antibodies and antigen-binding fragments of antibodies generally encompass genetically engineered, and/or otherwise modified forms of immunoglobulins, such as intrabodies, peptibodies, chimeric antibodies, fully human antibodies, humanized antibodies, and heteroconjugate antibodies, multi-specific antibodies, multi-valent antibodies, diabodies, triabodies, and tetrabodies, tandem di-scFv, tandem tri-scFv. A full-length antibody, intact antibody, and/or whole antibody are interchangeable, and generally include and/or refer to an antibody having a structure substantially similar to a native antibody structure having heavy chains that contain an Fc region and/or include antibodies of any class or sub-class, including IgG and sub-classes thereof (e.g., IgG1 and IgG4), IgM, IgE, IgA, and IgD.

Antibody and/or antibody fragments that bind an IgE constant domain generally refer to and/or includes an antibody that binds an IgE constant domain protein comprising a protein having the amino acid sequence of SEQ ID NO: 163. Generally, an anti-IgE constant domain antibody or IgE constant domain-binding antibody fragment is specific for an IgE constant domain protein (e.g., selectively recognizes and binds to an IgE constant domain protein over other immunoglobulin constant domains). Binding can be determined by bio-layer interferometry, surface plasmon resonance, isothermal titration calorimetry, FACs, and/or ELISA. Affinity generally refers to and/or includes the strength of the sum total of noncovalent interactions between a single binding site of a molecule (e.g., an antibody or antibody fragment) and its binding partner (e.g., an antigen such as IgE constant domain). Unless indicated otherwise, binding affinity generally encompasses and refers to intrinsic binding affinity which reflects a 1:1 interaction between members of a binding pair (e.g., antibody and antigen). The affinity of an antibody for an antigen (e.g., IgE constant domain) can generally be represented by the dissociation constant ($K_D$). Affinity can be measured by can be measured and determined by bio-layer interferometry, surface plasmon resonance, isothermal titration calorimetry, and/or ELISA.

IgE (immunoglobulin heavy constant epsilon) generally refers to and/or includes the protein encoded by the IGHE gene and functions in allergic responses by binding to FcεRI on mast cells and basophils, triggering the release of inflammatory mediators upon exposure to specific allergens. In certain embodiments, the IGHE gene refers to NCBI GeneID 3497 and/or HGNC ID: HGNC:5522, which includes sequence information on isoforms. In certain embodiments, an IgE constant domain protein refers to and includes the protein(s) of UniProt ID: P01854. In certain instances, IgE constant domain comprises a protein comprising the amino acid sequence of SEQ ID NOs: 163 or a homologue or an orthologue or variant thereof (e.g., as referenced in NCBI GeneID 3497 and/or HGNC ID: HGNC: 5522). In certain instances, IgE constant domain comprises an amino acid sequence having at least 90%, 95%, 97%, 98%, or 99% sequence identity to of SEQ ID NO: 163.

Complementarity determining regions (CDRs) generally include amino acids within antibody variable regions (e.g., contiguous or non-contiguous) that confer antigen specificity and/or binding affinity (e.g., to an IgE constant domain). In general, there are three CDRs in each heavy chain variable region (CDR-H1, CDR-H2, CDR-H3) and three CDRs in each light chain variable region (CDR-L1, CDR-L2, CDR-L3). Framework regions (FRs) generally refer to and/or include non-CDR regions of the heavy and light chain variable regions. In general, there are four FRs in each full-length heavy chain variable region (FR-H1, FR-H2, FR-H3, and FR-H4), and four FRs in each full-length light chain variable region (FR-L1, FR-L2, FR-L3, and FR-L4).

Variable regions (also referred to as variable domains) generally refer to and/or include the domain of an antibody heavy or light chain that is involved in binding the antibody to antigen (e.g., a single variable domain comprises a CDR 1, CDR 2, and CDR 3). The variable domains of the heavy chain and light chain (VH and VL, respectively) of a native antibody generally have similar structures, with each domain comprising four conserved framework regions (FRs) and three CDRs In certain instances, a single VH or VL domain can be sufficient to confer antigen-binding specificity (e.g., binding to an IgE constant domain).

An Fc region generally encompasses and/or refers to a C-terminal region of an immunoglobulin heavy chain that contains at least a portion of the constant region. Generally, the Fc domain includes an immunoglobulin CH2 and CH3 domain (e.g., an IgG CH2 and CH3 domain). The term includes native sequence Fc regions and variant Fc regions. In one embodiment, a human IgG heavy chain Fc region extends from Cys226, or from Pro230, to the carboxyl-terminus of the heavy chain, per EU numbering. However, the C-terminal lysine (Lys447) of the Fc region may or may not be present. Unless otherwise specified herein, numbering of amino acid residues in the Fc region or constant region is according to the EU numbering system, also called the EU index, as described in Kabat et al., Sequences of Proteins of Immunological Interest, 5th Ed. Public Health Service, National Institutes of Health, Bethesda, MD, 1991. In certain embodiments, the Fc region includes IgG and sub-classes thereof (e.g., IgG1 and IgG4), IgM, IgE, IgA, and/or IgD heavy chain constant regions and/or heavy chain constant regions derived from IgG and sub-classes thereof (e.g., IgG1 and IgG4), IgM, IgE, IgA, and IgD.

Provided and exemplified herein are antibodies and antibody fragments that bind an IgE constant domain comprising:

(i) a heavy chain variable domain comprising: a heavy chain complementarity determining region 1 (CDRH1) comprising the amino acid sequence of SEQ ID NO: 1; a heavy chain complementarity determining region 2 (CDRH2) comprising the amino acid sequence of SEQ ID NO: 2; and a heavy chain complementarity determining region 3 (CDRH3) comprising the amino acid sequence of SEQ ID NO: 3; and a light chain variable domain comprising: a light chain complementarity determining region 1 (CDRL1) comprising the amino acid sequence of SEQ ID NO: 4; a light chain complementarity determining region 2 (CDRL2) comprising the amino acid sequence of SEQ ID NO: 5; and a light chain complementarity determining region 3 (CDRL3) comprising the amino acid sequence of SEQ ID NO: 6;

(ii) a heavy chain variable domain comprising: a heavy chain complementarity determining region 1 (CDRH1) comprising the amino acid sequence of SEQ ID NO: 7; a heavy chain complementarity determining region 2

(CDRH2) comprising the amino acid sequence of SEQ ID NO: 8; a heavy chain complementarity determining region 3 (CDRH3) comprising the amino acid sequence of SEQ ID NO: 9; and a light chain variable domain comprising: a light chain complementarity determining region 1 (CDRL1) comprising the amino acid sequence of SEQ ID NO: 10; a light chain complementarity determining region 2 (CDRL2) comprising the amino acid sequence of SEQ ID NO: 11; and a light chain complementarity determining region 3 (CDRL3) comprising the amino acid sequence of SEQ ID NO: 12;

(iii) a heavy chain variable domain comprising: a heavy chain complementarity determining region 1 (CDRH1) comprising the amino acid sequence of SEQ ID NO: 13; a heavy chain complementarity determining region 2 (CDRH2) comprising the amino acid sequence of SEQ ID NO: 14; a heavy chain complementarity determining region 3 (CDRH3) comprising the amino acid sequence of SEQ ID NO: 15; and a light chain variable domain comprising: a light chain complementarity determining region 1 (CDRL1) comprising the amino acid sequence of SEQ ID NO: 16; a light chain complementarity determining region 2 (CDRL2) comprising the amino acid sequence of SEQ ID NO: 17; and a light chain complementarity determining region 3 (CDRL3) comprising the amino acid sequence of SEQ ID NO: 18;

(iv) a heavy chain variable domain comprising: a heavy chain complementarity determining region 1 (CDRH1) comprising the amino acid sequence of SEQ ID NO: 19; a heavy chain complementarity determining region 2 (CDRH2) comprising the amino acid sequence of SEQ ID NO: 20; a heavy chain complementarity determining region 3 (CDRH3) comprising the amino acid sequence of SEQ ID NO: 21; and a light chain variable domain comprising: a light chain complementarity determining region 1 (CDRL1) comprising the amino acid sequence of SEQ ID NO: 22; a light chain complementarity determining region 2 (CDRL2) comprising the amino acid sequence of SEQ ID NO: 23; and a light chain complementarity determining region 3 (CDRL3) comprising the amino acid sequence of SEQ ID NO: 24;

(v) a heavy chain variable domain comprising: a heavy chain complementarity determining region 1 (CDRH1) comprising the amino acid sequence of SEQ ID NO: 25; a heavy chain complementarity determining region 2 (CDRH2) comprising the amino acid sequence of SEQ ID NO: 26; a heavy chain complementarity determining region 3 (CDRH3) comprising the amino acid sequence of SEQ ID NO: 27; and a light chain variable domain comprising: a light chain complementarity determining region 1 (CDRL1) comprising the amino acid sequence of SEQ ID NO: 28; a light chain complementarity determining region 2 (CDRL2) comprising the amino acid sequence of SEQ ID NO: 29; and a light chain complementarity determining region 3 (CDRL3) comprising the amino acid sequence of SEQ ID NO: 30; or (Vi) a heavy chain variable domain comprising: a heavy chain complementarity determining region 1 (CDRH1) comprising the amino acid sequence of SEQ ID NO: 31; a heavy chain complementarity determining region 2 (CDRH2) comprising the amino acid sequence of SEQ ID NO: 32; a heavy chain complementarity determining region 3 (CDRH3) comprising the amino acid sequence of SEQ ID NO: 33; and a light chain variable domain comprising: a light chain complementarity determining region 1 (CDRL1) comprising the amino acid sequence of SEQ ID NO: 34; a light chain complementarity determining region 2 (CDRL2) comprising the amino acid sequence of SEQ ID NO: 35; and a light chain complementarity determining region 3 (CDRL3) comprising the amino acid sequence of SEQ ID NO: 36.

As described and exemplified herein, the antibodies and antibody fragments that bind an IgE constant domain can show advantageous properties that include: (1) potently dissociating IgE from FcεRI on mast cells and basophils, (2) not resulting in the activation of basophil and/or mast cell, (3) being thermally and chemical stable, (4) lacking any DG motif(s) within their CDRs, and/or (5) lacking any methionine (M) residue(s) within their CDRs. In certain instances, these advantageous properties make antibodies and antibody fragments described herein useful for treating IgE-mediated diseases, disorders, and conditions (e.g., diseases, disorders, and conditions characterized by IgE-mediated immune activation). Accordingly, in some embodiments, the antibodies and antibody fragments that bind an IgE constant domain: (1) do not result in the activation of basophils (e.g., as measured in Example 3); (2) dissociate IgE from FcεRI on mast cells in 20 hours at an IC50 of IgE dissociation of less than 1,500 nM, less than 1,250, less than 1,000 less than nM, less than 900 nM, less than 800 nM or less than 700 nM (e.g., as measured in Example 2); (3) dissociate IgE from FcεRI on human basophils in 20 hours at an IC50 of IgE dissociation of less than 150 nM, less than 125 nM, less than 100 nM, less than 90 nM, less than 80 nM, less than 70 nM, less than 60 nM, less than 50 nM, or less than 40 nM (e.g., as measured in Example 4); (4) exhibit less than 10%, less than 9%, or less than 8% change in main capillary isoelectric focusing (cIEF) peak percentage after heat stress (e.g., as measured in Example 5); (5) do not have any DG motif(s) within the CDRH1, CDRH2, CDRH3, CDRL1, CDRL2, and CDRL3; and (6) do not have any methionine (M) residue(s) within the CDRH1, CDRH2, CDRH3, CDRL1, CDRL2, and CDRL3. Lack of any DG (Asp-Gly) motif(s) in the CDRs can decrease susceptibility to isomerization of aspartic acid (D) within the CDRs. Lack of any methionine (M) residue(s) in the CDRs can decrease susceptibility to oxidation of the antibodies and antibody fragments. As further exemplified herein, the antibodies and antibody fragments that bind an IgE constant domain can include a modification at framework position 74 of SEQ ID NO: 95 (VH position 73 per Kabat numbering), wherein the modification is not an aspartic acid (D). The modification can be a glycine or any other residue that does not have a negatively charged amino acid side chain at a physiological pH (e.g., alanine (A) or serine(S)). In certain embodiments, the antibodies and antibody fragments that bind an IgE constant domain comprise a glycine (G) at position 74 of SEQ ID NO: 95 (VH position 73 per Kabat numbering). In certain embodiments, the antibodies and antibody fragments that bind an IgE constant domain comprises an amino acid other than aspartic acid (D) or glutamic acid (E) at position 74 of SEQ ID NO: 95 (VH position 73 per Kabat numbering). In some embodiments, the antibodies and antibody fragments that bind an IgE constant domain comprise an amino acid other than aspartic acid (D) at the framework position corresponding to amino acid position 74 of SEQ ID NO: 95 (Kabat VH framework position 73).

As also exemplified herein, the antibodies and antibody fragments that bind an IgE constant domain can include a modified Fc domain comprising an amino acid modification that increases binding to the neonatal Fc receptor (FcRn) relative to wild-type IgG1 or IgG4. For example, the Fc domain can comprise the amino acids Y252/T254/E256 (YTE) or L428/S434 (LS) per EU numbering. In certain embodiments. In certain embodiments, the antibodies and antibody fragments that bind an IgE comprise an Fc domain comprising modified Fc domain comprises the amino acids L428/S434 (LS) per EU numbering. In certain embodiments, the antibodies and antibody fragments that bind an IgE comprise an Fc domain comprising modified Fc domain comprises the amino acids Y252/T254/E256 (YTE) per EU numbering.

Antibodies and antibody fragments that bind an IgE constant domain can be capable of binding the IgE constant domain at sub 10 nanomolar affinities. In certain instances, the antibody or antibody fragment binds IgE with an affinity ($K_D$) equal to or less than 5 nanomolar (nM), less than 1 nM, less than 0.5 nM, less than 0.4 nM, less than 0.3 nM, or less than 0.2 nM.

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 1; a heavy chain complementarity determining region 2 (CDRH2) comprising the amino acid sequence of SEQ ID NO: 2; and a heavy chain complementarity determining region 3 (CDRH3) comprising the amino acid sequence of SEQ ID NO: 3; and a light chain variable domain comprising: a light chain complementarity determining region 1 (CDRL1) comprising the amino acid sequence of SEQ ID NO: 4; a light chain complementarity determining region 2 (CDRL2) comprising the amino acid sequence of SEQ ID NO: 5; and a light chain complementarity determining region 3 (CDRL3) comprising the amino acid sequence of SEQ ID NO: 6.

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 7; a heavy chain complementarity determining region 2 (CDRH2) comprising the amino acid sequence of SEQ ID NO: 8; a heavy chain complementarity determining region 3 (CDRH3) comprising the amino acid sequence of SEQ ID NO: 9; and a light chain variable domain comprising: a light chain complementarity determining region 1 (CDRL1) comprising the amino acid sequence of SEQ ID NO: 10; a light chain complementarity determining region 2 (CDRL2) comprising the amino acid sequence of SEQ ID NO: 11; and a light chain complementarity determining region 3 (CDRL3) comprising the amino acid sequence of SEQ ID NO: 12.

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 13; a heavy chain complementarity determining region 2 (CDRH2) comprising the amino acid sequence of SEQ ID NO: 14; a heavy chain complementarity determining region 3 (CDRH3) comprising the amino acid sequence of SEQ ID NO: 15; and a light chain variable domain comprising: a light chain complementarity determining region 1 (CDRL1) comprising the amino acid sequence of SEQ ID NO: 16; a light chain complementarity determining region 2 (CDRL2) comprising the amino acid sequence of SEQ ID NO: 17; and a light chain complementarity determining region 3 (CDRL3) comprising the amino acid sequence of SEQ ID NO: 18;

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 19; a heavy chain complementarity determining region 2 (CDRH2) comprising the amino acid sequence of SEQ ID NO: 20; a heavy chain complementarity determining region 3 (CDRH3) comprising the amino acid sequence of SEQ ID NO: 21; and a light chain variable domain comprising: a light chain complementarity determining region 1 (CDRL1) comprising the amino acid sequence of SEQ ID NO: 22; a light chain complementarity determining region 2 (CDRL2) comprising the amino acid sequence of SEQ ID NO: 23; and a light chain complementarity determining region 3 (CDRL3) comprising the amino acid sequence of SEQ ID NO: 24;

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 25; a heavy chain complementarity determining region 2 (CDRH2) comprising the amino acid sequence of SEQ ID NO: 26; a heavy chain complementarity determining region 3 (CDRH3) comprising the amino acid sequence of SEQ ID NO: 27; and a light chain variable domain comprising: a light chain complementarity determining region 1 (CDRL1) comprising the amino acid sequence of SEQ ID NO: 28; a light chain complementarity determining region 2 (CDRL2) comprising the amino acid sequence of SEQ ID NO: 29; and a light chain complementarity determining region 3 (CDRL3) comprising the amino acid sequence of SEQ ID NO: 30; or In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 31; a heavy chain complementarity determining region 2 (CDRH2) comprising the amino acid sequence of SEQ ID NO: 32; a heavy chain complementarity determining region 3 (CDRH3) comprising the amino acid sequence of SEQ ID NO: 33; and a light chain variable domain comprising: a light chain complementarity determining region 1 (CDRL1) comprising the amino acid sequence of SEQ ID NO: 34; a light chain complementarity determining region 2 (CDRL2) comprising the amino acid sequence of SEQ ID NO: 35; and a light chain complementarity determining region 3 (CDRL3) comprising the amino acid sequence of SEQ ID NO: 36.

Provided and exemplified herein are antibodies and antibody fragments comprising: a heavy chain variable domain comprising: a heavy chain complementarity determining region 1 (CDRH1) comprising the amino acid sequence of SEQ ID NO: 37; a heavy chain complementarity determining region 2 (CDRH2) comprising the amino acid sequence of SEQ ID NO: 38; a heavy chain complementarity determining region 3 (CDRH3) comprising the amino acid sequence of SEQ ID NO: 39; and a light chain variable domain comprising: a light chain complementarity determining region 1 (CDRL1) comprising the amino acid sequence of SEQ ID NO: 40; a light chain complementarity determining region 2 (CDRL2) comprising the amino acid sequence of SEQ ID NO: 41; and a light chain complementarity determining region 3 (CDRL3) comprising the amino acid sequence of SEQ ID NO: 42.

As described and exemplified herein, antibodies and antibody fragments that bind an IgE constant domain can show advantageous properties that include: (1) potently dissociating IgE from FcεRI on mast cells and basophils, (2) not resulting in the activation of basophil and/or mast cell, (3) being thermally and chemical stable, (4) lacking any DG motif(s) within their CDRs, and/or (5) lacking any methionine (M) residue(s) within their CDRs. In certain instances, these advantageous properties make the antibodies describe here useful for treating IgE-mediated diseases, disorders, and conditions (e.g., diseases, disorders, and conditions characterized by IgE-mediated immune activation). Accordingly, in some embodiments, the antibodies and antibody fragments that bind an IgE constant domain: (1) do not result in the activation of basophils (e.g., as measured in Example 3); (2) dissociate IgE from FcεRI on mast cells in 20 hours at an IC50 of IgE dissociation of less than 1,500 nM, less than 1,250, less than 1,000 less than nM, less than 900 nM, less than 800 nM or less than 700 nM (e.g., as measured in Example 2); (3) dissociate IgE from FcεRI on human basophils in 20 hours at an IC50 of IgE dissociation of less than 150 nM, less than 125 nM, less than 100 nM, less than 90 nM, less than 80 nM, less than 70 nM, less than 60 nM, less than 50 nM, or less than 40 nM (e.g., as measured in Example 4); (4) exhibit less than 10%, less than 9%, or less than 8% change in main capillary isoelectric focusing (cIEF) peak percentage after heat stress (e.g., as measured in Example 5); (5) do not have any DG motif(s) within the CDRH1, CDRH2, CDRH3, CDRL1, CDRL2, and CDRL3; and (6) do not have any methionine (M) residue(s) within the CDRH1, CDRH2, CDRH3, CDRL1, CDRL2, and CDRL3. Lack of any DG (Asp-Gly) motif(s) in the CDRs can decrease susceptibility to isomerization of aspartic acid (D) within the CDRs. Lack of any methionine (M) residue(s) in the CDRs can decrease susceptibility to oxidation of the antibodies and antibody fragments.

As further exemplified herein, the antibodies and antibody fragments that bind an IgE constant domain can include a modification at framework position 74 of SEQ ID NO: 95 (VH position 73 per Kabat numbering), wherein the modification is not an aspartic acid (D). The modification can be a glycine or any other residue that does not have a negatively charged amino acid side chain at a physiological pH (e.g., alanine (A) or serine(S)). In certain embodiments, the antibodies and antibody fragments that bind an IgE constant domain comprise a glycine (G) at position 74 of SEQ ID NO: 95 (VH position 73 per Kabat numbering). In certain embodiments, the antibodies and antibody fragments that bind an IgE constant domain comprises an amino acid other than aspartic acid (D) or glutamic acid (E) at position 74 of SEQ ID NO: 95 (VH position 73 per Kabat numbering). In some embodiments, the antibodies and antibody fragments that bind an IgE constant domain comprise an amino acid other than aspartic acid (D) at the framework position corresponding to amino acid position 74 of SEQ ID NO: 95 (Kabat VH framework position 73).

As also exemplified herein, the antibodies and antibody fragments that bind an IgE constant domain can include a modified Fc domain comprising an amino acid modification that increases binding to the neonatal Fc receptor (FcRn) relative to wild-type IgG1 or IgG4. For example, the Fc domain can comprise the amino acids Y252/T254/E256 (YTE) or L428/S434 (LS) per EU numbering. In certain embodiments. In certain embodiments, the antibodies and antibody fragments that bind an IgE comprise an Fc domain comprising modified Fc domain comprises the amino acids L428/S434 (LS) per EU numbering. In certain embodiments, the antibodies and antibody fragments that bind an IgE comprise an Fc domain comprising modified Fc domain comprises the amino acids Y252/T254/E256 (YTE) per EU numbering.

The antibodies and antibody fragments that bind an IgE constant domain are capable of binding the IgE constant domain at sub 10 nanomolar affinities. In certain instances, the antibody or antibody fragment binds IgE with an affinity ($K_D$) equal to or less than 5 nanomolar (nM), less than 1 nM, less than 0.5 nM, less than 0.4 nM, less than 0.3 nM, or less than 0.2 nM.

In certain embodiments, the antibodies and antibody fragments comprise: a heavy chain variable region comprising an amino sequence having at least 85%, 90%, 95%, 98%, 99%, or 100% sequence identity to SEQ ID NO: 91; and a light chain variable region comprising an amino sequence having at least 85%, 90%, 95%, 98%, 99%, or 100% sequence identity to SEQ ID NO: 92. In certain embodiments, the antibodies and antibody fragments comprise: a heavy chain variable region comprising an amino sequence having at least 85%, 90%, 95%, 98%, 99%, or 100% sequence identity to SEQ ID NO: 93; and a light chain variable region comprising an amino sequence having at least 85%, 90%, 95%, 98%, 99%, or 100% sequence identity to SEQ ID NO: 94. In certain embodiments, the antibodies and antibody fragments comprise: a heavy chain variable region comprising an amino sequence having at least 85%, 90%, 95%, 98%, 99%, or 100% sequence identity to SEQ ID NO: 95; and a light chain variable region comprising an amino sequence having at least 85%, 90%, 95%, 98%, 99%, or 100% sequence identity to SEQ ID NO: 96.

In certain embodiments, the antibodies and antibody fragments comprise: a heavy chain comprising an amino sequence having at least 85%, 90%, 95%, 98%, 99%, or 100% sequence identity to SEQ ID NO: 121; and a light chain comprising an amino sequence having at least 85%, 90%, 95%, 98%, 99%, or 100% sequence identity to SEQ ID NO: 122. In certain embodiments, the antibodies and antibody fragments comprise: a heavy chain comprising an amino sequence having at least 85%, 90%, 95%, 98%, 99%, or 100% sequence identity to SEQ ID NO: 123; and a light chain comprising an amino sequence having at least 85%, 90%, 95%, 98%, 99%, or 100% sequence identity to SEQ ID NO: 124. In certain embodiments, the antibodies and antibody fragments comprise: a heavy chain comprising an amino sequence having at least 85%, 90%, 95%, 98%, 99%, or 100% sequence identity to SEQ ID NO: 125; and a light chain comprising an amino sequence having at least 85%, 90%, 95%, 98%, 99%, or 100% sequence identity to SEQ ID NO: 126.

Provided and exemplified herein are antibodies and antibody fragments comprising: a heavy chain variable domain comprising: a heavy chain complementarity determining region 1 (CDRH1) comprising the amino acid sequence of SEQ ID NO: 43; a heavy chain complementarity determining region 2 (CDRH2) comprising the amino acid sequence of SEQ ID NO: 44; a heavy chain complementarity determining region 3 (CDRH3) comprising the amino acid sequence of SEQ ID NO: 45; and a light chain variable domain comprising: a light chain complementarity determining region 1 (CDRL1) comprising the amino acid sequence of SEQ ID NO: 46; a light chain complementarity determining region 2 (CDRL2) comprising the amino acid sequence of SEQ ID NO: 47; and a light chain complementarity determining region 3 (CDRL3) comprising the amino acid sequence of SEQ ID NO: 48.

As described and exemplified herein, antibodies and antibody fragments that bind an IgE constant domain can show advantageous properties that include: (1) potently dissociating IgE from FcεRI on mast cells and basophils, (2) not resulting in the activation of basophil and/or mast cell, (3) being thermally and chemical stable, (4) lacking any DG motif(s) within their CDRs, and/or (5) lacking any methionine (M) residue(s) within their CDRs. In certain instances, these advantageous properties make the antibodies describe here useful for treating IgE-mediated diseases, disorders, and conditions (e.g., diseases, disorders, and conditions characterized by IgE-mediated immune activation). Accordingly, in some embodiments, antibodies and antibody fragments that bind an IgE constant domain: (1) do not result in the activation of basophils (e.g., as measured in Example 3); (2) dissociate IgE from FcεRI on mast cells in 20 hours at an IC50 of IgE dissociation of less than 1,500 nM, less than 1,250, less than 1,000 less than nM, less than 900 nM, less than 800 nM or less than 700 nM (e.g., as measured in Example 2); (3) dissociate IgE from FcεRI on human basophils in 20 hours at an IC50 of IgE dissociation of less than 150 nM, less than 125 nM, less than 100 nM, less than 90 nM, less than 80 nM, less than 70 nM, less than 60 nM, less than 50 nM, or less than 40 nM (e.g., as measured in Example 4); (4) exhibit less than 10%, less than 9%, or less than 8% change in main capillary isoelectric focusing (cIEF) peak percentage after heat stress (e.g., as measured in Example 5); (5) do not have any DG motif(s) within the CDRH1, CDRH2, CDRH3, CDRL1, CDRL2, and CDRL3; and (6) do not have any methionine (M) residue(s) within the CDRH1, CDRH2, CDRH3, CDRL1, CDRL2, and CDRL3. Lack of any DG (Asp-Gly) motif(s) in the CDRs can decrease susceptibility to isomerization of aspartic acid (D) within the CDRs. Lack of any methionine (M) residue(s) in the CDRs can decrease susceptibility to oxidation of the antibodies and antibody fragments.

As further exemplified herein, the antibodies and antibody fragments that bind an IgE constant domain can include a modification at framework position 74 of SEQ ID NO: 95 (VH position 73 per Kabat numbering), wherein the modification is not an aspartic acid (D). The modification can be a glycine or any other residue that does not have a negatively charged amino acid side chain at a physiological pH (e.g., alanine (A) or serine(S)). In certain embodiments, the antibodies and antibody fragments that bind an IgE constant domain comprise a glycine (G) at position 74 of SEQ ID NO: 95 (VH position 73 per Kabat numbering). In certain embodiments, the antibodies and antibody fragments that bind an IgE constant domain comprises an amino acid other than aspartic acid (D) or glutamic acid (E) at position 74 of SEQ ID NO: 95 (VH position 73 per Kabat numbering). In some embodiments, the antibodies and antibody fragments that bind an IgE constant domain comprise an amino acid other than aspartic acid (D) at the framework position corresponding to amino acid position 74 of SEQ ID NO: 95 (Kabat VH framework position 73).

As also exemplified herein, the antibodies and antibody fragments that bind an IgE constant domain can include a modified Fc domain comprising an amino acid modification that increases binding to the neonatal Fc receptor (FcRn) relative to wild-type IgG1 or IgG4. For example, the Fc domain can comprise the amino acids Y252/T254/E256 (YTE) or L428/S434 (LS) per EU numbering. In certain embodiments. In certain embodiments, the antibodies and antibody fragments that bind an IgE comprise an Fc domain comprising modified Fc domain comprises the amino acids L428/S434 (LS) per EU numbering. In certain embodiments, the antibodies and antibody fragments that bind an IgE comprise an Fc domain comprising modified Fc domain comprises the amino acids Y252/T254/E256 (YTE) per EU numbering.

The antibodies and antibody fragments that bind an IgE constant domain are capable of binding the IgE constant domain at sub 10 nanomolar affinities. In certain instances, the antibody or antibody fragment binds IgE with an affinity ($K_D$) equal to or less than 5 nanomolar (nM), less than 1 nM, less than 0.5 nM, less than 0.4 nM, less than 0.3 nM, or less than 0.2 nM.

In certain embodiments, the antibodies and antibody fragments comprise: a heavy chain variable region comprising an amino sequence having at least 85%, 90%, 95%, 98%, 99%, or 100% sequence identity to SEQ ID NO: 97; and a light chain variable region comprising an amino sequence having at least 85%, 90%, 95%, 98%, 99%, or 100% sequence identity to SEQ ID NO: 98. In certain embodiments, the antibodies and antibody fragments comprise: a heavy chain variable region comprising an amino sequence having at least 85%, 90%, 95%, 98%, 99%, or 100% sequence identity to SEQ ID NO: 99; and a light chain variable region comprising an amino sequence having at least 85%, 90%, 95%, 98%, 99%, or 100% sequence identity to SEQ ID NO: 100. In certain embodiments, the antibodies and antibody fragments comprise: a heavy chain variable region comprising an amino sequence having at least 85%, 90%, 95%, 98%, 99%, or 100% sequence identity to SEQ ID NO: 101; and a light chain variable region comprising an amino sequence having at least 85%, 90%, 95%, 98%, 99%, or 100% sequence identity to SEQ ID NO: 102.

In certain embodiments, the antibodies and antibody fragments comprise: a heavy chain comprising an amino sequence having at least 85%, 90%, 95%, 98%, 99%, or 100% sequence identity to SEQ ID NO: 127; and a light chain comprising an amino sequence having at least 85%, 90%, 95%, 98%, 99%, or 100% sequence identity to SEQ ID NO: 128. In certain embodiments, the antibodies and antibody fragments comprise: a heavy chain comprising an amino sequence having at least 85%, 90%, 95%, 98%, 99%, or 100% sequence identity to SEQ ID NO: 129; and a light chain comprising an amino sequence having at least 85%, 90%, 95%, 98%, 99%, or 100% sequence identity to SEQ ID NO: 130. In certain embodiments, the antibodies and antibody fragments comprise: a heavy chain comprising an amino sequence having at least 85%, 90%, 95%, 98%, 99%, or 100% sequence identity to SEQ ID NO: 131; and a light chain comprising an amino sequence having at least 85%, 90%, 95%, 98%, 99%, or 100% sequence identity to SEQ ID NO: 132.

Provided and exemplified herein are antibodies and antibody fragments comprising: a heavy chain variable domain comprising: a heavy chain complementarity determining region 1 (CDRH1) comprising the amino acid sequence of SEQ ID NO: 49; a heavy chain complementarity determining region 2 (CDRH2) comprising the amino acid sequence of SEQ ID NO: 50; a heavy chain complementarity determining region 3 (CDRH3) comprising the amino acid sequence of SEQ ID NO: 51; and a light chain variable domain comprising: a light chain complementarity determining region 1 (CDRL1) comprising the amino acid sequence of SEQ ID NO: 52; a light chain complementarity determining region 2 (CDRL2) comprising the amino acid sequence of SEQ ID NO: 53; and a light chain complementarity determining region 3 (CDRL3) comprising the amino acid sequence of SEQ ID NO: 54.

As described and exemplified herein, the antibodies and antibody fragments that bind an IgE constant domain can show advantageous properties that include: (1) potently dissociating IgE from FcεRI on mast cells and basophils, (2) not resulting in the activation of basophil and/or mast cell, (3) being thermally and chemical stable, (4) lacking any DG motif(s) within their CDRs, and/or (5) lacking any methionine (M) residue(s) within their CDRs. In certain instances, these advantageous properties make the antibodies describe here useful for treating IgE-mediated diseases, disorders, and conditions (e.g., diseases, disorders, and conditions characterized by IgE-mediated immune activation). Accordingly, in some embodiments, the antibodies and antibody fragments that bind an IgE constant domain: (1) do not result in the activation of basophils (e.g., as measured in Example 3); (2) dissociate IgE from FcεRI on mast cells in 20 hours at an IC50 of IgE dissociation of less than 1,500 nM, less than 1,250, less than 1,000 less than nM, less than 900 nM, less than 800 nM or less than 700 nM (e.g., as measured in Example 2); (3) dissociate IgE from FcεRI on human basophils in 20 hours at an IC50 of IgE dissociation of less than 150 nM, less than 125 nM, less than 100 nM, less than 90 nM, less than 80 nM, less than 70 nM, less than 60 nM, less than 50 nM, or less than 40 nM (e.g., as measured in Example 4); (4) exhibit less than 10%, less than 9%, or less than 8% change in main capillary isoelectric focusing (cIEF) peak percentage after heat stress (e.g., as measured in Example 5); (5) do not have any DG motif(s) within the CDRH1, CDRH2, CDRH3, CDRL1, CDRL2, and CDRL3; and (6) do not have any methionine (M) residue(s) within the CDRH1, CDRH2, CDRH3, CDRL1, CDRL2, and CDRL3. Lack of any DG (Asp-Gly) motif(s) in the CDRs can decrease susceptibility to isomerization of aspartic acid (D) within the CDRs. Lack of any methionine (M) residue(s) in the CDRs can decrease susceptibility to oxidation of the antibodies and antibody fragments.

As further exemplified herein, the antibodies and antibody fragments that bind an IgE constant domain can include a modification at framework position 74 of SEQ ID NO: 95 (VH position 73 per Kabat numbering), wherein the modification is not an aspartic acid (D). The modification can be a glycine or any other residue that does not have a negatively charged amino acid side chain at a physiological pH (e.g., alanine (A) or serine(S)). In certain embodiments, the antibodies and antibody fragments that bind an IgE constant domain comprise a glycine (G) at position 74 of SEQ ID NO: 95 (VH position 73 per Kabat numbering). In certain embodiments, the antibodies and antibody fragments that bind an IgE constant domain comprises an amino acid other than aspartic acid (D) or glutamic acid (E) at position 74 of SEQ ID NO: 95 (VH position 73 per Kabat numbering). In some embodiments, the antibodies and antibody fragments that bind an IgE constant domain comprise an amino acid other than aspartic acid (D) at the framework position corresponding to amino acid position 74 of SEQ ID NO: 95 (Kabat VH framework position 73).

As also exemplified herein, the antibodies and antibody fragments that bind an IgE constant domain can include a modified Fc domain comprising an amino acid modification that increases binding to the neonatal Fc receptor (FcRn) relative to wild-type IgG1 or IgG4. For example, the Fc domain can comprise the amino acids Y252/T254/E256 (YTE) or L428/S434 (LS) per EU numbering. In certain embodiments. In certain embodiments, the antibodies and antibody fragments that bind an IgE comprise an Fc domain comprising modified Fc domain comprises the amino acids L428/S434 (LS) per EU numbering. In certain embodiments, the antibodies and antibody fragments that bind an IgE comprise an Fc domain comprising modified Fc domain comprises the amino acids Y252/T254/E256 (YTE) per EU numbering.

The antibodies and antibody fragments that bind an IgE constant domain are capable of binding the IgE constant domain at sub 10 nanomolar affinities. In certain instances, the antibody or antibody fragment binds IgE with an affinity ($K_D$) equal to or less than 5 nanomolar (nM), less than 1 nM, less than 0.5 nM, less than 0.4 nM, less than 0.3 nM, or less than 0.2 nM.

In certain embodiments, the antibodies and antibody fragments comprise: a heavy chain variable region comprising an amino sequence having at least 85%, 90%, 95%, 98%, 99%, or 100% sequence identity to SEQ ID NO: 103; and a light chain variable region comprising an amino sequence having at least 85%, 90%, 95%, 98%, 99%, or 100% sequence identity to SEQ ID NO: 104. In certain embodiments, the antibodies and antibody fragments comprise: a heavy chain variable region comprising an amino sequence having at least 85%, 90%, 95%, 98%, 99%, or 100% sequence identity to SEQ ID NO: 105; and a light chain variable region comprising an amino sequence having at least 85%, 90%, 95%, 98%, 99%, or 100% sequence identity to SEQ ID NO: 106. In certain embodiments, the antibodies and antibody fragments comprise: a heavy chain variable region comprising an amino sequence having at least 85%, 90%, 95%, 98%, 99%, or 100% sequence identity to SEQ ID NO: 107; and a light chain variable region comprising an amino sequence having at least 85%, 90%, 95%, 98%, 99%, or 100% sequence identity to SEQ ID NO: 108.

In certain embodiments, the antibodies and antibody fragments comprise: a heavy chain comprising an amino sequence having at least 85%, 90%, 95%, 98%, 99%, or 100% sequence identity to SEQ ID NO: 133; and a light chain comprising an amino sequence having at least 85%, 90%, 95%, 98%, 99%, or 100% sequence identity to SEQ ID NO: 134. In certain embodiments, the antibodies and antibody fragments comprise: a heavy chain comprising an amino sequence having at least 85%, 90%, 95%, 98%, 99%, or 100% sequence identity to SEQ ID NO: 135; and a light chain comprising an amino sequence having at least 85%, 90%, 95%, 98%, 99%, or 100% sequence identity to SEQ ID NO: 136. In certain embodiments, the antibodies and antibody fragments comprise: a heavy chain comprising an amino sequence having at least 85%, 90%, 95%, 98%, 99%, or 100% sequence identity to SEQ ID NO: 137; and a light chain comprising an amino sequence having at least 85%, 90%, 95%, 98%, 99%, or 100% sequence identity to SEQ ID NO: 138.

Provided and exemplified herein are antibodies and antibody fragments comprising: a heavy chain variable domain comprising: a heavy chain complementarity determining region 1 (CDRH1) comprising the amino acid sequence of SEQ ID NO: 67 or 79 or 85; a heavy chain complementarity determining region 2 (CDRH2) comprising the amino acid sequence of SEQ ID NO: 68 or 80 or 86; a heavy chain complementarity determining region 3 (CDRH3) comprising the amino acid sequence of SEQ ID NO: 69 or 81 or 87; and a light chain variable domain comprising: a light chain complementarity determining region 1 (CDRL1) comprising the amino acid sequence of SEQ ID NO: 70 or 82 or 88; a light chain complementarity determining region 2 (CDRL2) comprising the amino acid sequence of SEQ ID NO: 71 or 83 or 89; and a light chain complementarity determining region 3 (CDRL3) comprising the amino acid sequence of SEQ ID NO: 72 or 84 or 90.

As described and exemplified herein, the antibodies and antibody fragments that bind an IgE constant domain can show advantageous properties that include: (1) potently dissociating IgE from FcεRI on mast cells and basophils, (2) not resulting in the activation of basophil and/or mast cell, (3) being thermally and chemical stable, (4) lacking any DG motif(s) within their CDRs, and/or (5) lacking any methionine (M) residue(s) within their CDRs. In certain instances, these advantageous properties make the antibodies describe here useful for treating IgE-mediated diseases, disorders, and conditions (e.g., diseases, disorders, and conditions characterized by IgE-mediated immune activation). Accordingly, in some embodiments, the antibodies and antibody fragments that bind an IgE constant domain: (1) do not result in the activation of basophils (e.g., as measured in Example 3); (2) dissociate IgE from FcεRI on mast cells in 20 hours at an IC50 of IgE dissociation of less than 1,500 nM, less than 1,250, less than 1,000 less than nM, less than 900 nM, less than 800 nM or less than 700 nM (e.g., as measured in Example 2); (3) dissociate IgE from FcεRI on human basophils in 20 hours at an IC50 of IgE dissociation of less than 150 nM, less than 125 nM, less than 100 nM, less than 90 nM, less than 80 nM, less than 70 nM, less than 60 nM, less than 50 nM, or less than 40 nM (e.g., as measured in Example 4); (4) exhibit less than 10%, less than 9%, or less than 8% change in main capillary isoelectric focusing (cIEF) peak percentage after heat stress (e.g., as measured in Example 5); (5) do not have any DG motif(s) within the CDRH1, CDRH2, CDRH3, CDRL1, CDRL2, and CDRL3; and (6) do not have any methionine (M) residue(s) within the CDRH1, CDRH2, CDRH3, CDRL1, CDRL2, and CDRL3. Lack of any DG (Asp-Gly) motif(s) in the CDRs can decrease susceptibility to isomerization of aspartic acid (D) within the CDRs. Lack of any methionine (M) residue(s) in the CDRs can decrease susceptibility to oxidation of the antibodies and antibody fragments.

As further exemplified herein, the antibodies and antibody fragments that bind an IgE constant domain can include a modification at framework position 74 of SEQ ID NO: 95 (VH position 73 per Kabat numbering), wherein the modification is not an aspartic acid (D). The modification can be a glycine or any other residue that does not have a negatively chargeds amino acid side chain at a physiological pH (e.g., alanine (A) or serine(S)). In certain embodiments, the antibodies and antibody fragments that bind an IgE constant domain comprise a glycine (G) at position 74 of SEQ ID NO: 95 (VH position 73 per Kabat numbering). In certain embodiments, the antibodies and antibody fragments that bind an IgE constant domain comprises an amino acid other than aspartic acid (D) or glutamic acid (E) at position 74 of SEQ ID NO: 95 (VH position 73 per Kabat numbering). In some embodiments, the antibodies and antibody fragments that bind an IgE constant domain comprise an amino acid other than aspartic acid (D) at the framework position corresponding to amino acid position 74 of SEQ ID NO: 95 (Kabat VH framework position 73).

As also exemplified herein, the antibodies and antibody fragments that bind an IgE constant domain can include a modified Fc domain comprising an amino acid modification that increases binding to the neonatal Fc receptor (FcRn) relative to wild-type IgG1 or IgG4. For example, the Fc domain can comprise the amino acids Y252/T254/E256 (YTE) or L428/S434 (LS) per EU numbering. In certain embodiments. In certain embodiments, the antibodies and antibody fragments that bind an IgE comprise an Fc domain comprising modified Fc domain comprises the amino acids L428/S434 (LS) per EU numbering. In certain embodiments, the antibodies and antibody fragments that bind an IgE comprise an Fc domain comprising modified Fc domain comprises the amino acids Y252/T254/E256 (YTE) per EU numbering.

The antibodies and antibody fragments that bind an IgE constant domain are capable of binding the IgE constant domain at sub 10 nanomolar affinities. In certain instances, the antibody or antibody fragment binds IgE with an affinity ($K_D$) equal to or less than 5 nanomolar (nM), less than 1 nM, less than 0.5 nM, less than 0.4 nM, less than 0.3 nM, or less than 0.2 nM.

In certain embodiments, the antibodies and antibody fragments comprise: a heavy chain variable region comprising an amino sequence having at least 85%, 90%, 95%, 98%, 99%, or 100% sequence identity to SEQ ID NO: 113; and a light chain variable region comprising an amino sequence having at least 85%, 90%, 95%, 98%, 99%, or 100% sequence identity to SEQ ID NO: 114. In certain embodiments, the antibodies and antibody fragments comprise: a heavy chain variable region comprising an amino sequence having at least 85%, 90%, 95%, 98%, 99%, or 100% sequence identity to SEQ ID NO: 117; and a light chain variable region comprising an amino sequence having at least 85%, 90%, 95%, 98%, 99%, or 100% sequence identity to SEQ ID NO: 118. In certain embodiments, the antibodies and antibody fragments comprise: a heavy chain variable region comprising an amino sequence having at least 85%, 90%, 95%, 98%, 99%, or 100% sequence identity to SEQ ID NO: 119; and a light chain variable region comprising an amino sequence having at least 85%, 90%, 95%, 98%, 99%, or 100% sequence identity to SEQ ID NO: 120.

In certain embodiments, the antibodies and antibody fragments comprise: a heavy chain comprising an amino sequence having at least 85%, 90%, 95%, 98%, 99%, or 100% sequence identity to SEQ ID NO: 143; and a light chain comprising an amino sequence having at least 85%, 90%, 95%, 98%, 99%, or 100% sequence identity to SEQ ID NO: 144. In certain embodiments, the antibodies and antibody fragments comprise: a heavy chain comprising an amino sequence having at least 85%, 90%, 95%, 98%, 99%, or 100% sequence identity to SEQ ID NO: 147; and a light chain comprising an amino sequence having at least 85%, 90%, 95%, 98%, 99%, or 100% sequence identity to SEQ ID NO: 148. In certain embodiments, the antibodies and antibody fragments comprise: a heavy chain comprising an amino sequence having at least 85%, 90%, 95%, 98%, 99%, or 100% sequence identity to SEQ ID NO: 149; and a light chain comprising an amino sequence having at least 85%, 90%, 95%, 98%, 99%, or 100% sequence identity to SEQ ID NO: 150.

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 201; a heavy chain complementarity determining region 2 (CDRH2) comprising the amino acid sequence of SEQ ID NO: 202; and a heavy chain complementarity determining region 3 (CDRH3) comprising the amino acid sequence of SEQ ID NO: 203; and a light chain variable domain comprising: a light chain complementarity determining region 1 (CDRL1) comprising the amino acid sequence of SEQ ID NO: 204; a light chain complementarity determining region 2 (CDRL2) comprising the amino acid sequence of SEQ ID NO: 205; and a light chain complementarity determining region 3 (CDRL3) comprising the amino acid sequence of SEQ ID NO: 206.

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 207; a heavy chain complementarity determining region 2 (CDRH2) comprising the amino acid sequence of SEQ ID NO: 208; a heavy chain complementarity determining region 3 (CDRH3) comprising the amino acid sequence of SEQ ID NO: 209; and a light chain variable domain comprising: a light chain complementarity determining region 1 (CDRL1) comprising the amino acid sequence of SEQ ID NO: 210; a light chain complementarity determining region 2 (CDRL2) comprising the amino acid sequence of SEQ ID NO: 211; and a light chain complementarity determining region 3 (CDRL3) comprising the amino acid sequence of SEQ ID NO: 212;

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 213; a heavy chain complementarity determining region 2 (CDRH2) comprising the amino acid sequence of SEQ ID NO: 214; a heavy chain complementarity determining region 3 (CDRH3) comprising the amino acid sequence of SEQ ID NO: 215; and a light chain variable domain comprising: a light chain complementarity determining region 1 (CDRL1) comprising the amino acid sequence of SEQ ID NO: 216; a light chain complementarity determining region 2 (CDRL2) comprising the amino acid sequence of SEQ ID NO: 217; and a light chain complementarity determining region 3 (CDRL3) comprising the amino acid sequence of SEQ ID NO: 218;

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 219; a heavy chain complementarity determining region 2 (CDRH2) comprising the amino acid sequence of SEQ ID NO: 220; a heavy chain complementarity determining region 3 (CDRH3) comprising the amino acid sequence of SEQ ID NO: 221; and a light chain variable domain comprising: a light chain complementarity determining region 1 (CDRL1) comprising the amino acid sequence of SEQ ID NO: 222; a light chain complementarity determining region 2 (CDRL2) comprising the amino acid sequence of SEQ ID NO: 223; and a light chain complementarity determining region 3 (CDRL3) comprising the amino acid sequence of SEQ ID NO: 224;

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 225; a heavy chain complementarity determining region 2 (CDRH2) comprising the amino acid sequence of SEQ ID NO: 226; a heavy chain complementarity determining region 3 (CDRH3) comprising the amino acid sequence of SEQ ID NO: 227; and a light chain variable domain comprising: a light chain complementarity determining region 1 (CDRL1) comprising the amino acid sequence of SEQ ID NO: 228; a light chain complementarity determining region 2 (CDRL2) comprising the amino acid sequence of SEQ ID NO: 229; and a light chain complementarity determining region 3 (CDRL3) comprising the amino acid sequence of SEQ ID NO: 230;

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 231; a heavy chain complementarity determining region 2 (CDRH2) comprising the amino acid sequence of SEQ ID NO: 232; a heavy chain complementarity determining region 3 (CDRH3) comprising the amino acid sequence of SEQ ID NO: 233; and a light chain variable domain comprising: a light chain complementarity determining region 1 (CDRL1) comprising the amino acid sequence of SEQ ID NO: 234; a light chain complementarity determining region 2 (CDRL2) comprising the amino acid sequence of SEQ ID NO: 235; and a light chain complementarity determining region 3 (CDRL3) comprising the amino acid sequence of SEQ ID NO: 236;

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 237; a heavy chain complementarity determining region 2 (CDRH2) comprising the amino acid sequence of SEQ ID NO: 238; a heavy chain complementarity determining region 3 (CDRH3) comprising the amino acid sequence of SEQ ID NO: 239; and a light chain variable domain comprising: a light chain complementarity determining region 1 (CDRL1) comprising the amino acid sequence of SEQ ID NO: 240; a light chain complementarity determining region 2 (CDRL2) comprising the amino acid sequence of SEQ ID NO: 241; and a light chain complementarity determining region 3 (CDRL3) comprising the amino acid sequence of SEQ ID NO: 242;

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 243; a heavy chain complementarity determining region 2 (CDRH2) comprising the amino acid sequence of SEQ ID NO: 244; a heavy chain complementarity determining region 3 (CDRH3) comprising the amino acid sequence of SEQ ID NO: 245; and a light chain variable domain comprising: a light chain complementarity determining region 1 (CDRL1) comprising the amino acid sequence of SEQ ID NO: 246; a light chain complementarity determining region 2 (CDRL2) comprising the amino acid sequence of SEQ ID NO: 247; and a light chain complementarity determining region 3 (CDRL3) comprising the amino acid sequence of SEQ ID NO: 248;

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 371; a heavy chain complementarity determining region 2 (CDRH2) comprising the amino acid sequence of SEQ ID NO: 372; a heavy chain complementarity determining region 3 (CDRH3) comprising the amino acid sequence of SEQ ID NO: 373; and a light chain variable domain comprising: a light chain complementarity determining region 1 (CDRL1) comprising the amino acid sequence of SEQ ID NO: 374; a light chain complementarity determining region 2 (CDRL2) comprising the amino acid sequence of SEQ ID NO: 375; and a light chain complementarity determining region 3 (CDRL3) comprising the amino acid sequence of SEQ ID NO: 376; or In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 377; a heavy chain complementarity determining region 2 (CDRH2) comprising the amino acid sequence of SEQ ID NO: 378; a heavy chain complementarity determining region 3 (CDRH3) comprising the amino acid sequence of SEQ ID NO: 379; and a light chain variable domain comprising: a light chain complementarity determining region 1 (CDRL1) comprising the amino acid sequence of SEQ ID NO: 380; a light chain complementarity determining region 2 (CDRL2) comprising the amino acid sequence of SEQ ID NO: 381; and a light chain complementarity determining region 3 (CDRL3) comprising the amino acid sequence of SEQ ID NO: 382.

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 249; a heavy chain complementarity determining region 2 (CDRH2) comprising the amino acid sequence of SEQ ID NO: 250; and a heavy chain complementarity determining region 3 (CDRH3) comprising the amino acid sequence of SEQ ID NO: 251; and a light chain variable domain comprising: a light chain complementarity determining region 1 (CDRL1) comprising the amino acid sequence of SEQ ID NO: 252; a light chain complementarity determining region 2 (CDRL2) comprising the amino acid sequence of SEQ ID NO: 253; and a light chain complementarity determining region 3 (CDRL3) comprising the amino acid sequence of SEQ ID NO: 254; or In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 255; a heavy chain complementarity determining region 2 (CDRH2) comprising the amino acid sequence of SEQ ID NO: 256; and a heavy chain complementarity determining region 3 (CDRH3) comprising the amino acid sequence of SEQ ID NO: 257; and a light chain variable domain comprising: a of SEQ ID NO: 258; a light chain complementarity determining region 2 (CDRL2) comprising the amino acid sequence of SEQ ID NO: 259; and a light chain complementarity determining region 3 (CDRL3) comprising the amino acid sequence of SEQ ID NO: 260.

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 261; a heavy chain complementarity determining region 2 (CDRH2) comprising the amino acid sequence of SEQ ID NO: 262; and a heavy chain complementarity determining region 3 (CDRH3) comprising the amino acid sequence of SEQ ID NO: 263; and a light chain variable domain comprising: a light chain complementarity determining region 1 (CDRL1) comprising the amino acid sequence of SEQ ID NO: 264; a light chain complementarity determining region 2 (CDRL2) comprising the amino acid sequence of SEQ ID NO: 265; and a light chain complementarity determining region 3 (CDRL3) comprising the amino acid sequence of SEQ ID NO: 266;

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 365; a heavy chain complementarity determining region 2 (CDRH2) comprising the amino acid sequence of SEQ ID NO: 366; and a heavy chain complementarity determining region 3 (CDRH3) comprising the amino acid sequence of SEQ ID NO: 367; and a light chain variable domain comprising: a light chain complementarity determining region 1 (CDRL1) comprising the amino acid sequence of SEQ ID NO: 368; a light chain complementarity determining region 2 (CDRL2) comprising the amino acid sequence of SEQ ID NO: 369; and a light chain complementarity determining region 3 (CDRL3) comprising the amino acid sequence of SEQ ID NO: 370; or In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 267; a heavy chain complementarity determining region 2 (CDRH2) comprising the amino acid sequence of SEQ ID NO: 268; and a heavy chain complementarity determining region 3 (CDRH3) comprising the amino acid sequence of SEQ ID NO: 269; and a light chain variable domain comprising: a light chain complementarity determining region 1 (CDRL1) comprising the amino acid sequence of SEQ ID NO: 270; a light chain complementarity determining region 2 (CDRL2) comprising the amino acid sequence of SEQ ID NO: 271; and a light chain complementarity determining region 3 (CDRL3) comprising the amino acid sequence of SEQ ID NO: 272.

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 273; a heavy chain complementarity determining region 2 (CDRH2) comprising the amino acid sequence of SEQ ID NO: 274; and a heavy chain complementarity determining region 3 (CDRH3) comprising the amino acid sequence of SEQ ID NO: 275; and a light chain variable domain comprising: a light chain complementarity determining region 1 (CDRL1) comprising the amino acid sequence of SEQ ID NO: 276; a light chain complementarity determining region 2 (CDRL2) comprising the amino acid sequence of SEQ ID NO: 277; and a light chain complementarity determining region 3 (CDRL3) comprising the amino acid sequence of SEQ ID NO: 278;

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 279; a heavy chain complementarity determining region 2 (CDRH2) comprising the amino acid sequence of SEQ ID NO: 280; and a heavy chain complementarity determining region 3 (CDRH3) comprising the amino acid sequence of SEQ ID NO: 281; and a light chain variable domain comprising: a light chain complementarity determining region 1 (CDRL1) comprising the amino acid sequence of SEQ ID NO: 282; a light chain complementarity determining region 2 (CDRL2) comprising the amino acid sequence of SEQ ID NO: 284; and a light chain complementarity determining region 3 (CDRL3) comprising the amino acid sequence of SEQ ID NO: 284; or In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 285; a heavy chain complementarity determining region 2 (CDRH2) comprising the amino acid sequence of SEQ ID NO: 286; and a heavy chain complementarity determining region 3 (CDRH3) comprising the amino acid sequence of SEQ ID NO: 287; and a light chain variable domain comprising: a light chain complementarity determining region 1 (CDRL1) comprising the amino acid sequence of SEQ ID NO: 288; a light chain complementarity determining region 2 (CDRL2) comprising the amino acid sequence of SEQ ID NO: 289; and a light chain complementarity determining region 3 (CDRL3) comprising the amino acid sequence of SEQ ID NO: 290.

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 291; a heavy chain complementarity determining region 2 (CDRH2) comprising the amino acid sequence of SEQ ID NO: 292; and a heavy chain complementarity determining region 3 (CDRH3) comprising the amino acid sequence of SEQ ID NO: 293; and a light chain variable domain comprising: a of SEQ ID NO: 294; a light chain complementarity determining region 2 (CDRL2) comprising the amino acid sequence of SEQ ID NO: 295; and a light chain complementarity determining region 3 (CDRL3) comprising the amino acid sequence of SEQ ID NO: 296;

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 297; a heavy chain complementarity determining region 2 (CDRH2) comprising the amino acid sequence of SEQ ID NO: 298; and a heavy chain complementarity determining region 3 (CDRH3) comprising the amino acid sequence of SEQ ID NO: 299; and a light chain variable domain comprising: a light chain complementarity determining region 1 (CDRL1) comprising the amino acid sequence of SEQ ID NO: 300; a light chain complementarity determining region 2 (CDRL2) comprising the amino acid sequence of SEQ ID NO: 301; and a light chain complementarity determining region 3 (CDRL3) comprising the amino acid sequence of SEQ ID NO: 302;

In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 303; a heavy chain complementarity determining region 2 (CDRH2) comprising the amino acid sequence of SEQ ID NO: 304; and a heavy chain complementarity determining region 3 (CDRH3) comprising the amino acid sequence of SEQ ID NO: 305; and a light chain variable domain comprising: a light chain complementarity determining region 1 (CDRL1) comprising the amino acid sequence of SEQ ID NO: 306; a light chain complementarity determining region 2 (CDRL2) comprising the amino acid sequence of SEQ ID NO: 307; and a light chain complementarity determining region 3 (CDRL3) comprising the amino acid sequence of SEQ ID NO: 308; or In certain embodiments, the antibody or antibody fragment that bind an IgE constant domain comprises: a heavy chain variable domain comprising: a heavy chain complementarity determining region 1 (CDRH1) comprising the amino acid sequence of SEQ ID NO: 309; a heavy chain complementarity determining region 2 (CDRH2) comprising the amino acid sequence of SEQ ID NO: 310; and a heavy chain complementarity determining region 3 (CDRH3) comprising the amino acid sequence of SEQ ID NO: 311; and a light chain variable domain comprising: a light chain complementarity determining region 1 (CDRL1) comprising the amino acid sequence of SEQ ID NO: 312; a light chain complementarity determining region 2 (CDRL2) comprising the amino acid sequence of SEQ ID NO: 313; and a light chain complementarity determining region 3 (CDRL3) comprising the amino acid sequence of SEQ ID NO: 314.

As described and exemplified herein, antibodies and antibody fragments that bind an IgE constant domain can show advantageous properties that include: (1) potently dissociating IgE from FcεRI on mast cells and basophils, (2) not resulting in the activation of basophil and/or mast cell, (3) being thermally and chemical stable, (4) lacking any DG motif(s) within their CDRs, and/or (5) lacking any methionine (M) residue(s) within their CDRs. In certain instances, these advantageous properties make the antibodies describe here useful for treating IgE-mediated diseases, disorders, and conditions (e.g., diseases, disorders, and conditions characterized by IgE-mediated immune activation). Accordingly, in some embodiments, the antibodies and antibody fragments that bind an IgE constant domain: (1) do not result in the activation of basophils (e.g., as measured in Example 3); (2) dissociate IgE from FcεRI on mast cells in 20 hours at an IC50 of IgE dissociation of less than 1,500 nM, less than 1,250, less than 1,000 less than nM, less than 900 nM, less than 800 nM or less than 700 nM (e.g., as measured in Example 2); (3) dissociate IgE from FcεRI on human basophils in 20 hours at an IC50 of IgE dissociation of less than 150 nM, less than 125 nM, less than 100 nM, less than 90 nM, less than 80 nM, less than 70 nM, less than 60 nM, less than 50 nM, or less than 40 nM (e.g., as measured in Example 4); (4) exhibit less than 10%, less than 9%, or less than 8% change in main capillary isoelectric focusing (cIEF) peak percentage after heat stress (e.g., as measured in Example 5); (5) do not have any DG motif(s) within the CDRH1, CDRH2, CDRH3, CDRL1, CDRL2, and CDRL3; and (6) do not have any methionine (M) residue(s) within the CDRH1, CDRH2, CDRH3, CDRL1, CDRL2, and CDRL3. Lack of any DG (Asp-Gly) motif(s) in the CDRs can decrease susceptibility to isomerization of aspartic acid (D) within the CDRs. Lack of any methionine (M) residue(s) in the CDRs can decrease susceptibility to oxidation of the antibodies and antibody fragments.

As further exemplified herein, antibodies and antibody fragments that bind an IgE constant domain can include a modification at framework position 74 of SEQ ID NO: 95 (VH position 73 per Kabat numbering), wherein the modification is not an aspartic acid (D). The modification can be a glycine or any other residue that does not have a negatively charged amino acid side chain at a physiological pH (e.g., alanine (A) or serine(S)). In certain embodiments, the antibodies and antibody fragments that bind an IgE constant domain comprise a glycine (G) at position 74 of SEQ ID NO: 95 (VH position 73 per Kabat numbering). In certain embodiments, the antibodies and antibody fragments that bind an IgE constant domain comprises an amino acid other than aspartic acid (D) or glutamic acid (E) at position 74 of SEQ ID NO: 95 (VH position 73 per Kabat numbering). In some embodiments, the antibodies and antibody fragments that bind an IgE constant domain comprise an amino acid other than aspartic acid (D) at the framework position corresponding to amino acid position 74 of SEQ ID NO: 95 (Kabat VH framework position 73).

As also exemplified herein, antibodies and antibody fragments that bind an IgE constant domain can include a modified Fc domain comprising an amino acid modification that increases binding to the neonatal Fc receptor (FcRn) relative to wild-type IgG1 or IgG4. For example, the Fc domain can comprise the amino acids Y252/T254/E256 (YTE) or L428/S434 (LS) per EU numbering. In certain embodiments. In certain embodiments, antibodies and antibody fragments that bind an IgE comprise an Fc domain comprising modified Fc domain comprises the amino acids L428/S434 (LS) per EU numbering. In certain embodiments, antibodies and antibody fragments that bind an IgE comprise an Fc domain comprising modified Fc domain comprises the amino acids Y252/T254/E256 (YTE) per EU numbering.

Antibodies and antibody fragments that bind an IgE constant domain can be capable of binding the IgE constant domain at sub 10 nanomolar affinities. In certain instances, the antibody or antibody fragment binds IgE with an affinity ($K_D$) equal to or less than 5 nanomolar (nM), less than 1 nM, less than 0.5 nM, less than 0.4 nM, less than 0.3 nM, or less than 0.2 nM.

In certain embodiments, the antibodies and antibody fragments comprise: a heavy chain comprising an amino sequence having at least 85%, 90%, 95%, 98%, 99%, or 100% sequence identity to SEQ ID NO: 315; and a light chain comprising an amino sequence having at least 85%, 90%, 95%, 98%, 99%, or 100% sequence identity to SEQ ID NO: 316. In certain embodiments, the antibodies and antibody fragments comprise: a heavy chain comprising an amino sequence having at least 85%, 90%, 95%, 98%, 99%, or 100% sequence identity to SEQ ID NO: 317; and a light chain comprising an amino sequence having at least 85%, 90%, 95%, 98%, 99%, or 100% sequence identity to SEQ ID NO: 318. In certain embodiments, the antibodies and antibody fragments comprise: a heavy chain comprising an amino sequence having at least 85%, 90%, 95%, 98%, 99%, or 100% sequence identity to SEQ ID NO: 319; and a light chain comprising an amino sequence having at least 85%, 90%, 95%, 98%, 99%, or 100% sequence identity to SEQ ID NO: 320. In certain embodiments, the antibodies and antibody fragments comprise: a heavy chain comprising an amino sequence having at least 85%, 90%, 95%, 98%, 99%, or 100% sequence identity to SEQ ID NO: 321; and a light chain comprising an amino sequence having at least 85%, 90%, 95%, 98%, 99%, or 100% sequence identity to SEQ ID NO: 322. In certain embodiments, the antibodies and antibody fragments comprise: a heavy chain comprising an amino sequence having at least 85%, 90%, 95%, 98%, 99%, or 100% sequence identity to SEQ ID NO: 323; and a light chain comprising an amino sequence having at least 85%, 90%, 95%, 98%, 99%, or 100% sequence identity to SEQ ID NO: 324. In certain embodiments, the antibodies and antibody fragments comprise: a heavy chain comprising an amino sequence having at least 85%, 90%, 95%, 98%, 99%, or 100% sequence identity to SEQ ID NO: 327; and a light chain comprising an amino sequence having at least 85%, 90%, 95%, 98%, 99%, or 100% sequence identity to SEQ ID NO: 328. In certain embodiments, the antibodies and antibody fragments comprise: a heavy chain comprising an amino sequence having at least 85%, 90%, 95%, 98%, 99%, or 100% sequence identity to SEQ ID NO: 329; and a light chain comprising an amino sequence having at least 85%, 90%, 95%, 98%, 99%, or 100% sequence identity to SEQ ID NO: 330. In certain embodiments, the antibodies and antibody fragments comprise: a heavy chain comprising an amino sequence having at least 85%, 90%, 95%, 98%, 99%, or 100% sequence identity to SEQ ID NO: 331; and a light chain comprising an amino sequence having at least 85%, 90%, 95%, 98%, 99%, or 100% sequence identity to SEQ ID NO: 332. In certain embodiments, the antibodies and antibody fragments comprise: a heavy chain comprising an amino sequence having at least 85%, 90%, 95%, 98%, 99%, or 100% sequence identity to SEQ ID NO: 333; and a light chain comprising an amino sequence having at least 85%, 90%, 95%, 98%, 99%, or 100% sequence identity to SEQ ID NO: 334. In certain embodiments, the antibodies and antibody fragments comprise: a heavy chain comprising an amino sequence having at least 85%, 90%, 95%, 98%, 99%, or 100% sequence identity to SEQ ID NO: 335; and a light chain comprising an amino sequence having at least 85%, 90%, 95%, 98%, 99%, or 100% sequence identity to SEQ ID NO: 336. In certain embodiments, the antibodies and antibody fragments comprise: a heavy chain comprising an amino sequence having at least 85%, 90%, 95%, 98%, 99%, or 100% sequence identity to SEQ ID NO: 337; and a light chain comprising an amino sequence having at least 85%, 90%, 95%, 98%, 99%, or 100% sequence identity to SEQ ID NO: 338. In certain embodiments, the antibodies and antibody fragments comprise: a heavy chain comprising an amino sequence having at least 85%, 90%, 95%, 98%, 99%, or 100% sequence identity to SEQ ID NO: 339; and a light chain comprising an amino sequence having at least 85%, 90%, 95%, 98%, 99%, or 100% sequence identity to SEQ ID NO: 340. In certain embodiments, the antibodies and antibody fragments comprise: a heavy chain comprising an amino sequence having at least 85%, 90%, 95%, 98%, 99%, or 100% sequence identity to SEQ ID NO: 345; and a light chain comprising an amino sequence having at least 85%, 90%, 95%, 98%, 99%, or 100% sequence identity to SEQ ID NO: 346. In certain embodiments, the antibodies and antibody fragments comprise: a heavy chain comprising an amino sequence having at least 85%, 90%, 95%, 98%, 99%, or 100% sequence identity to SEQ ID NO: 347; and a light chain comprising an amino sequence having at least 85%, 90%, 95%, 98%, 99%, or 100% sequence identity to SEQ ID NO: 348. In certain embodiments, the antibodies and antibody fragments comprise: a heavy chain comprising an amino sequence having at least 85%, 90%, 95%, 98%, 99%, or 100% sequence identity to SEQ ID NO: 349; and a light chain comprising an amino sequence having at least 85%, 90%, 95%, 98%, 99%, or 100% sequence identity to SEQ ID NO: 350. In certain embodiments, the antibodies and antibody fragments comprise: a heavy chain comprising an amino sequence having at least 85%, 90%, 95%, 98%, 99%, or 100% sequence identity to SEQ ID NO: 351; and a light chain comprising an amino sequence having at least 85%, 90%, 95%, 98%, 99%, or 100% sequence identity to SEQ ID NO: 352. In certain embodiments, the antibodies and antibody fragments comprise: a heavy chain comprising an amino sequence having at least 85%, 90%, 95%, 98%, 99%, or 100% sequence identity to SEQ ID NO: 357; and a light chain comprising an amino sequence having at least 85%, 90%, 95%, 98%, 99%, or 100% sequence identity to SEQ ID NO: 358. In certain embodiments, the antibodies and antibody fragments comprise: a heavy chain comprising an amino sequence having at least 85%, 90%, 95%, 98%, 99%, or 100% sequence identity to SEQ ID NO: 359; and a light chain comprising an amino sequence having at least 85%, 90%, 95%, 98%, 99%, or 100% sequence identity to SEQ ID NO: 360. In certain embodiments, the antibodies and antibody fragments comprise: a heavy chain comprising an amino sequence having at least 85%, 90%, 95%, 98%, 99%, or 100% sequence identity to SEQ ID NO: 361; and a light chain comprising an amino sequence having at least 85%, 90%, 95%, 98%, 99%, or 100% sequence identity to SEQ ID NO: 362. In certain embodiments, the antibodies and antibody fragments comprise: a heavy chain comprising an amino sequence having at least 85%, 90%, 95%, 98%, 99%, or 100% sequence identity to SEQ ID NO: 363; and a light chain comprising an amino sequence having at least 85%, 90%, 95%, 98%, 99%, or 100% sequence identity to SEQ ID NO: 364. In certain embodiments, the antibodies and antibody fragments comprise: a heavy chain comprising an amino sequence having at least 85%, 90%, 95%, 98%, 99%, or 100% sequence identity to SEQ ID NO: 383; and a light chain comprising an amino sequence having at least 85%, 90%, 95%, 98%, 99%, or 100% sequence identity to SEQ ID NO: 384.

In some embodiments, a variable domain of the antibody or antibody fragment and a constant domain of the antibody or antibody fragment are directly conjugated to one another without an intervening flexible elbow. In some embodiments, a variable domain of the antibody or antibody fragment and a constant domain of the antibody or antibody fragment are directly conjugated to one another without a Gly-Gly (GG) linker. In some embodiments, a variable domain of the antibody or antibody fragment and a constant domain of the antibody or antibody fragment are directly conjugated to one another without a Gly (G) linker. In some embodiments, a variable domain of the heavy chain of the antibody or antibody fragment and a constant domain of the heavy chain of the antibody or antibody fragment are directly conjugated to one another without an intervening flexible elbow. In some embodiments, a variable domain of the light chain of the antibody or antibody fragment and a constant domain of the light chain of the antibody or antibody fragment are directly conjugated to one another without an intervening flexible elbow. In some embodiments, the variable domain of the heavy chain of the antibody or antibody fragment and the constant domain of the heavy chain of the antibody or antibody fragment are directly conjugated to one another without an intervening flexible elbow and the variable domain of the light chain of the antibody or antibody fragment and the constant domain of the light chain of the antibody or antibody fragment are directly conjugated to one another without an intervening flexible elbow. In some embodiments, variable domains of the two heavy chains of the antibody or antibody fragment and constant domains of the two heavy chains of the antibody or antibody fragment are directly conjugated to one another without an intervening flexible elbow. In some embodiments, variable domains of the two light chains of the antibody or antibody fragment and constant domains of the two light chains of the antibody or antibody fragment are directly conjugated to one another without an intervening flexible elbow. In some embodiments, the variable domains of the two heavy chains of the antibody or antibody fragment and the constant domains of the two heavy chains of the antibody or antibody fragment are directly conjugated to one another without an intervening flexible elbow and the variable domains of the two light chains of the antibody or antibody fragment and the constant domains of the two light chains of the antibody or antibody fragment are directly conjugated to one another without an intervening flexible elbow. In some embodiments, the intervening flexible elbow is a Gly-Gly (GG) linker. In some embodiments, the intervening flexible elbow is a Gly (G) linker.

In some embodiments, there is no intervening linker between a variable domain of the antibody or antibody fragment and a constant domain of the antibody or antibody fragment. In some embodiments, there is no Gly-Gly (GG) linker between a variable domain of the antibody or antibody fragment and a constant domain of the antibody or antibody fragment. In some embodiments, there is no Gly (G) linker between a variable domain of the antibody or antibody fragment and a constant domain of the antibody or antibody fragment. In some embodiments, there is no intervening linker between a variable domain of the heavy chain of the antibody or antibody fragment and a constant domain of the heavy chain of the antibody or antibody fragment. In some embodiments, there is no intervening linker between a variable domain of the light chain of the antibody or antibody fragment and a constant domain of the light chain of the antibody or antibody fragment. In some embodiments, there is no intervening linker between a variable domain of the heavy chain of the antibody or antibody fragment and a constant domain of the heavy chain of the antibody or antibody fragment and there is no intervening linker between a variable domain of the light chain of the antibody or antibody fragment and a constant domain of the light chain of the antibody or antibody fragment. In some embodiments, there is no intervening linker between variable domains of the two heavy chains of the antibody or antibody fragment and constant domains of the two heavy chains of the antibody or antibody fragment. In some embodiments, there is no intervening linker between variable domains of the two light chains of the antibody or antibody fragment and constant domains of the two light chains of the antibody or antibody fragment. In some embodiments, there is no intervening linker between variable domains of the two heavy chains of the antibody or antibody fragment and constant domains of the two heavy chains of the antibody or antibody fragment and there is no intervening linker between variable domains of the two light chains of the antibody or antibody fragment and constant domains of the light chains of the antibody or antibody fragment. In some embodiments, the intervening linker is a Gly-Gly (GG) linker. In some embodiments, the intervening linker is a Gly (G) linker.

In some embodiments, a heavy chain of the antibody or antibody fragment can be 451 amino acids in length. In some embodiments, a light chain of the antibody or antibody fragment can be 218 amino acids in length.

Provided and exemplified throughout this disclosure are means for binding IgE. Accordingly, in some embodiments, provided herein are compositions comprising: a liquid medium and means for binding FcεRI-bound IgE on the surface of a cell and dissociating the IgE from FcεRI. In certain embodiments, the composition is a pharmaceutical composition comprising: an antibody and antibody fragment comprising means for binding an IgE constant domain; and a pharmaceutically acceptable carrier. In additional embodiments, provided herein are compositions comprising: a liquid medium and means for binding FcεRI-bound IgE on the surface of a cell and dissociating the IgE from FcεRI without activating basophils and/or mast cells. In certain embodiments, the composition is a pharmaceutical composition comprising: an antibody and antibody fragment comprising means for binding an IgE constant domain without activating basophils and/or mast cells; and a pharmaceutically acceptable carrier. Also provided are compositions comprising: a liquid medium; and means for, upon administration to a subject, concomitantly dissociating IgE from FcεRI on mast cells in 20 hours at an IC50 of IgE dissociation of less than 1,500 nM, less than 1,250 nM, less than 1,000 less than nM, less than 900 nM, less than 800 nM, or less than 700 nM while not activating basophils and/or mast cells, wherein the means has a thermal stability of greater than 65° C.

For example, as described throughout, exemplary means for binding FcεRI-bound IgE on the surface of a cell and dissociating the IgE from FcεRI include antibodies and antibody fragments having the CDRs of Table 1.

TABLE 1

CDRs of IgE antibodies

| CDRH1-3 (SEQ ID NOs) | CDRL1-3 (SEQ ID NOs) |
| --- | --- |
| 1-3 | 4-6 |
| 7-9 | 10-12 |
| 13-15 | 16-18 |
| 19-21 | 22-24 |
| 25-27 | 28-30 |
| 31-33 | 34-36 |
| 37-39 | 40-42 |
| 43-45 | 46-48 |
| 49-51 | 52-54 |
| 67-69 | 70-72 |
| 79-81 | 82-84 |
| 85-87 | 88-90 |

Provided herein are humanized monospecific anti-IgE IgG antibodies having the CDR combinations of any row in Table 1. For instance, in some embodiments, the humanized monospecific anti-IgE IgG antibody comprises CDRs corresponding to SEQ ID NOS: 1-6. In some embodiments, the humanized monospecific anti-IgE IgG antibody comprises CDRs corresponding to SEQ ID NOs: 7-12. In some embodiments, the humanized monospecific anti-IgE IgG antibody comprises CDRs corresponding to SEQ ID NOs: 13-18. In some embodiments, the humanized monospecific anti-IgE IgG antibody comprises CDRs corresponding to SEQ ID NOs: 19-24. In some embodiments, the humanized monospecific anti-IgE IgG antibody comprises CDRs corresponding to SEQ ID NOs: 25-30. In some embodiments, the humanized monospecific anti-IgE IgG antibody comprises CDRs corresponding to SEQ ID NOs: 31-36. In some embodiments, the humanized monospecific anti-IgE IgG antibody comprises CDRs corresponding to SEQ ID NOs: 37-42. In some embodiments, the humanized monospecific anti-IgE IgG antibody comprises CDRs corresponding to SEQ ID NOs: 43-48. In some embodiments, the humanized monospecific anti-IgE IgG antibody comprises CDRs corresponding to SEQ ID NOs: 49-54. In some embodiments, the humanized monospecific anti-IgE IgG antibody comprises CDRs corresponding to SEQ ID NOs: 67-72. In some embodiments, the humanized monospecific anti-IgE IgG antibody comprises CDRs corresponding to SEQ ID NOs: 79-84. In some embodiments, the humanized monospecific anti-IgE IgG antibody comprises CDRs corresponding to SEQ ID NOs: 85-90.

Provided herein are humanized monospecific anti-IgE IgG antibodies having CDRs corresponding to SEQ ID NOs: 201-206. Provided herein are humanized monospecific anti-IgE IgG antibodies having CDRs corresponding to SEQ ID NOs: 207-212. Provided herein are humanized monospecific anti-IgE IgG antibodies having CDRs corresponding to SEQ ID NOs: 213-218. Provided herein are humanized monospecific anti-IgE IgG antibodies having CDRs corresponding to SEQ ID NOs: 219-224. Provided herein are humanized monospecific anti-IgE IgG antibodies having CDRs corresponding to SEQ ID NOs: 225-230. Provided herein are humanized monospecific anti-IgE IgG antibodies having CDRs corresponding to SEQ ID NOs: 231-236. Provided herein are humanized monospecific anti-IgE IgG antibodies having CDRs corresponding to SEQ ID NOs: 371-376. Provided herein are humanized monospecific anti-IgE IgG antibodies having CDRs corresponding to SEQ ID NOs: 237-242. Provided herein are humanized monospecific anti-IgE IgG antibodies having CDRs corresponding to SEQ ID NOs: 377-382. Provided herein are humanized monospecific anti-IgE IgG antibodies having CDRs corresponding to SEQ ID NOs: 243-248. Provided herein are humanized monospecific anti-IgE IgG antibodies having CDRs corresponding to SEQ ID NOs: 249-254. Provided herein are humanized monospecific anti-IgE IgG antibodies having CDRs corresponding to SEQ ID NOs: 255-260. Provided herein are humanized monospecific anti-IgE IgG antibodies having CDRs corresponding to SEQ ID NOs: 261-266. Provided herein are humanized monospecific anti-IgE IgG antibodies having CDRs corresponding to SEQ ID NOs: 267-272. Provided herein are humanized monospecific anti-IgE IgG antibodies having CDRs corresponding to SEQ ID NOs: 365-370. Provided herein are humanized monospecific anti-IgE IgG antibodies having CDRs corresponding to SEQ ID NOs: 273-278. Provided herein are humanized monospecific anti-IgE IgG antibodies having CDRs corresponding to SEQ ID NOs: 279-284. Provided herein are humanized monospecific anti-IgE IgG antibodies having CDRs corresponding to SEQ ID NOs: 285-290. Provided herein are humanized monospecific anti-IgE IgG antibodies having CDRs corresponding to SEQ ID NOs: 291-296. Provided herein are humanized monospecific anti-IgE IgG antibodies having CDRs corresponding to SEQ ID NOs: 297-302. Provided herein are humanized monospecific anti-IgE IgG antibodies having CDRs corresponding to SEQ ID NOs: 303-308. Provided herein are humanized monospecific anti-IgE IgG antibodies having CDRs corresponding to SEQ ID NOs: 309-314.

Provided herein are humanized monospecific anti-IgE IgG antibodies having a heavy chain variable region and a light chain variable region corresponding to SEQ ID NOs: 91-92. Provided herein are humanized monospecific anti-IgE IgG antibodies having a heavy chain variable region and a light chain variable region corresponding to SEQ ID NOs: 93-94. Provided herein are humanized monospecific anti-IgE IgG antibodies having a heavy chain variable region and a light chain variable region corresponding to SEQ ID NOs: 95-96. Provided herein are humanized monospecific anti-IgE IgG antibodies having a heavy chain variable region and a light chain variable region corresponding to SEQ ID NOs: 97-98. Provided herein are humanized monospecific anti-IgE IgG antibodies having a heavy chain variable region and a light chain variable region corresponding to SEQ ID NOs: 99-100. Provided herein are humanized monospecific anti-IgE IgG antibodies having a heavy chain variable region and a light chain variable region corresponding to SEQ ID NOs: 101-102. Provided herein are humanized monospecific anti-IgE IgG antibodies having a heavy chain variable region and a light chain variable region corresponding to SEQ ID NOs: 103-104. Provided herein are humanized monospecific anti-IgE IgG antibodies having a heavy chain variable region and a light chain variable region corresponding to SEQ ID NOs: 105-106. Provided herein are humanized monospecific anti-IgE IgG antibodies having a heavy chain variable region and a light chain variable region corresponding to SEQ ID NOs: 107-108. Provided herein are humanized monospecific anti-IgE IgG antibodies having a heavy chain variable region and a light chain variable region corresponding to SEQ ID NOs: 109-110. Provided herein are humanized monospecific anti-IgE IgG antibodies having a heavy chain variable region and a light chain variable region corresponding to SEQ ID NOs: 111-112. Provided herein are humanized monospecific anti-IgE IgG antibodies having a heavy chain variable region and a light chain variable region corresponding to SEQ ID NOs: 113-114. Provided herein are humanized monospecific anti-IgE IgG antibodies having a heavy chain variable region and a light chain variable region corresponding to SEQ ID NOs: 115-116. Provided herein are humanized monospecific anti-IgE IgG antibodies having a heavy chain variable region and a light chain variable region corresponding to SEQ ID NOs: 117-118. Provided herein are humanized monospecific anti-IgE IgG antibodies having a heavy chain variable region and a light chain variable region corresponding to SEQ ID NOs: 119-120.

Provided herein are humanized monospecific anti-IgE IgG antibodies having a heavy chain and a light chain corresponding to SEQ ID NOs: 121-122. Provided herein are humanized monospecific anti-IgE IgG antibodies having a heavy chain and a light chain corresponding to SEQ ID NOs: 123-124. Provided herein are humanized monospecific anti-IgE IgG antibodies having a heavy chain and a light chain corresponding to SEQ ID NOs: 125-126. Provided herein are humanized monospecific anti-IgE IgG antibodies having a heavy chain and a light chain corresponding to SEQ ID NOs: 127-128. Provided herein are humanized monospecific anti-IgE IgG antibodies having a heavy chain and a light chain corresponding to SEQ ID NOs: 129-130. Provided herein are humanized monospecific anti-IgE IgG antibodies having a heavy chain and a light chain corresponding to SEQ ID NOs: 131-132. Provided herein are humanized monospecific anti-IgE IgG antibodies having a heavy chain and a light chain corresponding to SEQ ID NOs: 133-134. Provided herein are humanized monospecific anti-IgE IgG antibodies having a heavy chain and a light chain corresponding to SEQ ID NOs: 135-136. Provided herein are humanized monospecific anti-IgE IgG antibodies having a heavy chain and a light chain corresponding to SEQ ID NOs: 137-138. Provided herein are humanized monospecific anti-IgE IgG antibodies having a heavy chain and a light chain corresponding to SEQ ID NOs: 139-140. Provided herein are humanized monospecific anti-IgE IgG antibodies having a heavy chain and a light chain corresponding to SEQ ID NOs: 141-142. Provided herein are humanized monospecific anti-IgE IgG antibodies having a heavy chain and a light chain corresponding to SEQ ID NOs: 143-144. Provided herein are humanized monospecific anti-IgE IgG antibodies having a heavy chain and a light chain corresponding to SEQ ID NOs: 145-146. Provided herein are humanized monospecific anti-IgE IgG antibodies having a heavy chain and a light chain corresponding to SEQ ID NOs: 147-148. Provided herein are humanized monospecific anti-IgE IgG antibodies having a heavy chain and a light chain corresponding to SEQ ID NOs: 149-150. Provided herein are humanized monospecific anti-IgE IgG antibodies having a heavy chain and a light chain corresponding to SEQ ID NOs: 315-316. Provided herein are humanized monospecific anti-IgE IgG antibodies having a heavy chain and a light chain corresponding to SEQ ID NOs: 317-318. Provided herein are humanized monospecific anti-IgE IgG antibodies having a heavy chain and a light chain corresponding to SEQ ID NOs: 319-320. Provided herein are humanized monospecific anti-IgE IgG antibodies having a heavy chain and a light chain corresponding to SEQ ID NOs: 321-322. Provided herein are humanized monospecific anti-IgE IgG antibodies having a heavy chain and a light chain corresponding to SEQ ID NOs: 323-324. Provided herein are humanized monospecific anti-IgE IgG antibodies having a heavy chain and a light chain corresponding to SEQ ID NOs: 327-328. Provided herein are humanized monospecific anti-IgE IgG antibodies having a heavy chain and a light chain corresponding to SEQ ID NOs: 329-330. Provided herein are humanized monospecific anti-IgE IgG antibodies having a heavy chain and a light chain corresponding to SEQ ID NOs: 331-332. Provided herein are humanized monospecific anti-IgE IgG antibodies having a heavy chain and a light chain corresponding to SEQ ID NOs: 333-334. Provided herein are humanized monospecific anti-IgE IgG antibodies having a heavy chain and a light chain corresponding to SEQ ID NOs: 335-336. Provided herein are humanized monospecific anti-IgE IgG antibodies having a heavy chain and a light chain corresponding to SEQ ID NOs: 337-338. Provided herein are humanized monospecific anti-IgE IgG antibodies having a heavy chain and a light chain corresponding to SEQ ID NOs: 339-340. Provided herein are humanized monospecific anti-IgE IgG antibodies having a heavy chain and a light chain corresponding to SEQ ID NOs: 345-346. Provided herein are humanized monospecific anti-IgE IgG antibodies having a heavy chain and a light chain corresponding to SEQ ID NOs: 347-348. Provided herein are humanized monospecific anti-IgE IgG antibodies having a heavy chain and a light chain corresponding to SEQ ID NOs: 349-350. Provided herein are humanized monospecific anti-IgE IgG antibodies having a heavy chain and a light chain corresponding to SEQ ID NOs: 351-352. Provided herein are humanized monospecific anti-IgE IgG antibodies having a heavy chain and a light chain corresponding to SEQ ID NOs: 357-358. Provided herein are humanized monospecific anti-IgE IgG antibodies having a heavy chain and a light chain corresponding to SEQ ID NOs: 359-360. Provided herein are humanized monospecific anti-IgE IgG antibodies having a heavy chain and a light chain corresponding to SEQ ID NOs: 361-362. Provided herein are humanized monospecific anti-IgE IgG antibodies having a heavy chain and a light chain corresponding to SEQ ID NOs: 363-364. Provided herein are humanized monospecific anti-IgE IgG antibodies having a heavy chain and a light chain corresponding to SEQ ID NOs: 383-384.

These monospecific anti-IgE IgG antibodies can be useful for therapeutic purposes such as but not limited to treating allergic asthma, chronic spontaneous urticaria, chronic rhinosinusitis with nasal polyps, or allergies (e.g., food allergies).

Further exemplifying such means are the antibodies and antibody fragments that bind an IgE constant domain that (1) do not result in the activation of basophil and/or mast cell (e.g., as measured in Example 3); (2) dissociate IgE from FcεRI on mast cells in 20 hours at an IC50 of IgE dissociation of less than 1,500 nM, less than 1,250, less than 1,000 less than nM, less than 900 nM, less than 800 nM or less than 700 nM (e.g., as measured in Example 2); (3) dissociates IgE from FcεRI on human basophils in 20 hours at an IC50 of IgE dissociation of less than 150 nM, less than 125 nM, less than 100 nM, less than 90 nM, less than 80 nM, less than 70 nM, less than 60 nM, less than 50 nM, or less than 40 nM (e.g., as measured in Example 4); and (4) exhibits less than 10%, less than 9%, or less than 8% change in main capillary isoelectric focusing (cIEF) peak percentage after heat stress (e.g., as measured in Example 5). Examples of such antibodies are described in Table 2.

TABLE 2

Disclosed antibodies that dissociate IgE from FcεRI on mast cells and basophils with a IC50 of dissociation of less than 700 nM, do not result in the activation of basophils, and have chemical stability (exhibiting less than 9% change in main capillary isoelectric focusing (cIEF) peak percentage after heat loss). These antibodies also bind IgE with an affinity ($K_D$) equal to or less than 5 nM.

| Antibody | Heavy Chain SEQ ID NO | Light Chain SEQ ID NO |
|---|---|---|
| 32 | 121 | 122 |
| 33 | 123 | 124 |
| 34 | 125 | 126 |
| 35 | 127 | 128 |
| 36 | 129 | 130 |
| 37 | 131 | 132 |
| 38 | 133 | 134 |
| 39 | 135 | 136 |
| 40 | 137 | 138 |
| 43 | 143 | 144 |
| 45 | 147 | 148 |
| 46 | 149 | 150 |

In certain embodiments, the means for binding FcεRI-bound IgE on the surface of a cell and dissociating the IgE from FcεRI does not include antibodies having the CDRs (CDRH1-3 and CDRL1-3) of SEQ ID NOs: 151-162 (e.g., comparator antibodies in Examples).

Pharmaceutical Compositions

In some embodiments, provided herein are pharmaceutical compositions and/or formulations comprising the antibody or antibody fragment that binds IgE constant domain. Pharmaceutical compositions include and/or refers a preparation that is in such form as to permit biological activity of the antibody or antibody fragment (e.g., binding to IgE constant domain), and that contains no additional components which are unacceptably toxic to a subject to which the formulation would be administered. In certain embodiments, the pharmaceutical composition comprises a pharmaceutically acceptable carrier (e.g., an ingredient in a pharmaceutical formulation, other than an active ingredient, which is nontoxic to an individual). A pharmaceutically acceptable carrier includes, but is not limited to, a buffer, excipient, stabilizer, or preservative. The formulation of pharmaceutically active ingredients (e.g., an antibody or antibody fragment) with pharmaceutically acceptable carriers is known in the art, e.g.: Remington: The Science and Practice of Pharmacy (e.g. 21st edition (2005), and any later editions); Wang S S, Yan Y S, Ho K. US FDA-approved therapeutic antibodies with high-concentration formulation: summaries and perspectives. Antib Ther. 2021 Nov. 18; 4 (4): 262-272. doi: 10.1093/abt/tbab027. PMID: 34909579; and/or A A Elkordy. *Formulation of Monoclonal Antibody Therapies.* 2023. (978-0-12-823365-8). Non-limiting examples of additional ingredients include buffers, diluents, solvents, tonicity regulating agents, preservatives, stabilizers, and chelating agents. One or more pharmaceutically acceptable carrier may be used in formulating the pharmaceutical compositions of the invention.

In certain embodiments, the pharmaceutical composition is a liquid formulation such as a liquid formulation. In certain embodiments, the liquid formulation is an aqueous formulation, i.e., a formulation comprising water. An aqueous formulation typically comprises at least 50% w/w water, or at least 60%, 70%, 75%, 80%, 85%, 90%, or at least 95% w/w of water.

Methods

The antibodies and antibody fragments that bind (e.g., specifically) an IgE constant domain or can be useful in methods that include and/or require specific recognition of an IgE constant domain.

Accordingly, in some embodiments, provided herein are methods treating an inflammatory disease or disorder in an individual, the method comprising: administering the antibody or antibody fragment that binds IgE described herein to the individual in need thereof. In certain embodiments, the inflammatory disease or disorder is and IgE-mediated inflammatory disease or disorder. In certain embodiments, the inflammatory disease or disease is chronic spontaneous urticaria, asthma (e.g., allergic asthma), chronic rhinosinusitis with nasal polyps, or a food allergy. In certain embodiments, the antibody or antibody fragment that binds IgE is administered via subcutaneous injection.

Also provided herein are methods of dissociating an IgE constant domain from FcεRI, the method comprising: contacting the antibody or antibody fragment that binds IgE described herein. In certain embodiments, the FcεRI is expressed on the surface of a cell. In certain embodiments, the cell is a mast cell. In certain embodiments, the cell is a basophil. In certain embodiments, the cell is in an individual.

Definitions

As described herein, the term "percent (%) sequence identity," and terms related thereto, in the context of amino acid sequences or nucleic acid sequences, is the percentage of amino acid residues or nucleic acid residues in a candidate sequence that are identical with the amino acid residues or nucleic acid residues, respectively, in a selected sequence, after aligning the sequences and introducing gaps, if necessary, to achieve the maximum percent sequence identity, and not considering any conservative substitutions as part of the sequence identity. Alignment for purposes of determining percent amino acid sequence identity or percent nucleic acid identity can be achieved in various ways that are within the skill in the art, for instance, using publicly available computer software such as Clustal Omega, BLAST, BLAST-2, ALIGN, ALIGN-2 or Megalign (DNASTAR) software, with BLAST being the alignment algorithm of preference. Those skilled in the art can determine appropriate parameters for measuring alignment, including any algorithms needed to achieve maximal alignment over the full-length of the sequences being compared, although for simplicity it maybe preferred to use default parameters.

As used herein, the term "individual" is synonymous with patient and/or subject and includes and/or refers to a human and may be a human that has been diagnosed as needing to treat a disease or condition as disclosed herein. However, examples are not limited to humans and include, chimpanzees, marmosets, cows, horses, sheep, goats, pigs, rabbits, dogs, cats, rats, mice, guinea pigs, and the like. The term "individual" includes vertebrates. The individual is typically a human and may be a human that has been diagnosed as needing to treat a disease or condition as disclosed herein.

As used herein, treating or treatment of includes and/or refers to ameliorating the disease or disorder or symptoms thereof (e.g., slowing or arresting or reducing the development of the disease or at least one of the clinical symptoms thereof). In certain embodiments, treating or treatment also includes and/or refers to alleviating or ameliorating at least one physical and/or biological parameters including those which may not be discernible by the patient. In certain embodiments, treating or treatment includes and/or refers to modulating a disease, disorder, or biological process either physically, (e.g., stabilization of a discernible symptom), physiologically, (e.g., stabilization of a physical and/or biological parameter), or both. In certain embodiments, treating or treatment includes and/or refers to preventing or delaying the onset or development or progression of the disease or disorder. In certain embodiments, treating or treatment includes and/or refers to preventing or delaying or inhibiting the deterioration of (i) a healthy physiological state or (ii) a baseline physiological state (e.g., the progression of a disease or disorder).

As used herein, in any instance or embodiment described herein, "comprising" may be replaced with "consisting essentially of" and/or "consisting of," unless context clearly connotes otherwise. Similarly, as used herein, in any instance or embodiment described herein, "comprises" may be replaced with "consists essentially of" and/or "consists of," unless context clearly connotes otherwise.

As used herein, the term "about," in the context of a given value or range, includes and/or refers to a value or range that is within 10% of the given value or range.

As used herein, the term "and/or" is to be taken as specific disclosure of each of the specified features or components alone or with any combination of other features or components. For example, "A and/or B" is to be taken as specific disclosure of each of (i) A, (ii) B and (iii) A and B, just as if each were set out individually herein.

EXAMPLES

Example 1: Antibody Generation

Expression and Purification of Antibodies

Antibody sequences were cloned into separate heavy and light chain expression plasmids and were expressed transiently in the WuXian™ Transient CHO-K1 system for 7 days at 37° C. for 20 hours, before a 33° C. temperature drop through the remainder of the expression. All antibodies were purified by protein A chromatography (MabSelect SuRe, Cytiva), eluted at pH 3.0 in an acetate buffer, and neutralized with arginine buffer to achieve a pH of 5-6 prior to polishing with a sizing column. Fully purified antibodies were then dialyzed into 10 mM Sodium Acetate, pH 5.2, with 8% sucrose. All antibodies achieved greater than 95% purity as assessed by SEC-UPLC.

Production of Fab Fragments

Fab preparations of antibodies were produced by immobilized papain digestion for 20 hours at 33° C. Residual intact IgG and Fc-fragments were removed by affinity chromatography, and Fab samples were dialyzed into PBS, pH 7.4.

SPR Binding Affinity Studies:

SPR binding assays were conducted on a Biacore 8K (Cytiva) using Biacore 8K Insight Control Software (Cytiva). The anti-IgE capture antibody (clone Le27) was first diluted to 10 µg/mL in sodium acetate buffer pH 4.0 and immobilized onto Fc2 of CM5 chip for 120 s with the amine coupling kit (Cytiva: BR100050) with EDC/NHS activation, immobilization, and 1M ethanolamine quenching. Then, HBS-EP+ buffer was injected for 30 s at a flow rate of 50 µl/min, followed by a 30 s dissociation phase. To establish a stable baseline for the assay, 7 cycles of ligand capture and regeneration were performed without analyte injection as follows: 100 nM human IgE (SUS-11) in HBS-EP+ buffer was captured on Fc2 via anti-IgE Le27 at a flow rate of 10 µl/min for 60 s, followed by an injection of HBS-EP+ buffer for 60 s at a flow rate of 50 µl/min and a 60 s dissociation phase. Between injection cycles, the chip surface was regenerated with 3×20 s injections of 30 mM NaOH and reloaded with 100 nM human IgE (SUS-11). After the first 7 cycles, 100 nM human IgE (SUS-11) in HBS-EP+ buffer was captured on Fc2 via anti-IgE Le27 at a flow rate of 10 µl/min for 60 s. Test article Fab fragments in HBS-EP+ buffer were injected for 120 s at a flow rate of 50 µl/min, with a 50 nM starting concentration and six two-fold dilutions (50, 25, 12.5, 6.25, 3.125, 1.563, and 0.781 nM) followed by a 600 s dissociation phase. Between injection cycles, the chip surface was regenerated with 3×20 s injections of 30 mM NaOH and reloaded with 100 nM human IgE (SUS-11). Binding sensorgrams were double referenced with Fc1 and buffer injection at Fc2, and binding kinetics were determined using 1:1 langmuir curve fitting model through Biacore 8K Insight Evaluation Software 5.0 (Cytiva).

SPR Results

Test article antibodies (Fabs comprising CDRs encompassed by SEQ ID NOs: 1-6, CDRH1-3 and CDRL1-3 respectively) showed sub-nanomolar affinity to IgE. Heavy chain (HC), light chain (LC), and CDR sequences are provided. Table 3 shows binding data.

TABLE 3

| Affinity of antibody to human IgE | | | | | |
|---|---|---|---|---|---|
| Antibody | | | Kinetics | | |
| ID | HC SEQ (CDR SEQs) | LC SEQ (CDR SEQs) | Chi$^2$ (RU$^2$) | $K_D$ (M) | Rmax (RU) |
| Omalizumab | 151 Comparator_1 | 152 Comparator_1 | 1.90E−01 | 5.01E−09 | 31.6 |
| C3 | 155 Comparator_3 | 156 Comparator_3 | 6.47E+00 | 1.20E−10 | 82.0 |
| 32 | 121 (37-39) | 122 (40-42) | 1.23E+00 | 1.62E−10 | 112.4 |
| 35 | 127 (43-45) | 128 (46-48) | 7.10E−01 | 1.89E−10 | 95.8 |
| 38 | 133 (49-51) | 134 (52-54) | 2.22E+00 | 2.47E−10 | 104.4 |
| 43 | 143 (67-69) | 144 (70-72) | 2.72E+00 | 3.03E−10 | 105.1 |

Test article antibodies showed sub-nanomolar affinity to IgE. Heavy chain (HC), light chain (LC), and CDR sequences are provided. Table 9 shows binding data.

TABLE 9

Affinity of antibody to human IgE

| Antibody ID | HC_SEQ | LC_SEQ | Kinetics Chi$^2$ (RU$^2$) | KD (M) | Rmax (RU) | RELATIVE TO ANTIBODY 32 (HC = SEQ ID NO: 121; LC = SEQ ID NO: 122) |
|---|---|---|---|---|---|---|
| 47 | hc_47 (SEQ ID NO: 315) | lc_47 (SEQ ID NO: 316) | 1.01E+00 | 1.97E−10 | 34.6 | HC, D28S |
| 48 | hc_48 (SEQ ID NO: 317) | lc_48 (SEQ ID NO: 318) | 1.03E+00 | 2.83E−10 | 32.9 | HC, D28N |
| 49 | hc_49 (SEQ ID NO: 319) | lc_49 (SEQ ID NO: 320) | 1.14E+00 | 2.50E−10 | 30.4 | HC, Q31S |
| 50 | hc_50 (SEQ ID NO: 321) | lc_50 (SEQ ID NO: 322) | 7.68E−01 | 3.57E−10 | 31.2 | HC, Q31D |
| 51 | hc_51 (SEQ ID NO: 323) | lc_51 (SEQ ID NO: 324) | 1.02E+00 | 2.65E−10 | 30.6 | HC, Q31E |
| 53 | hc_53 (SEQ ID NO: 327) | lc_53 (SEQ ID NO: 328) | 9.21E−01 | 4.15E−10 | 32.2 | HC, G74E |
| 54 | hc_54 (SEQ ID NO: 329) | lc_54 (SEQ ID NO: 330) | 1.06E+00 | 3.33E−10 | 31.1 | HC, G74Q |
| 55 | hc_55 (SEQ ID NO: 331) | lc_55 (SEQ ID NO: 332) | 1.79E+00 | 3.17E−10 | 34.6 | HC, G74S |
| 56 | hc_56 (SEQ ID NO: 333) | lc_56 (SEQ ID NO: 334) | 7.26E−01 | 1.86E−10 | 32.4 | HC, G74K |
| 57 | hc_57 (SEQ ID NO: 335) | lc_57 (SEQ ID NO: 336) | 7.88E−01 | 4.08E−10 | 28.6 | HC, G74A |
| 58 | hc_58 (SEQ ID NO: 337) | lc_58 (SEQ ID NO: 338) | 3.09E−01 | 9.14E−10 | 29.3 | HC, G74Y |
| 59 | hc_58 (SEQ ID NO: 339) | lc_58 (SEQ ID NO: 340) | 1.09E+00 | 2.15E−10 | 28.7 | HC, K98R |
| 62 | hc_62 (SEQ ID NO: 345) | lc_62 (SEQ ID NO: 346) | 3.34E−01 | 1.93E−10 | 30.3 | HC, N100S |
| 63 | hc_63 (SEQ ID NO: 347) | lc_63 (SEQ ID NO: 348) | 6.02E−01 | 3.29E−10 | 35.8 | HC, N100D |
| 64 | hc_64 (SEQ ID NO: 349) | lc_64 (SEQ ID NO: 350) | 1.53E+00 | 5.47E−10 | 31.4 | HC, N100K |
| 65 | hc_65 (SEQ ID NO: 351) | lc_65 (SEQ ID NO: 352) | 5.97E−01 | 2.16E−10 | 29.8 | HC, N101H |
| 76 | hc_76 (SEQ ID NO: 357) | lc_76 (SEQ ID NO: 358) | 1.27E+00 | 2.47E−10 | 34.8 | LC, A31S |
| 77 | hc_77 (SEQ ID NO: 359) | lc_77 (SEQ ID NO: 360) | 1.52E+00 | 1.55E−10 | 39.7 | LC, A31G |
| 78 | hc_78 (SEQ ID NO: 361) | lc_78 (SEQ ID NO: 362) | 1.51E+00 | 2.43E−10 | 45 | LC, A31E |
| 79 | hc_79 (SEQ ID NO: 363) | lc_79 (SEQ ID NO: 364) | 1.63E+00 | 2.34E−10 | 48.6 | LC, A31D |
| 83 | hc_83 (SEQ ID NO: 383) | lc_83 (SEQ ID NO: 384) | 1.05E+00 | 6.29E−10 | 28.4 | LC, E32Q |

Example 2: Mast Cell Dissociation Studies

Overview

Mast cell dissociation studies: The Hoxb8 progenitor cell line was generated by conditionally immortalizing progenitor cells of allergic effector cells isolated from the bone marrow of a mouse that was transgenic for the human high-affinity IgE receptor by introducing the homeobox B8 (Hoxb8) gene under control of an inducible promoter into the cells as detailed in the 2022 publication authored by N. Zbären and colleagues (Zbären et al., 2022).

Hoxb8 progenitor cells were cultured under sterile conditions in Hoxb8 progenitor culture medium composed of RPMI-1640 medium AQmedia (Sigma-Aldrich) complemented with 10% FCS Sera Pro (Pan Biotech), 10% WEHI-3b supernatant (self-made), 100 U/mL penicillin, 100 mg/mL streptomycin (100× penicillin/streptomycin, Gibco by Sigma-Aldrich), and 100 nM 4-OHT (Sigma).

Mature mast cells (allergic effector cells) were derived from Hoxb8 progenitor cells by withdrawal of 4-OHT from the Hoxb8 culture medium. At day 5 of the culture in differentiation medium, the cells were fully differentiated in mature mast cells and were ready to be use for the assays.

On day 5 of the differentiation, the cells were collected from the culture flask, and the culture density of the Hoxb8 MCs was assessed using Trypan Blue staining. The cells were counted in a Neubauer counting chamber (Improved). 25,000 cells per well were seeded in a 96-well round-bottom plate. Wells were filled up to 200 μL with PBS and were centrifuged at 600×g at 4° C. for 5 min and supernatant was discarded. Subsequently, cells were resuspended in 25 μL 10 nM polyclonal human IgE diluted in activation medium (RPMI-1640 w/stable glutamine, 2.0 g/L NaHCO (Seraglob, Bioswisstec AG) complemented with 10% Hyclone FCS (Fisher Scientific), 100 U/mL penicillin, 100 mg/mL streptomycin (penicillin/streptomycin, Gibco), 10 mM HEPES buffer solution (Gibco), 1 mM sodium pyruvate (Gibco), 4 mM L-glutamine (Gibco), 13 nonessential amino acids (Gibco), 30 ng/mL mouse recombinant IL-3 (Peprotech), and 50 mM 2-mercaptoethanol (Merck)). IgE(−) Control cells were resuspended in 25 μL activation medium without IgE. Cells were then incubated overnight at 37° C. in humidified 5% $CO_2$ atmosphere.

On day 6, 175 µL PBS was added to the cells. Cells were centrifuged for 5 min at 600×g, supernatant was discarded, and this step was repeated two more times with 200 µL PBS for a total of three washing steps. 25 µL of the diluted anti-IgE test articles or controls at the indicated concentrations were added to the cells. For untreated controls, 25 µL plain activation medium was added to the cells. Cells were resuspended and incubated for 20 h at 37° C. in humidified 5% $CO_2$ atmosphere.

After 19.5 h incubation, the anti-CD107a-APC staining antibody was added to the cells. For the activation control samples, 2 µL of an anti-CD107a-APC, Le27 mix were added to the appropriate wells. Cells were resuspended and incubated for 30 min at 37° C. in humidified 5% $CO_2$ atmosphere. Afterwards, 175 µL PBS was added to each well. Cells were centrifuged at 600×g for 5 min at 4° C., and the supernatant was removed. This washing step was repeated two more times with 200 µL PBS for a total of three washing steps. The Anti-IgE staining antibody (Ige21 clone) diluted in FACS staining buffer was added to each well and cells were stained for 15 minutes. Cells were then washed with 200 µL ice cold FACS staining buffer and centrifuged at 600×g for 5 min at 4° C. The supernatant was discarded by inverting the plate over the sink. Afterwards cells were resuspended in 200 µL cold FACS staining buffer and kept in the fridge on ice until cells were acquired at the flow cytometer to measure surface IgE and CD107a levels.

Results

Test article antibodies (comprising CDRs encompassed by SEQ ID NOs: 1-6 in Table 4 and SEQ ID NOs: 201-206 in Table 10, CDRH1-3 and CDRL1-3 respectively) exhibit a high potency of accelerated IgE dissociation. Table 4 and Table 10 shows IC50 of IgE dissociation from mast cells in 20 hours. Table 5 shows IC50 of IgE dissociation from mast cells in 20 hours for published antibody comparators. IC50 for indicated anti-IgE as calculated from data, with 95% confidence interval (CI). Comparator 1 (omalizumab) exhibits poor potency for IgE dissociation (tens of micromolar), whereas test articles 32-40 and 43 showed substantially better potency for IgE dissociation. As describe above, Hoxb8 humanized mast cells were sensitized with polyclonal human IgE overnight, washed, and then exposed to anti-IgEs at the indicated concentrations for 20 hours. Cells were then stained for surface IgE and acquired by flow cytometry. The geometric mean fluorescent intensity of surface IgE was plotted against the anti-IgE concentration and fit with 4 parameter logistic curve fit to calculate the IC50.

TABLE 4

IC50 of IgE dissociation from mast cells in 20 hours

| | Antibody | | | 95% CI | | |
|---|---|---|---|---|---|---|
| ID | HC SEQ ID (CDR SEQs) | LC SEQ ID (CDR SEQs) | IC50 (nM) | Lower Limit | Upper Limit | R squared |
| Omalizumab | 151 Comparator_1 | 152 Comparator_1 | 11279 | 8628 | 17782 | 0.8703 |
| C2 | 153 Comparator_2 | 154 Comparator_2 | minimal change in surface IgE, no fit | | | |
| C3 | 155 Comparator_3 | 156 Comparator_3 | 608.4 | 502 | 732.4 | 0.99 |
| 32 | 121 (37-39) | 122 (40-42) | 675.8 | 491.3 | 926.2 | 0.9721 |
| 33 | 123 (37-39) | 124 (40-42) | 992.4 | 779.9 | 1260 | 0.9828 |
| 34 | 125 (37-39) | 126 (40-42) | 645.8 | 468.3 | 886.5 | 0.971 |
| 35 | 127 (43-45) | 128 (46-48) | 445.1 | 298.6 | 649.5 | 0.978 |
| 36 | 129 (43-45) | 130 (46-48) | 639.7 | 460.5 | 877.2 | 0.9814 |
| 37 | 131 (43-45) | 132 (46-48) | 370.7 | 297.9 | 459.5 | 0.9916 |
| 38 | 133 (49-51) | 134 (52-54) | 607.4 | 492.1 | 745.8 | 0.991 |
| 39 | 135 (49-51) | 136 (52-54) | 1147 | 902.5 | 1444 | 0.9852 |
| 40 | 137 (49-51) | 138 (52-54) | 868.9 | 715.7 | 1053 | 0.9884 |
| 41 | 139 | 140 | 3465 | 2681 | 4471 | 0.9644 |
| 42 | 141 | 142 | 12862 | 9161 | 25469 | 0.863 |
| 43 | 143 (67-69) | 144 (70-72) | 1449 | 1138 | 1831 | 0.9805 |
| 44 | 145 | 146 | 5781 | 4924 | 6796 | 0.9729 |

TABLE 5

IC50 of IgE dissociation from mast cells in 20 hours

| | Antibody | | | 95% CI | | |
|---|---|---|---|---|---|---|
| ID | HC SEQ ID (CDR SEQs) | LC SEQ ID (CDR SEQs) | IC50 (nM) | Lower Limit | Upper Limit | R squared |
| Omalizumab | 151 Comparator_1 | 152 Comparator_1 | 10998 | 8573 | 17308 | 0.8202 |
| C6 | 161 Comparator_6 | 162 Comparator_6 | 2014 | 1453 | 2780 | 0.9572 |
| C4 | 157 Comparator_4 | 158 Comparator_4 | 814.6 | 579.4 | 1138 | 0.9662 |
| C5 | 159 Comparator_5 | 160 Comparator_5 | 1071 | 816.3 | 1398 | 0.9783 |
| C3 | 155 Comparator_3 | 156 Comparator_3 | 500.8 | 379.5 | 659.4 | 0.9786 |

TABLE 10

| | | | | 95% CI | | | Relative to Antibody 32 (hc = SEQ ID NO: 121; |
|---|---|---|---|---|---|---|---|
| Antibody ID | HC SEQ ID (CDR SEQs) | LC SEQ ID (CDR SEQs) | IC50 | Lower Limit | Upper Limit | R squared | lc = SEQ ID NO: 122) |
| Comparator_1 | 151 Comparator_1 | 152 Comparator_1 | 10551 | 9165 | 12396 | 0.9888 | n.a. |
| 47 | hc_47 (SEQ ID NO: 315) | lc_47 (SEQ ID NO: 316) | 707.9 | 555.1 | 894.9 | 0.9899 | HC, D28S |
| 49 | hc_49 (SEQ ID NO: 319) | lc_49 (SEQ ID NO: 320) | 629.1 | 542.3 | 727.5 | 0.996 | HC, Q31S |
| 50 | hc_50 (SEQ ID NO: 321) | lc_50 (SEQ ID NO: 322) | 673.5 | 502.4 | 889 | 0.9864 | HC, Q31D |
| 51 | hc_51 (SEQ ID NO: 323) | lc_51 (SEQ ID NO: 324) | 612.7 | 479.2 | 775 | 0.9898 | HC, Q31E |
| 53 | hc_53 (SEQ ID NO: 327) | lc_53 (SEQ ID NO: 328) | 952 | 712.1 | 1255 | 0.9848 | HC, G74E |
| 54 | hc_54 (SEQ ID NO: 329) | lc_54 (SEQ ID NO: 330) | 707.8 | 573.1 | 870 | 0.9912 | HC, G74Q |
| 55 | hc_55 (SEQ ID NO: 331) | lc_55 (SEQ ID NO: 332) | 1098 | 901.5 | 1337 | 0.9888 | HC, G74S |
| 56 | hc_56 (SEQ ID NO: 333) | lc_56 (SEQ ID NO: 334) | 963.3 | 777.5 | 1189 | 0.9893 | HC, G74K |
| 57 | hc_57 (SEQ ID NO: 335) | lc_57 (SEQ ID NO: 336) | 1115 | 888.3 | 1391 | 0.9872 | HC, G74A |
| 59 | hc_59 (SEQ ID NO: 339) | lc_59 (SEQ ID NO: 340) | 816.5 | 711.3 | 936.1 | 0.9952 | HC, K98R |
| 62 | hc_62 (SEQ ID NO: 345) | lc_62 (SEQ ID NO: 346) | 1229 | 1042 | 1449 | 0.991 | HC, N100S |
| 63 | hc_63 (SEQ ID NO: 347) | lc_63 (SEQ ID NO: 348) | 2449 | 1907 | 3125 | 0.9727 | HC, N100D |
| 64 | hc_64 (SEQ ID NO: 349) | lc_64 (SEQ ID NO: 350) | 1546 | 1230 | 1931 | 0.9839 | HC, N100K |
| 65 | hc_65 (SEQ ID NO: 351) | lc_65 (SEQ ID NO: 352) | 2571 | 2126 | 3098 | 0.9835 | HC, N101H |
| 76 | hc_76 (SEQ ID NO: 357) | lc_76 (SEQ ID NO: 358) | 946.9 | 704.9 | 1254 | 0.9829 | LC, A31S |
| 77 | hc_77 (SEQ ID NO: 359) | lc_77 (SEQ ID NO: 360) | 805.1 | 454.4 | 1325 | 0.9485 | LC, A31G |
| 78 | hc_78 (SEQ ID NO: 361) | lc_78 (SEQ ID NO: 362) | 755.9 | 610.3 | 933.2 | 0.9908 | LC, A31E |
| 79 | hc_79 (SEQ ID NO: 363) | lc_79 (SEQ ID NO: 364) | 719.5 | 545.6 | 940.6 | 0.9855 | LC, A31D |

Example 3: Basophil Activation Studies

Overview

Whole blood from healthy human donors was sourced from donor banks, which collect normal whole peripheral blood using Institutional Review Board (IRB)-approved consent forms and protocols. They were screened to be negative for HIV-1 and 2, Hepatitis B, and Hepatitis C.

Fresh whole blood in K2-EDTA from human donors was used upon passing visual inspection for hemolysis. Whole blood from each donor was combined with staining reagent and stimulation buffer from BÜHLMANN Laboratories' Flow CAST Basophil Activation Test (BAT; Catalog #FK-CCR-U) in bulk prior to being plated in 96-well plates. Briefly, stimulation buffer (BÜHLMANN Laboratories, Catalog #B-CCR-STB) and staining reagent containing anti-CD63-FITC and anti-CCR3-PE monoclonal antibodies (mAb) (BÜHLMANN Laboratories, Catalog #B-CCR-SR) were prepared such that 100 μL of stimulation buffer and 12 μL of staining reagent would be added per experimental condition. For each donor, whole blood was combined with the prepared staining mixture such that 50 μL of blood would be added per experimental condition. Once prepared in bulk, 162 μL of the mixture was plated in 96-well round-bottom tissue culture-treated plates (Corning, Catalog #353077).

Anti-IgE test article antibodies were prepared at 4.25× of the final concentration such that 50 μL could be added per experimental condition to yield the indicated concentrations. Stimulation buffer and anti-Fc Epsilon R1 (anti-FcεRI) mAb (BÜHLMANN Laboratories, Catalog #B-CCR-STCON) were used as negative and positive control conditions, respectively, directly from the kit, plating 50 μL per well in duplicate on each plate.

Whole blood samples were incubated with test article or controls for 30 minutes. Following the respective incubation time, plates were centrifuged for 5 minutes at 600×g, 4° C. Supernatant was discarded, and cells were resuspended in 200 μL per well of 1× lysis buffer from the kit (BÜHLMANN Laboratories, Catalog #B-CCR-LYR). Samples were incubated for 7 minutes at ambient temperature. Following incubation, plates were centrifuged for 5 minutes at 600×g, 4° C., and samples were subsequently washed with 200 μL per well of 1× lysis buffer followed by a 200 μL per well wash with cold cell staining buffer (CSB; BioLegend, Catalog #420201). Supernatant was discarded, and samples were placed on ice for 2 minutes. Cells were then resuspended in 150 μL per well of CSB.

Immediately following cell lysis, samples were stained with an anti-IgE antibody and acquired via high throughput flow cytometry. Briefly, plates were centrifuged for 5 minutes at 600×g, 4° C., and supernatant was discarded. 2.5 µL of an APC-conjugated anti-IgE monoclonal antibody (Clone Ige21; eBioscience, Catalog #17-6986-42) in 97 µL of CSB was added to each well, and samples were incubated for 15 minutes at 4° C.

Following incubation, 100 µL per well of CSB was added, and plates were centrifuged for 5 minutes at 600×g, 4° C. Supernatant was discarded, and cells were resuspended in 150 µL of cold CSB for acquisition on a flow cytometer (BD FACSCalibur; Becton, Dickinson and Company; Franklin Lakes, NJ).

Basophils were identified by gating on CCR3+ SSCLow cells. Activated basophils were identified by gating on CD63+ cells of CCR3+ SSCLow cells. The Geometric Mean Fluorescence Intensity (GeoMFI) of the APC (anti-IgE) detection channel was generated for each sample, gated within the basophil population.

Results

Figure 1B:
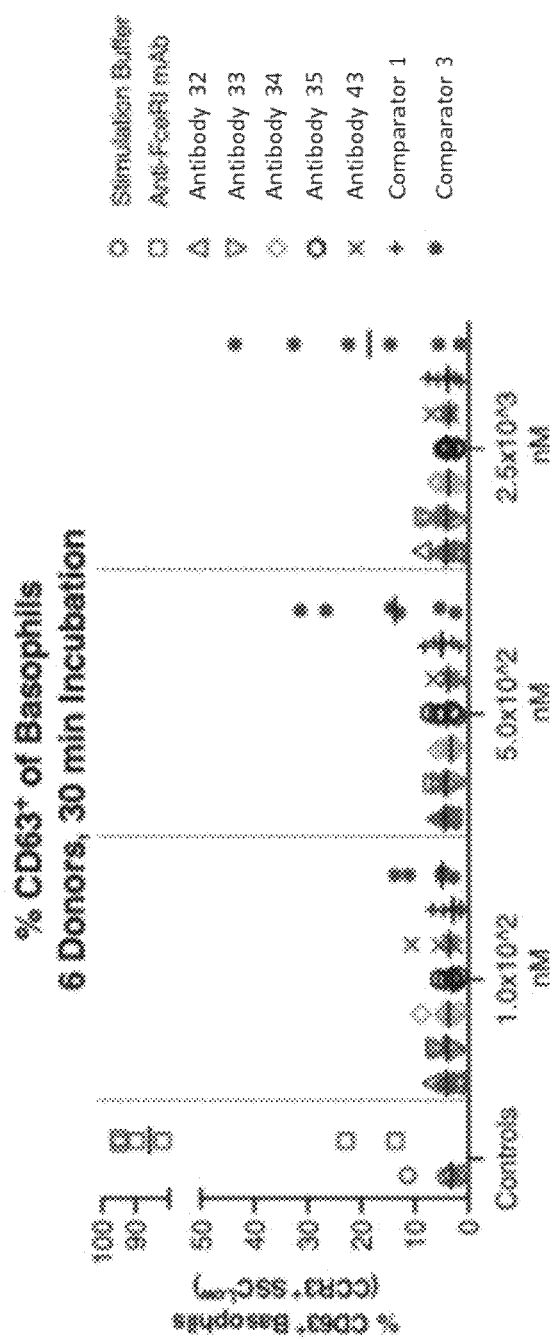

Test article antibodies (comprising CDRs encompassed by SEQ ID NOs: 1-6, CDRH1-3 and CDRL1-3 respectively) do not activate human basophils (e.g., they do not exhibit a dose-dependent increase in basophil activation as assayed and/or a CD63+% greater than 10% as assayed). FIG. 1A shows activation profiles of comparator antibodies 1 (omalizumab), 3 (C3), and 6 (C6 having a HC and light chain of SEQ ID NOs. 161 and 162, respectively) in whole blood basophils, with comparator 3 (C3) showing spontaneous activation of basophils. FIG. 1B shows activation profiles of test article antibodies 32, 33, 34, 35, and 43 in whole blood basophils, with no observable activation of basophils. As described above, human whole blood was mixed with a basophil stimulation and culture media, and then exposed to anti-IgEs at the indicated concentrations for 30 minutes. Cells were then stained for surface CD63 as a marker of activation and analyzed by flow cytometry. The % CD63+ cells were compared to negative buffer treated controls or the positive anti-FcεRI activating control to classify activating vs. non-activating anti-IgEs.

Example 4: Basophil Dissociation Studies

Whole blood from healthy human donors was sourced from donor banks, which collect normal whole peripheral blood using Institutional Review Board (IRB) approved consent forms and protocols. They were screened to be negative for HIV-1 and 2, Hepatitis B, and Hepatitis C.

Fresh whole blood in K2-EDTA from human donors was used upon passing visual inspection for hemolysis. Whole blood from each donor was combined with staining reagent and stimulation buffer from BÜHLMANN Laboratories' Flow CAST Basophil Activation Test (BAT; Catalog #FK-CCR-U) in bulk prior to being plated in 96-well plates. Briefly, stimulation buffer (BÜHLMANN Laboratories, Catalog #B-CCR-STB) and staining reagent containing anti-CD63-FITC and anti-CCR3-PE monoclonal antibodies (mAb) (BÜHLMANN Laboratories, Catalog #B-CCR-SR) were prepared such that 100 µL of stimulation buffer and 12 µL of staining reagent would be added per experimental condition. For each donor, whole blood was combined with the prepared staining mixture such that 50 µL of blood would be added per experimental condition. Once prepared in bulk, 162 µL of the mixture was plated in 96-well round-bottom tissue culture-treated plates (Corning, Catalog #353077).

Anti-IgE test article antibodies were prepared at 4.25× of the final concentration such that 50 µL could be added per experimental condition to yield the indicated concentrations. Stimulation buffer and anti-Fc Epsilon RI (anti-FcεRI) mAb (BÜHLMANN Laboratories, Catalog #B-CCR-STCON) were used as negative and positive control conditions, respectively, directly from the kit, plating 50 µL per well in duplicate on each plate.

Whole blood samples were incubated with test article or controls for 20 hours. Following the respective incubation time, plates were centrifuged for 5 minutes at 600×g, 4° C. Supernatant was discarded, and cells were resuspended in 200 µL per well of 1× lysis buffer from the kit (BÜHLMANN Laboratories, Catalog #B-CCR-LYR). Samples were incubated for 7 minutes at ambient temperature. 4.3.2. Following incubation, plates were centrifuged for 5 minutes at 600×g, 4° C., and samples were subsequently washed with 200 µL per well of 1× lysis buffer followed by a 200 µL per well wash with cold cell staining buffer (CSB; BioLegend, Catalog #420201). Supernatant was discarded, and samples were placed on ice for 2 minutes. Cells were then resuspended in 150 µL per well of CSB.

Immediately following cell lysis, samples were stained with an anti-IgE antibody and acquired via high throughput flow cytometry. Briefly, plates were centrifuged for 5 minutes at 600×g, 4° C., and supernatant was discarded. 2.5 µL of an APC-conjugated anti-IgE monoclonal antibody (Clone Ige21; eBioscience, Catalog #17-6986-42) in 97 µL of CSB was added to each well, and samples were incubated for 15 minutes at 4° C.

Following incubation, 100 µL per well of CSB was added, and plates were centrifuged for 5 minutes at 600×g, 4° C. Supernatant was discarded, and cells were resuspended in 150 µL of cold CSB for acquisition on a flow cytometer (BD FACSCalibur; Becton, Dickinson and Company; Franklin Lakes, NJ).

Basophils were identified by gating on CCR3+ SSCLow cells. Activated basophils were identified by gating on CD63+ cells of CCR3+ SSCLow cells. The Geometric Mean Fluorescence Intensity (GeoMFI) of the APC (anti-IgE) detection channel was generated for each sample, gated within the basophil population.

Results

Test article antibodies (comprising CDRs encompassed by SEQ ID NOs: 1-6, CDRH1-3 and CDRL1-3 respectively) exhibit a high potency of accelerated IgE dissociation from basophils. Table 6 shows IC50 of IgE dissociation of IgE from whole blood basophils. Comparator 1 (omalizumab) exhibited poor potency for IgE dissociation (hundreds of nanomolar), whereas test articles 32-35 and 43 showed substantially better potency for IgE dissociation. As described above, human whole blood was mixed with a basophil stimulation and culture media, and then exposed to anti-IgEs at the indicated concentrations for 20 hours. Cells were then stained for surface IgE and acquired by flow cytometry. The geometric mean fluorescent intensity of surface IgE was plotted against the anti-IgE concentration and fit with 4 parameter logistic curve fit to calculate the IC50.

TABLE 6

IC50 of IgE dissociation from basophils cells in 20 hours by donor IC50 (nM)

| Antibody ID | 32 | 33 | 34 | 35 | 43 | C1 (Omalizumab) | C3 |
|---|---|---|---|---|---|---|---|
| Donor 1 | 29.71 | 95.75 | 38.62 | 56.56 | 97.78 | 396.10 | 21.69 |
| Donor 2 | 42.30 | 89.37 | 32.31 | 35.91 | 114.40 | 308.80 | 25.68 |
| Donor 3 | 54.90 | 104.80 | 36.62 | 45.84 | 100.40 | 403.70 | 28.04 |
| Donor 4 | 30.26 | 97.39 | 26.97 | 35.37 | n/a | 242.20 | 23.07 |
| Donor 5 | 41.02 | 125.70 | 67.23 | 72.14 | n/a | 335.90 | 33.99 |
| Donor 6 | 29.82 | 57.89 | 28.73 | 30.66 | n/a | 237.10 | 15.26 |

Example 5: Thermal Stability Studies

Differential Scanning Fluorimetry (DSF) to determine the melting temperature was conducted with antibodies diluted to 0.1 mg/mL in PBS pH 7.5 with SYPRO Orange dye.

Chemical stability studies: Samples were stored at the forced-degradation condition of 40° C. for 14 days. After pulling from storage, the aggregation was quenched by refrigerating the sample for at least 30 min prior to analysis. The samples were maintained at 4° C. until analysis by CIEF.

Results

Test article antibodies (comprising CDRs encompassed by SEQ ID NOs: 1-6, CDRH1-3 and CDRL1-3 respectively) exhibit high thermal and chemical stability. Table 7 shows chemical stability data for test articles 32-37, 43, and 45-46 (comprising CDRs encompassed by SEQ ID NOs: 1-6, CDRH1-3 and CDRL1-3 respectively), where all test articles exhibit a % main peaks of less than 9%. As described above, charge variance profiles of anti-IgEs heat stressed at 40° C. for 14 days as assessed by capillary isoelectric focusing (cIEF). Percent change in main, acidic, and basic peaks from T=0 to T=14 days is presented. Table 7 also shows chemical stability data for comparator antibodies C1 (omalizumab), C6, C4, C5, and C3, where % main peak changes greater than 14% (substantially higher as compared to test articles) were observed for all comparators except for C3 (however, as described above, C3 exhibits spontaneous activation of basophils unlike test articles). Table 8 shows thermal stability of anti-IgE antibodies. Test articles 32, 34, 35, 37, 43, and 46 exhibited a Tm1 greater than 65° C. As described above, differential Scanning Fluorimetry (DSF) melting temperatures of antibodies diluted to 0.1 mg/mL in PBS pH 7.5.

TABLE 7

Chemical stability of select anti-IgE antibodies

| ID | % Change Main | % Change Acidic | % Change Basic |
|---|---|---|---|
| 32 | 6.58 | 5.79 | 0.79 |
| 33 | 4.73 | 4.25 | 0.47 |
| 34 | 5.36 | 4.16 | 1.2 |
| 35 | 5.54 | 5.32 | 0.23 |
| 36 | 8.69 | 8.34 | 0.35 |
| 37 | 7.47 | 7.12 | 0.34 |
| 43 | 7.7 | 6.19 | 1.51 |
| 46 | 7.37 | 6.66 | 0.71 |
| 45 | 7.73 | 6.51 | 1.22 |
| C1 | 24.95 | 2.67 | 22.28 |
| C6 | 14.29 | 0.1 | 14.19 |

TABLE 7-continued

Chemical stability of select anti-IgE antibodies

| ID | % Change Main | % Change Acidic | % Change Basic |
|---|---|---|---|
| C5 | 14.42 | 0.5 | 13.93 |
| C4 | 14.7 | 0.74 | 13.97 |
| C3 | 8.34 | 3.82 | 4.51 |

TABLE 8

Thermal stability of select anti-IgE antibodies

| ID | Tm1 (° C.) | Tm2 (° C.) |
|---|---|---|
| 32 | 69 | 86.5 |
| 33 | 63 | 86.5 |
| 34 | 68.5 | 86.5 |
| 35 | 69.5 | 86 |
| 36 | 63 | 86 |
| 37 | 68.5 | 85.5 |
| 43 | 69.5 | 85 |
| 46 | 62.5 | 84 |
| 45 | 68.5 | 85 |
| C1 | 69 | 81 |
| C6 | 70.5 | ND |
| C5 | 67 | ND |
| C4 | 64.5 | ND |
| C3 | 69 | 85 |

Example 6: Treatment of Allergic Asthma

The heavy chain variable region and light chain variable region of each of antibodies 32-40, 43, 45-51, 53-59, 62-65, 76-79, and 83 is engineered into a human IgG1 format with a modified Fc domain having Y252/T254/E256 (YTE) per EU numbering. Additionally, the heavy chain variable region and light chain variable region of each of antibodies 32-40, 43, 45-51, 53-59, 62-65, 76-79, and 83 is engineered into a human IgG1 format with a modified Fc domain having L428/S434 (LS) per EU numbering. Each antibody is used to treat allergic asthma.

Example 7: Treatment of Chronic Spontaneous Urticaria

The heavy chain variable region and light chain variable region of each of antibodies 32-40, 43, 45-51, 53-59, 62-65, 76-79, and 83 is engineered into a human IgG1 format with a modified Fc domain having Y252/T254/E256 (YTE) per EU numbering. Additionally, the heavy chain variable region and light chain variable region of each of antibodies 32-40, 43, 45-51, 53-59, 62-65, 76-79, and 83 is engineered into a human IgG1 format with a modified Fc domain having L428/S434 (LS) per EU numbering. Each antibody is used to treat chronic spontaneous urticaria.

Example 8: Treatment of Chronic Rhinosinusitis with Nasal Polyps

The heavy chain variable region and light chain variable region of each of antibodies 32-40, 43, 45-51, 53-59, 62-65, 76-79, and 83 is engineered into a human IgG1 format with a modified Fc domain having Y252/T254/E256 (YTE) per EU numbering. Additionally, the heavy chain variable region and light chain variable region of each of antibodies 32-40, 43, 45-51, 53-59, 62-65, 76-79, and 83 is engineered into a human IgG1 format with a modified Fc domain having L428/S434 (LS) per EU numbering. Each antibody is used to treat chronic rhinosinusitis with nasal polyps.

Example 9: Treatment of Food Allergies

The heavy chain variable region and light chain variable region of each of antibodies 32-40, 43, 45-51, 53-59, 62-65, 76-79, and 83 is engineered into a human IgG1 format with a modified Fc domain having Y252/T254/E256 (YTE) per EU numbering. Additionally, the heavy chain variable region and light chain variable region of each of antibodies 32-40, 43, 45-51, 53-59, 62-65, 76-79, and 83 is engineered into a human IgG1 format with a modified Fc domain having L428/S434 (LS) per EU numbering. Each antibody is used to treat food allergies.

While preferred embodiments of the present disclosure have been shown and described herein, it will be obvious to those skilled in the art that such embodiments are provided by way of example only. Numerous variations, changes, and substitutions will now occur to those skilled in the art without departing from the instant disclosure. It should be understood that various alternatives to the embodiments described herein may be employed in practicing the invention. It is intended that the following claims define the scope of the embodiments disclosed herein, and that methods and structures within the scope of these claims and their equivalents be covered thereby.

SEQUENCES

| SEQ ID NO: | Sequence | Annotation |
|---|---|---|
| 1 | GYDITQGYSWN | cdrh1 |
| 2 | $SX_1X_2YSGX_3TX_4YNPSVKG$ | cdrh2 where: $X_1$ is I or V $X_2$ is K or T $X_3$ is E or S $X_4$ is K or N |
| 3 | GNNYFGHWHFAV | cdrh3 |
| 4 | $RASKSVDAEGDSYX_1NWY$ | cdrl1 where: $X_1$ is L or M |
| 5 | AASYLES | cdrl2 |
| 6 | QQSHEDPY | cdrl3 |
| 7 | GYDITQGYS | cdrh1 |
| 8 | $X_1X_2YSGX_3T$ | cdrh2 where: $X_1$ is I or V $X_2$ is K or T $X_3$ is E or S |
| 9 | AKGNNYFGHWHFAV | cdrh3 |
| 10 | RASKSVDAEGDSY | cdrl1 |
| 11 | AASYL | cdrl2 |
| 12 | QQSHEDPYT | cdrl3 |
| 13 | QGYSWN | cdrh1 |
| 14 | $SX_1X_2YSGX_3TX_4YNPSVKG$ | cdrh2 where: $X_1$ is I or V $X_2$ is K or T $X_3$ is E or S $X_4$ is K or N |
| 15 | GNNYFGHWHFAV | cdrh3 |
| 16 | $RASKSVDAEGDSYX_1N$ | cdrl1 where: $X_1$ is L or M |
| 17 | AASYLES | cdrl2 |
| 18 | QQSHEDPYT | cdrl3 |
| 19 | GYDITQGY | cdrh1 |

-continued

| SEQ ID NO: | Sequence | Annotation |
|---|---|---|
| 20 | X$_2$YSGE | cdrh2 where: X$_2$ is K or T |
| 21 | GNNYFGHWHFAV | cdrh3 |
| 22 | RASKSVDAEGDSYX$_1$N | cdrl1 where: X$_1$ is L or M |
| 23 | AASYLES | cdrl2 |
| 24 | QQSHEDPYT | cdrl3 |
| 25 | GYDITQGYSWN | cdrh1 |
| 26 | WVASX$_1$X$_2$YSGETK | cdrh2 where: X$_1$ is I or V X$_2$ is K or T |
| 27 | AKGNNYFGHWHFA | cdrh3 |
| 28 | RASKSVDAEGDSYXN | cdrl1 where: X$_1$ is L or M |
| 29 | LLIYAASYLE | cdrl2 |
| 30 | QQSHEDPY | cdrl3 |
| 31 | GYDITQGYSWN | cdrh1 |
| 32 | X$_2$YSGE | cdrh2 where: X$_2$ is K or T |
| 33 | GNNYFGHWHFAV | cdrh3 |
| 34 | RASKSVDAEGDSY | cdrl1 |
| 35 | AASYL | cdrl2 |
| 36 | QQSHEDPY | cdrl3 |
| 201 | GYX$_1$ITX$_2$GYSWN | cdrh1 where: X$_1$ is D, S or N X$_2$ is Q, S, E, or D |
| 202 | SX$_1$X$_2$YSGX$_3$TX$_4$YNPSVKG | cdrh2 where: X$_1$ is I or V X$_2$ is K or T X$_3$ is E or S X$_4$ is N or K |
| 203 | GX$_1$X$_2$YFGHWHFAV | cdrh3 where: X$_1$ is N, S, D, or K X$_2$ is N or H |
| 204 | RASKSVDX$_1$X$_2$GDSYX$_3$NWY | cdrl1 where: X$_1$ is A, S, G, E, or D X$_2$ is E or Q X$_3$ is L or M |

-continued

| SEQ ID NO: | Sequence | Annotation |
|---|---|---|
| 205 | AASYLES | cdrl2 |
| 206 | QQSHEDPY | cdrl3 |
| 207 | GYX$_1$ITQGYSWN | cdrh1 where: X$_1$ is S or N |
| 208 | SIKYSGETKYNPSVKG | cdrh2 |
| 209 | GNNYFGHWHFAV | cdrh3 |
| 210 | RASKSVDAEGDSYLNWY | cdrl1 |
| 211 | AASYLES | cdrl2 |
| 212 | QQSHEDPY | cdrl3 |
| 213 | GYDITX$_1$GYSWN | cdrh1 where: X$_1$ is S, E, or D |
| 214 | SIKYSGETKYNPSVKG | cdrh2 |
| 215 | GNNYFGHWHFAV | cdrh3 |
| 216 | RASKSVDAEGDSYLNWY | cdrl1 |
| 217 | AASYLES | cdrl2 |
| 218 | QQSHEDPY | cdrl3 |
| 219 | GYDITQGYSWN | cdrh1 |
| 220 | SVKYSGETKYNPSVKG | cdrh2 |
| 221 | GNNYFGHWHFAV | cdrh3 |
| 222 | RASKSVDAEGDSYLNWY | cdrl1 |
| 223 | AASYLES | cdrl2 |
| 224 | QQSHEDPY | cdrl3 |
| 225 | GYDITQGYSWN | cdrh1 |
| 226 | SITYSGSTNYNPSVKG | cdrh2 |
| 227 | GNNYFGHWHFAV | cdrh3 |
| 228 | RASKSVDAEGDSYLNWY | cdrl1 |
| 229 | AASYLES | cdrl2 |
| 230 | QQSHEDPY | cdrl3 |
| 231 | GYDITQGYSWN | cdrh1 |
| 232 | SIKYSGETKYNPSVKG | cdrh2 |
| 233 | GX$_1$NYFGHWHFAV | cdrh3 where: X$_1$ is S, D, or K |
| 234 | RASKSVDAEGDSYLNWY | cdrl1 |
| 235 | AASYLES | cdrl2 |
| 236 | QQSHEDPY | cdrl3 |
| 371 | GYDITQGYSWN | cdrh1 |

-continued

| SEQ ID NO: | Sequence | Annotation |
|---|---|---|
| 372 | SIKYSGETKYNPSVKG | cdrh2 |
| 373 | GNHYFGHWHFAV | cdrh3 |
| 374 | RASKSVDAEGDSYLNWY | cdrl1 |
| 375 | AASYLES | cdrl2 |
| 376 | QQSHEDPY | cdrl3 |
| 237 | GYDITQGYSWN | cdrh1 |
| 238 | SIKYSGETKYNPSVKG | cdrh2 |
| 239 | GNNYFGHWHFAV | cdrh3 |
| 240 | RASKSVDX$_1$EGDSYLNWY | cdrl1 where: X$_1$ is S, G, E, or D |
| 241 | AASYLES | cdrl2 |
| 242 | QQSHEDPY | cdrl3 |
| 377 | GYDITQGYSWN | cdrh1 |
| 378 | SIKYSGETKYNPSVKG | cdrh2 |
| 379 | GNNYFGHWHFAV | cdrh3 |
| 380 | RASKSVDAQGDSYLNWY | cdrl1 |
| 381 | AASYLES | cdrl2 |
| 382 | QQSHEDPY | cdrl3 |
| 243 | GYDITQGYSWN | cdrh1 |
| 244 | SIKYSGETKYNPSVKG | cdrh2 |
| 245 | GNNYFGHWHFAV | cdrh3 |
| 246 | RASKSVDAEGDSYMNWY | cdrl1 |
| 247 | AASYLES | cdrl2 |
| 248 | QQSHEDPY | cdrl3 |
| 249 | GYSITQGYSWN | cdrh1 |
| 250 | SIKYSGETKYNPSVKG | cdrh2 |
| 251 | GNNYFGHWHFAV | cdrh3 |
| 252 | RASKSVDAEGDSYLNWY | cdrl1 |
| 253 | AASYLES | cdrl2 |
| 254 | QQSHEDPY | cdrl3 |
| 255 | GYNITQGYSWN | cdrh1 |
| 256 | SIKYSGETKYNPSVKG | cdrh2 |
| 257 | GNNYFGHWHFAV | cdrh3 |
| 258 | RASKSVDAEGDSYLNWY | cdrl1 |
| 259 | AASYLES | cdrl2 |
| 260 | QQSHEDPY | cdrl3 |
| 261 | GYDITSGYSWN | cdrh1 |

-continued

| SEQUENCES | | |
|---|---|---|
| SEQ ID NO: | Sequence | Annotation |
| 262 | SIKYSGETKYNPSVKG | cdrh2 |
| 263 | GNNYFGHWHFAV | cdrh3 |
| 264 | RASKSVDAEGDSYLNWY | cdrl1 |
| 265 | AASYLES | cdrl2 |
| 266 | QQSHEDPY | cdrl3 |
| 267 | GYDITEGYSWN | cdrh1 |
| 268 | SIKYSGETKYNPSVKG | cdrh2 |
| 269 | GNNYFGHWHFAV | cdrh3 |
| 270 | RASKSVDAEGDSYLNWY | cdrl1 |
| 271 | AASYLES | cdrl2 |
| 272 | QQSHEDPY | cdrl3 |
| 365 | GYDITDGYSWN | cdrh1 |
| 366 | SIKYSGETKYNPSVKG | cdrh2 |
| 367 | GNNYFGHWHFAV | cdrh3 |
| 368 | RASKSVDAEGDSYLNWY | cdrl1 |
| 369 | AASYLES | cdrl2 |
| 370 | QQSHEDPY | cdrl3 |
| 273 | GYDITQGYSWN | cdrh1 |
| 274 | SIKYSGETKYNPSVKG | cdrh2 |
| 275 | GSNYFGHWHFAV | cdrh3 |
| 276 | RASKSVDAEGDSYLNWY | cdrl1 |
| 277 | AASYLES | cdrl2 |
| 278 | QQSHEDPY | cdrl3 |
| 279 | GYDITQGYSWN | cdrh1 |
| 280 | SIKYSGETKYNPSVKG | cdrh2 |
| 281 | GDNYFGHWHFAV | cdrh3 |
| 282 | RASKSVDAEGDSYLNWY | cdrl1 |
| 283 | AASYLES | cdrl2 |
| 284 | QQSHEDPY | cdrl3 |
| 285 | GYDITQGYSWN | cdrh1 |
| 286 | SIKYSGETKYNPSVKG | cdrh2 |
| 287 | GKNYFGHWHFAV | cdrh3 |
| 288 | RASKSVDAEGDSYLNWY | cdrl1 |
| 289 | AASYLES | cdrl2 |
| 290 | QQSHEDPY | cdrl3 |
| 291 | GYDITQGYSWN | cdrh1 |
| 292 | SIKYSGETKYNPSVKG | cdrh2 |

-continued

SEQUENCES

| SEQ ID NO: | Sequence | Annotation |
|---|---|---|
| 293 | GNNYFGHWHFAV | cdrh3 |
| 294 | RASKSVDSEGDSYLNWY | cdrl1 |
| 295 | AASYLES | cdrl2 |
| 296 | QQSHEDPY | cdrl3 |
| 297 | GYDITQGYSWN | cdrh1 |
| 298 | SIKYSGETKYNPSVKG | cdrh2 |
| 299 | GNNYFGHWHFAV | cdrh3 |
| 300 | RASKSVDGEGDSYLNWY | cdrl1 |
| 301 | AASYLES | cdrl2 |
| 302 | QQSHEDPY | cdrl3 |
| 303 | GYDITQGYSWN | cdrh1 |
| 304 | SIKYSGETKYNPSVKG | cdrh2 |
| 305 | GNNYFGHWHFAV | cdrh3 |
| 306 | RASKSVDEEGDSYLNWY | cdrl1 |
| 307 | AASYLES | cdrl2 |
| 308 | QQSHEDPY | cdrl3 |
| 309 | GYDITQGYSWN | cdrh1 |
| 310 | SIKYSGETKYNPSVKG | cdrh2 |
| 311 | GNNYFGHWHFAV | cdrh3 |
| 312 | RASKSVDDEGDSYLNWY | cdrl1 |
| 313 | AASYLES | cdrl2 |
| 314 | QQSHEDPY | cdrl3 |
| 37 | GYDITQGYSWN | cdrh1 |
| 38 | SIKYSGETKYNPSVKG | cdrh2 |
| 39 | GNNYFGHWHFAV | cdrh3 |
| 40 | RASKSVDAEGDSYLNWY | cdrl1 |
| 41 | AASYLES | cdrl2 |
| 42 | QQSHEDPY | cdrl3 |
| 43 | GYDITQGYSWN | cdrh1 |
| 44 | SVKYSGETKYNPSVKG | cdrh2 |
| 45 | GNNYFGHWHFAV | cdrh3 |
| 46 | RASKSVDAEGDSYLNWY | cdrl1 |
| 47 | AASYLES | cdrl2 |
| 48 | QQSHEDPY | cdrl3 |
| 49 | GYDITQGYSWN | cdrh1 |
| 50 | SIKYSGETKYNPSVKG | cdrh2 |
| 51 | GNNYFGHWHFAV | cdrh3 |

-continued

| SEQ ID NO: | Sequence | Annotation |
|---|---|---|
| 52 | RASKSVDAEGDSYMNWY | cdrl1 |
| 53 | AASYLES | cdrl2 |
| 54 | QQSHEDPY | cdrl3 |
| 55 | GYDITQGYSWN | cdrh1 |
| 56 | SIKYSGETKYNPSVKG | cdrh2 |
| 57 | GNNYFGHWHFAV | cdrh3 |
| 58 | RASKSVDTEGDSYLNWY | cdrl1 |
| 59 | AASYLES | cdrl2 |
| 60 | QQSHEDPY | cdrl3 |
| 61 | GYDITQGYSWN | cdrh1 |
| 62 | SIKYSGETKYNPSVKG | cdrh2 |
| 63 | GNNYFGHWHFAV | cdrh3 |
| 64 | RASKSVDRQGDSYLNWY | cdrl1 |
| 65 | AASYLES | cdrl2 |
| 66 | QQSHEDPY | cdrl3 |
| 67 | GYDITQGYSWN | cdrh1 |
| 68 | SITYSGSTNYNPSVKG | cdrh2 |
| 69 | GNNYFGHWHFAV | cdrh3 |
| 70 | RASKSVDAEGDSYLNWY | cdrl1 |
| 71 | AASYLES | cdrl2 |
| 72 | QQSHEDPY | cdrl3 |
| 73 | GYDITQGYSWN | cdrh1 |
| 74 | SIKYSGETKYNPSVKG | cdrh2 |
| 75 | GNNYFGHWHFAV | cdrh3 |
| 76 | RASKSVDWEGDSYLNWY | cdrl1 |
| 77 | AASYLES | cdrl2 |
| 78 | QQSHEDPY | cdrl3 |
| 79 | GYDITQGYSWN | cdrh1 |
| 80 | SITYSGSTNYNPSVKG | cdrh2 |
| 81 | GNNYFGHWHFAV | cdrh3 |
| 82 | RASKSVDAEGDSYLNWY | cdrl1 |
| 83 | AASYLES | cdrl2 |
| 84 | QQSHEDPY | cdrl3 |
| 85 | GYDITQGYSWN | cdrh1 |
| 86 | SITYSGSTNYNPSVKG | cdrh2 |
| 87 | GNNYFGHWHFAV | cdrh3 |
| 88 | RASKSVDAEGDSYLNWY | cdrl1 |

| SEQ ID NO: | Sequence | Annotation |
|---|---|---|
| 89 | AASYLES | cdrl2 |
| 90 | QQSHEDPY | cdrl3 |
| 91 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTL VTV SS | vh_32 |
| 92 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTV | vl_32 |
| 93 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SS | vh_33 |
| 94 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTV | vl_33 |
| 95 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTL VTV SS | vh_34 |
| 96 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTV | vl_34 |
| 97 | EVQLVESGGGLVQPGGSLRLSCAVSGYDITQGYSWNWIRQ APGKGLEWVASVKYSGETKYNPSVKGRITISRDGSKNTFYL QMNSLRAEDTAVYYCAKGNNYFGHWHFAVWGQGTLVTV SS | vh_35 |
| 98 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTV | vl_35 |
| 99 | EVQLVESGGGLVQPGGSLRLSCAVSGYDITQGYSWNWIRQ APGKGLEWVASVKYSGETKYNPSVKGRITISRDGSKNTFYL QMNSLRAEDTAVYYCAKGNNYFGHWHFAVWGQGTLVTV SS | vh_36 |
| 100 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTV | vl_36 |
| 101 | EVQLVESGGGLVQPGGSLRLSCAVSGYDITQGYSWNWIRQ APGKGLEWVASVKYSGETKYNPSVKGRITISRDGSKNTFYL QMNSLRAEDTAVYYCAKGNNYFGHWHFAVWGQGTLVTV SS | vh_37 |
| 102 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTV | vl_37 |
| 103 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SS | vh_38 |
| 104 | DIQLTQSPSSLSASVGDRVTITCRASKSVDAEGDSYMNWY QQKPGKAPKLLIYAASYLESGVPSRFSGSGSGTDFTLTISSL QPEDFATYYCQQSHEDPYTFGQGTKVEIKRTV | vl_38 |
| 105 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SS | vh_39 |

-continued

| SEQUENCES | | |
|---|---|---|
| SEQ ID NO: | Sequence | Annotation |
| 106 | DIQLTQSPSSLSASVGDRVTITCRASKSVDAEGDSYMNWY QQKPGKAPKLLIYAASYLESGVPSRFSGSGSGTDFTLTISSL QPEDFATYYCQQSHEDPYTFGQGTKVEIKRTV | vl_39 |
| 107 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SS | vh_40 |
| 108 | DIQLTQSPSSLSASVGDRVTITCRASKSVDAEGDSYMNWY QQKPGKAPKLLIYAASYLESGVPSRFSGSGSGTDFTLTISSL QPEDFATYYCQQSHEDPYTFGQGTKVEIKRTV | vl_40 |
| 109 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SS | vh_41 |
| 110 | DIQLTQSPSSLSASVGDRVTITCRASKSVDTEGDSYLNWYQ QKPGKAPKLLIYAASYLESGVPSRFSGSGSGTDFTLTISSLQ PEDFATYYCQQSHEDPYTFGQGTKVEIKRT | vl_41 |
| 111 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SS | vh_42 |
| 112 | DIQLTQSPSSLSASVGDRVTITCRASKSVDRQGDSYLNWYQ QKPGKAPKLLIYAASYLESGVPSRFSGSGSGTDFTLTISSLQ PEDFATYYCQQSHEDPYTFGQGTKVEIKRTV | vl_42 |
| 113 | EVQLVESGGGLVQPGGSLRLSCAVSGYDITQGYSWNWIRQ APGKGLEWVASITYSGSTNYNPSVKGRITISRDGSKNTFYL QMNSLRAEDTAVYYCAKGNNYFGHWHFAVWGQGTLVTV SS | vh_43 |
| 114 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTV | vl_43 |
| 115 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SS | vh_44 |
| 116 | DIQLTQSPSSLSASVGDRVTITCRASKSVDWEGDSYLNWYQ QKPGKAPKLLIYAASYLESGVPSRFSGSGSGTDFTLTISSLQ PEDFATYYCQQSHEDPYTFGQGTKVEIKRTV | vl_44 |
| 117 | EVQLVESGGGLVQPGGSLRLSCAVSGYDITQGYSWNWIRQ APGKGLEWVASITYSGSTNYNPSVKGRITISRDGSKNTFYL QMNSLRAEDTAVYYCAKGNNYFGHWHFAVWGQGTLVTV SS | vh_45 |
| 118 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTV | vl_45 |
| 119 | EVQLVESGGGLVQPGGSLRLSCAVSGYDITQGYSWNWIRQ APGKGLEWVASITYSGSTNYNPSVKGRITISRDGSKNTFYL QMNSLRAEDTAVYYCAKGNNYFGHWHFAVWGQGTLVTV SS | vh_46 |
| 120 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTV | vl_46 |
| 121 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV | hc_32 |

| SEQ ID NO: | Sequence | Annotation |
|---|---|---|
| | DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | |
| 122 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_32 |
| 123 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLYITREPEVTCVVVDVSHEDPEVKFNWYVD GVEVHNAKTKPREEQYNSTYRVVSVLTVLHQDWLNGKEY KCKVSNKALPAPIEKTISKAKGQPREPQVYTLPPSREEMTK NQVSLTCLVKGFYPSDIAVEWESNGQPENNYKTTPPVLDS DGSFFLYSKLTVDKSRWQQGNVFSCSVMHEALHNHYTQK SLSLSPGK | hc_33 |
| 124 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_33 |
| 125 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVLHEALHSHYTQK SLSLSPGK | hc_34 |
| 126 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_34 |
| 127 | EVQLVESGGGLVQPGGSLRLSCAVSGYDITQGYSWNWIRQ APGKGLEWVASVKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_35 |
| 128 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_35 |

SEQUENCES

| SEQ ID NO: | Sequence | Annotation |
|---|---|---|
| 129 | EVQLVESGGGLVQPGGSLRLSCAVSGYDITQGYSWNWIRQ APGKGLEWVASVKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLYITREPEVTCVVVDVSHEDPEVKFNWYVD GVEVHNAKTKPREEQYNSTYRVVSVLTVLHQDWLNGKEY KCKVSNKALPAPIEKTISKAKGQPREPQVYTLPPSREEMTK NQVSLTCLVKGFYPSDIAVEWESNGQPENNYKTTPPVLDS DGSFFLYSKLTVDKSRWQQGNVFSCSVMHEALHNHYTQK SLSLSPGK | hc_36 |
| 130 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_36 |
| 131 | EVQLVESGGGLVQPGGSLRLSCAVSGYDITQGYSWNWIRQ APGKGLEWVASVKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVLHEALHSHYTQK SLSLSPGK | hc_37 |
| 132 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_37 |
| 133 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_38 |
| 134 | DIQLTQSPSSLSASVGDRVTITCRASKSVDAEGDSYMNWY QQKPGKAPKLLIYAASYLESGVPSRFSGSGSGTDFTLTISSL QPEDFATYYCQQSHEDPYTFGQGTKVEIKRTVAAPSVFIFPP SDEQLKSGTASVVCLLNNFYPREAKVQWKVDNALQSGNS QESVTEQDSKDSTYSLSSTLTLSKADYEKHKVYACEVTHQ GLSSPVTKSFNRGEC | lc_38 |
| 135 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLYITREPEVTCVVVDVSHEDPEVKFNWYVD GVEVHNAKTKPREEQYNSTYRVVSVLTVLHQDWLNGKEY KCKVSNKALPAPIEKTISKAKGQPREPQVYTLPPSREEMTK NQVSLTCLVKGFYPSDIAVEWESNGQPENNYKTTPPVLDS DGSFFLYSKLTVDKSRWQQGNVFSCSVMHEALHNHYTQK SLSLSPGK | hc_39 |

| SEQ ID NO: | Sequence | Annotation |
|---|---|---|
| 136 | DIQLTQSPSSLSASVGDRVTITCRASKSVDAEGDSYMNWY QQKPGKAPKLLIYAASYLESGVPSRFSGSGSGTDFTLTISSL QPEDFATYYCQQSHEDPYTFGQGTKVEIKRTVAAPSVFIFPP SDEQLKSGTASVVCLLNNFYPREAKVQWKVDNALQSGNS QESVTEQDSKDSTYSLSSTLTLSKADYEKHKVYACEVTHQ GLSSPVTKSFNRGEC | lc_39 |
| 137 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVLHEALHSHYTQK SLSLSPGK | hc_40 |
| 138 | DIQLTQSPSSLSASVGDRVTITCRASKSVDAEGDSYMNWY QQKPGKAPKLLIYAASYLESGVPSRFSGSGSGTDFTLTISSL QPEDFATYYCQQSHEDPYTFGQGTKVEIKRTVAAPSVFIFPP SDEQLKSGTASVVCLLNNFYPREAKVQWKVDNALQSGNS QESVTEQDSKDSTYSLSSTLTLSKADYEKHKVYACEVTHQ GLSSPVTKSFNRGEC | lc_40 |
| 139 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_41 |
| 140 | DIQLTQSPSSLSASVGDRVTITCRASKSVDTEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_41 |
| 141 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_42 |
| 142 | DIQLTQSPSSLSASVGDRVTITCRASKSVDRQGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_42 |
| 143 | EVQLVESGGGLVQPGGSLRLSCAVSGYDITQGYSWNWIRQ APGKGLEWVASITYSGSTNYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV | hc_43 |

| SEQ ID NO: | Sequence | Annotation |
|---|---|---|
| | DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | |
| 144 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_43 |
| 145 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_44 |
| 146 | DIQLTQSPSSLSASVGDRVTITCRASKSVDWEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_44 |
| 147 | EVQLVESGGGLVQPGGSLRLSCAVSGYDITQGYSWNWIRQ APGKGLEWVASITYSGSTNYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVLHEALHSHYTQK SLSLSPGK | hc_45 |
| 148 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_45 |
| 149 | EVQLVESGGGLVQPGGSLRLSCAVSGYDITQGYSWNWIRQ APGKGLEWVASITYSGSTNYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLYITREPEVTCVVVDVSHEDPEVKFNWYVD GVEVHNAKTKPREEQYNSTYRVVSVLTVLHQDWLNGKEY KCKVSNKALPAPIEKTISKAKGQPREPQVYTLPPSREEMTK NQVSLTCLVKGFYPSDIAVEWESNGQPENNYKTTPPVLDS DGSFFLYSKLTVDKSRWQQGNVFSCSVMHEALHNHYTQK SLSLSPGK | hc_46 |
| 150 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_46 |

-continued

| SEQ ID NO: | Sequence | Annotation |
|---|---|---|
| 315 | EVQLVESGGGLVQPGGSLRLSCAVSGYSITQGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_47 |
| 316 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_47 |
| 317 | EVQLVESGGGLVQPGGSLRLSCAVSGYNITQGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_48 |
| 318 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_48 |
| 319 | EVQLVESGGGLVQPGGSLRLSCAVSGYDITSGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_49 |
| 320 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_49 |
| 321 | EVQLVESGGGLVQPGGSLRLSCAVSGYDITDGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_50 |

SEQUENCES

| SEQ ID NO: | Sequence | Annotation |
|---|---|---|
| 322 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_50 |
| 323 | EVQLVESGGGLVQPGGSLRLSCAVSGYDITEGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_51 |
| 324 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_51 |
| 327 | EVQLVESGGGLVQPGGSLRLSCAVSGYDITQGYSWNWIRQ APGKGLEWVASIKYSGETKYNPSVKGRITISRDESKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_53 |
| 328 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_53 |
| 329 | EVQLVESGGGLVQPGGSLRLSCAVSGYDITQGYSWNWIRQ APGKGLEWVASIKYSGETKYNPSVKGRITISRDQSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_54 |
| 330 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_54 |
| 331 | EVQLVESGGGLVQPGGSLRLSCAVSGYDITQGYSWNWIRQ APGKGLEWVASIKYSGETKYNPSVKGRITISRDSSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV | hc_55 |

| SEQ ID NO: | Sequence | Annotation |
|---|---|---|
| | DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | |
| 332 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_55 |
| 333 | EVQLVESGGGLVQPGGSLRLSCAVSGYDITQGYSWNWIRQ APGKGLEWVASIKYSGETKYNPSVKGRITISRDKSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_56 |
| 334 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_56 |
| 335 | EVQLVESGGGLVQPGGSLRLSCAVSGYDITQGYSWNWIRQ APGKGLEWVASIKYSGETKYNPSVKGRITISRDASKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_57 |
| 336 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_57 |
| 337 | EVQLVESGGGLVQPGGSLRLSCAVSGYDITQGYSWNWIRQ APGKGLEWVASIKYSGETKYNPSVKGRITISRDYSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_58 |
| 338 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_58 |

| SEQ ID NO: | Sequence | Annotation |
|---|---|---|
| 339 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCARGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_59 |
| 340 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_59 |
| 345 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGSNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_62 |
| 346 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_62 |
| 347 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGDNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_63 |
| 348 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_63 |
| 349 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGKNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_64 |

| SEQ ID NO: | Sequence | Annotation |
|---|---|---|
| 350 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_64 |
| 351 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNHYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_65 |
| 352 | DIQLTQSPSSLSASVGDRVTITCRASKSVDAEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_65 |
| 357 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_76 |
| 358 | DIQLTQSPSSLSASVGDRVTITCRASKSVDSEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_76 |
| 359 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_77 |
| 360 | DIQLTQSPSSLSASVGDRVTITCRASKSVDGEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_77 |
| 361 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV | hc_78 |

-continued

| SEQ ID NO: | Sequence | Annotation |
|---|---|---|
|  | DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK |  |
| 362 | DIQLTQSPSSLSASVGDRVTITCRASKSVDEEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_78 |
| 363 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_79 |
| 364 | DIQLTQSPSSLSASVGDRVTITCRASKSVDDEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_79 |
| 383 | EVQLVESGGGLVQPGGSLRLSCAVSGYDITQGYSWNWIRQ APGKGLEWVASIKYSGETKYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_83 |
| 384 | DIQLTQSPSSLSASVGDRVTITCRASKSVDAQGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_83 |
| 151 | EVQLVESGGGLVQPGGSLRLSCAVSGYSITSGYSWNWIRQ APGKGLEWVASITYDGSTNYNPSVKGRITISRDDSKNTFYL QMNSLRAEDTAVYYCARGSHYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_comp_1 |
| 152 | DIQLTQSPSSLSASVGDRVTITCRASQSVDYDGDSYMNWY QQKPGKAPKLLIYAASYLESGVPSRFSGSGSGTDFTLTISSL QPEDFATYYCQQSHEDPYTFGQGTKVEIKRTVAAPSVFIFPP SDEQLKSGTASVVCLLNNFYPREAKVQWKVDNALQSGNS QESVTEQDSKDSTYSLSSTLTLSKADYEKHKVYACEVTHQ GLSSPVTKSFNRGEC | lc_comp_1 |

| SEQ ID NO: | Sequence | Annotation |
|---|---|---|
| 153 | QVQLVQSGAEVMKPGSSVKVSCKASGYTFSWYWLEWVR QAPGHGLEWMGEIDPGTFTTNYNEKFKARVTFTADTSTST AYMELSSLRSEDTAVYYCARFSHFSGSNYDYFDYWGQGTL VTVSSASTKGPSVFPLAPSSKSTSGGTAALGCLVKDYFPEP VTVSWNSGALTSGVHTFPAVLQSSGLYSLSSVVTVPSSSLG TQTYICNVNHKPSNTKVDKKVEPKSCDKTHTCPPCPAPELL GGPSVFLFPPKPKDTLMISRTPEVTCVVVDVSHEDPEVKFN WYVDGVEVHNAKTKPREEQYNSTYRVVSVLTVLHQDWL NGKEYKCKVSNKALPAPIEKTISKAKGQPREPQVYTLPPSR DELTKNQVSLTCLVKGFYPSDIAVEWESNGQPENNYKTTPP VLDSDGSFFLYSKLTVDKSRWQQGNVFSCSVMHEALHNH YTQKSLSLSPG | hc_comp_2 |
| 154 | EIVMTQSPATLSVSPGERATLSCRASQSIGTNIHWYQQKPG QAPRLLIYYASESISGIPARFSGSGSGTEFTLTISSLQSEDFAV YYCQQSWSWPTTFGGGTKVEIKRTVAAPSVFIFPPSDEQLK SGTASVVCLLNNFYPREAKVQWKVDNALQSGNSQESVTE QDSKDSTYSLSSTLTLSKADYEKHKVYACEVTHQGLSSPVT KSFNRGEC | lc_comp_2 |
| 155 | EVQLVESGGGLVQPGGSLRLSCAVSGYSITSGYSWNWIRQ APGKGLEWVASIKYSGETKYNPSVKGRITISRDDSKNTFYL QMNSLRAEDTAVYYCARGSHYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_comp_3 |
| 156 | DIQLTQSPSSLSASVGDRVTITCRASKPVDGEGDSYLNWYQ QKPGKAPKLLIYAASYLESGVPSRFSGSGSGTDFTLTISSLQ PEDFATYYCQQSHEDPYTFGQGTKVEIKRTVAAPSVFIFPPS DEQLKSGTASVVCLLNNFYPREAKVQWKVDNALQSGNSQ ESVTEQDSKDSTYSLSSTLTLSKADYEKHKVYACEVTHQG LSSPVTKSFNRGEC | lc_comp_3 |
| 157 | EVQLVESGGGLVQPDGSLRLSCAVSGYDITDGYSWNWIRQ TPGKGLEWVASVTYDGSTNYNPSVKGRITISRDGSKNTFYL QMNSLRAEDTAVYYCAKGNNYFGHWHFAVWGQGTLVTV SGGSASTKGPSVFPLAPSSKSTSGGTAALGCLVKDYFPEPV TVSWNSGALTSGVHTFPAVLQSSGLYSLSSVVTVPSSSLGT QTYICNVNHKPSNTKVDKKVEPKSCDKTHTCPPCPAPELLG GPSVFLFPPKPKDTLMISRTPEVTCVVVDVSHEDPEVKFNW YVDGVEVHNAKTKPREEQYNSTYRVVSVLTVLHQDWLNG KEYKCKVSNKALPAPIEKTISKAKGQPREPQVYTLPPSREE MTKNQVSLTCLVKGFYPSDIAVEWESNGQPENNYKTTPPV LDSDGSFFLYSKLTVDKSRWQQGNVFSCSVMHEALHNHY TQKSLSLSPGK | hc_comp_4 |
| 158 | DIQLTQSPSSLSASVGDRVTITCRASKSVDADGDSYMNWY QAKPGRHPKLLIYAASYLESGVPSRFSGSGSGTDFTLTISSL QPEDFATYYCQQSHEDPYTFGQGTKVEIKGGRTVAAPSVFI FPPSDEQLKSGTASVVCLLNNFYPREAKVQWKVDNALQSG NSQESVTEQDSKDSTYSLSSTLTLSKADYEKHKVYACEVT HQGLSSPVTKSFNRGEC | lc_comp_4 |
| 159 | EVQLVESGGGLVQPDGSLRLSCAVSGYDITDGYSWNWIRQ TPGKGLEWVASVTYDGSTNYNPSVKGRITISRDGSKNTFYL QMNSLRAEDTAVYYCAKGNNYFGHWHFAVWGQGTLVTV SGGSASTKGPSVFPLAPSSKSTSGGTAALGCLVKDYFPEPVT VSWNSGALTSGVHTFPAVLQSSGLYSLSSVVTVPSSSLGTQ TYICNVNHKPSNTKVDKKVEPKSCDKTHTCPPCPAPELLGG PSVFLFPPKPKDTLMISRTPEVTCVVVDVSHEDPEVKFNWY VDGVEVHNAKTKPREEQYNSTYRVVSVLTVLHQDWLNGK EYKCKVSNKALPAPIEKTISKAKGQPREPQVYTLPPSREEM TKNQVSLTCLVKGFYPSDIAVEWESNGQPENNYKTTPPVL DSDGSFFLYSKLTVDKSRWQQGNVFSCSVMHEALHNHYT QKSLSLSPGK | hc_comp_5 |

| SEQ ID NO: | Sequence | Annotation |
|---|---|---|
| 160 | DIQLTQSPSSLSASVGDRVTITCRASKSVDADGDSYMNWY QAKPGRHPKLLIYAASYLESGVPSRFSGSGSGTDFTLTISSL QPEDFATYYCQQSHEDPYTFGQGTKVEIKGRTVAAPSVFIF PPSDEQLKSGTASVVCLLNNFYPREAKVQWKVDNALQSG NSQESVTEQDSKDSTYSLSSTLTLSKADYEKHKVYACEVT HQGLSSPVTKSFNRGEC | lc_comp_5 |
| 161 | EVQLVESGGGLVQPDGSLRLSCAVSGYDITDGYSWNWIRQ TPGKGLEWVASVTYDGSTNYNPSVKGRITISRDGSKNTFYL QMNSLRAEDTAVYYCAKGNNYFGHWHFAVWGQGTLVTV SSASTKGPSVFPLAPSSKSTSGGTAALGCLVKDYFPEPVTVS WNSGALTSGVHTFPAVLQSSGLYSLSSVVTVPSSSLGTQTY ICNVNHKPSNTKVDKKVEPKSCDKTHTCPPCPAPELLGGPS VFLFPPKPKDTLMISRTPEVTCVVVDVSHEDPEVKFNWYV DGVEVHNAKTKPREEQYNSTYRVVSVLTVLHQDWLNGKE YKCKVSNKALPAPIEKTISKAKGQPREPQVYTLPPSREEMT KNQVSLTCLVKGFYPSDIAVEWESNGQPENNYKTTPPVLD SDGSFFLYSKLTVDKSRWQQGNVFSCSVMHEALHNHYTQ KSLSLSPGK | hc_comp_6 |
| 162 | DIQLTQSPSSLSASVGDRVTITCRASKSVDADGDSYMNWY QAKPGRHPKLLIYAASYLESGVPSRFSGSGSGTDFTLTISSL QPEDFATYYCQQSHEDPYTFGQGTKVEIKRTVAAPSVFIFPP SDEQLKSGTASVVCLLNNFYPREAKVQWKVDNALQSGNS QESVTEQDSKDSTYSLSSTLTLSKADYEKHKVYACEVTHQ GLSSPVTKSFNRGEC | lc_comp_6 |
| 163 | ASTQSPSVFPLTRCCKNIPSNATSVTLGCLATGYFPEPVMVT WDTGSLNGTTMTLPATTLTLSGHYATISLLTVSGAWAKQM FTCRVAHTPSSTDWVDNKTFSVCSRDFTPPTVKILQSSCDG GGHFPPTIQLLCLVSGYTPGTINITWLEDGQVMDVDLSTAS TTQEGELASTQSELTLSQKHWLSDRTYTCQVTYQGHTFED STKKCADSNPRGVSAYLSRPSPFDLFIRKSPTITCLVVDLAP SKGTVNLTWSRASGKPVNHSTRKEEKQRNGTLTVTSTLPV GTRDWIEGETYQCRVTHPHLPRALMRSTTKTSGPRAAPEV YAFATPEWPGSRDKRTLACLIQNFMPEDISVQWLHNEVQL PDARHSTTQPRKTKGSGFFVFSRLEVTRAEWEQKDEFICRA VHEAASPSQTVQRAVSVNPGK | IgE |

---

What is claimed is:

1. An antibody or antibody fragment that binds an IgE constant domain, wherein the antibody or antibody fragment comprises:
   a heavy chain variable domain comprising: a heavy chain complementarity determining region 1 (CDRH1) comprising the amino acid sequence of SEQ ID NO: 37; a heavy chain complementarity determining region 2 (CDRH2) comprising the amino acid sequence of SEQ ID NO: 38; a heavy chain complementarity determining region 3 (CDRH3) comprising the amino acid sequence of SEQ ID NO: 39; and a light chain variable domain comprising: a light chain complementarity determining region 1 (CDRL1) comprising the amino acid sequence of SEQ ID NO: 40; a light chain complementarity determining region 2 (CDRL2) comprising the amino acid sequence of SEQ ID NO: 41; and a light chain complementarity determining region 3 (CDRL3) comprising the amino acid sequence of SEQ ID NO: 42.

2. The antibody or antibody fragment of claim 1, wherein:
   (i) binding of the antibody or antibody fragment to a basophil and/or mast cell does not result in the activation of the basophil and/or mast cell;
   (ii) the antibody or antibody fragment dissociates IgE from FcεRI on mast cells in 20 hours at an IC50 of IgE dissociation of less than 700 nM;
   (iii) the antibody or antibody fragment dissociates IgE from FcεRI on human basophils in 20 hours at an $IC_{50}$ of IgE dissociation of less than 40 nM; and
   (iv) the antibody or antibody fragment exhibits less than 8% change in main capillary isoelectric focusing (cIEF) peak percentage after heat stress at 40° C. for 14 days.

3. The antibody or antibody fragment of claim 1, wherein the antibody or antibody fragment comprises an amino acid other than aspartic acid (D) at the framework position corresponding to amino acid position 74 of SEQ ID NO: 95 (Kabat VH framework position 73).

4. The antibody or antibody fragment of claim 1, wherein antibody or antibody fragment further comprises a modified Fc domain comprising an amino acid modification that increases binding to the neonatal Fc receptor (FcRn) relative to wild-type IgG1 or IgG4.

5. The antibody or antibody fragment of claim 4, wherein the modified Fc domain comprises the amino acids Y252/T254/E256 (YTE) or L428/5434 (LS) per EU numbering.

6. The antibody or antibody fragment of claim 1, wherein the IgE comprises SEQ ID NO: 163.

7. The antibody or antibody fragment of claim 1, wherein the antibody or antibody fragment binds IgE with an affinity ($K_D$) equal to or less than 5 nanomolar (nM).

8. The antibody or antibody fragment of claim 7, wherein the antibody or antibody fragment binds IgE with an affinity ($K_D$) equal to or less than 0.5 nanomolar (nM).

9. The antibody or antibody fragment of claim 1, wherein the antibody or antibody fragment comprises:
   a heavy chain variable region comprising an amino sequence having at least 85% sequence identity to SEQ ID NO: 91; and a light chain variable region comprising an amino sequence having at least 85% sequence identity to SEQ ID NO: 92.

10. The antibody or antibody fragment of claim 1, wherein the antibody or antibody fragment comprises:
    a heavy chain variable region comprising an amino sequence having at least 85% sequence identity to SEQ ID NO: 93; and a light chain variable region comprising an amino sequence having at least 85% sequence identity to SEQ ID NO: 94.

11. The antibody or antibody fragment of claim 1, wherein the antibody or antibody fragment comprises:
    a heavy chain variable region comprising an amino sequence having at least 85% sequence identity to SEQ ID NO: 95; and a light chain variable region comprising an amino sequence having at least 85% sequence identity to SEQ ID NO: 96.

12. The antibody or antibody fragment of claim 11, wherein the antibody or antibody fragment comprises:
    a heavy chain variable region comprising an amino sequence having 100% sequence identity to SEQ ID NO: 95; and a light chain variable region comprising an amino sequence having 100% sequence identity to SEQ ID NO: 96.

13. The antibody or antibody fragment of claim 1, wherein the antibody or antibody fragment comprises:
    a heavy chain comprising an amino sequence having at least 85% sequence identity to SEQ ID NO: 121; and a light chain comprising an amino sequence having at least 85% sequence identity to SEQ ID NO: 122.

14. The antibody or antibody fragment of claim 1, wherein the antibody or antibody fragment comprises:
    a heavy chain comprising an amino sequence having at least 85% sequence identity to SEQ ID NO: 123; and a light chain comprising an amino sequence having at least 85% sequence identity to SEQ ID NO: 124.

15. The antibody or antibody fragment of claim 1, wherein the antibody or antibody fragment comprises:
    a heavy chain comprising an amino sequence having at least 85% sequence identity to SEQ ID NO: 125; and a light chain comprising an amino sequence having at least 85% sequence identity to SEQ ID NO: 126.

16. The antibody or antibody fragment of claim 15, wherein the antibody or antibody fragment comprises:
    a heavy chain comprising an amino sequence having 100% sequence identity to SEQ ID NO: 125; and a light chain comprising an amino sequence having 100% sequence identity to SEQ ID NO: 126.

17. The antibody or antibody fragment of claim 1, wherein the antibody or antibody fragment is an antibody fragment, and wherein the antibody fragment comprises or consists of a single chain variable fragment (scFv), a Fab, Fab2, Fab3, F(ab')2 diabody, triabody, tetrabody, BiTE, tandABs, or DART.

18. The antibody or antibody fragment of claim 1, wherein the antibody or antibody fragment is a full-length antibody.

19. The antibody or antibody fragment of claim 1, wherein a variable domain of the antibody or antibody fragment and a constant domain of the antibody or antibody fragment are directly conjugated to one another without an intervening flexible elbow.

* * * * *